US010725677B2

(12) United States Patent
Shechter et al.

(10) Patent No.: US 10,725,677 B2
(45) Date of Patent: Jul. 28, 2020

(54) SYSTEMS AND METHODS FOR EFFICIENT POWER STATE TRANSITIONS

(71) Applicant: SanDisk Technologies LLC, Plano, TX (US)

(72) Inventors: Noga Harari Shechter, Lehavim (IL); Shay Benisty, Beer Sheva (IL); Judah Gamliel Hahn, Ofra (IL); Yair Baram, Metar (IL)

(73) Assignee: SanDisk Technologies LLC, Plano, TX (US)

( * ) Notice: Subject to any disclaimer, the term of this patent is extended or adjusted under 35 U.S.C. 154(b) by 297 days.

(21) Appl. No.: 15/846,592

(22) Filed: Dec. 19, 2017

(65) Prior Publication Data

US 2018/0107417 A1   Apr. 19, 2018

Related U.S. Application Data

(63) Continuation-in-part of application No. 15/047,713, filed on Feb. 19, 2016, now abandoned.

(51) Int. Cl.
*G06F 3/00* (2006.01)
*G06F 3/06* (2006.01)
*G06F 13/42* (2006.01)

(52) U.S. Cl.
CPC .......... *G06F 3/0625* (2013.01); *G06F 3/0619* (2013.01); *G06F 3/0634* (2013.01); *G06F 3/0656* (2013.01); *G06F 3/0679* (2013.01); *G06F 13/4282* (2013.01); *Y02D 10/14* (2018.01); *Y02D 10/151* (2018.01); *Y02D 10/154* (2018.01)

(58) Field of Classification Search
None
See application file for complete search history.

(56) References Cited

U.S. PATENT DOCUMENTS

| 5,913,067 A | 6/1999 | Klein | |
| 8,312,258 B2* | 11/2012 | Xing | G06F 9/4403 713/1 |
| 8,892,831 B2 | 11/2014 | Khmelnitsky et al. | |

(Continued)

OTHER PUBLICATIONS

NVM Express, Revision 1.2a, pp. 1-209, Oct. 23, 2015.

(Continued)

*Primary Examiner* — Reginald G Bragdon
*Assistant Examiner* — Michael L Westbrook
(74) *Attorney, Agent, or Firm* — Loza & Loza, LLP; Gabriel Fitch

(57) ABSTRACT

A memory device may be configured to leverage memory resources of a host computing device to efficiently transition between different power states. In some embodiments, the memory device stores resume data within a host memory buffer (HMB) before transitioning to a low-power state, and uses the resume data stored within the HMB to resume operation from the low-power state. The memory device may be configured to pre-populate the HMB with resume data prior to transitioning to the low-power state. In some embodiments, the disclosed memory device is configured to gradually resume from the low-power state, which may comprise resuming services of the memory device in the order such services are required during the resume process.

18 Claims, 16 Drawing Sheets

(56) References Cited

U.S. PATENT DOCUMENTS

| | | | |
|---|---|---|---|
| 2013/0103650 A1* | 4/2013 | Natanzon | G06F 11/2069 |
| | | | 707/684 |
| 2014/0068281 A1* | 3/2014 | Diamant | G06F 1/3268 |
| | | | 713/300 |
| 2017/0038973 A1 | 2/2017 | Takano | |
| 2017/0242606 A1 | 8/2017 | Vlaiko et al. | |

OTHER PUBLICATIONS

Non-final Office Action dated Mar. 9, 2017, U.S. Appl. No. 15/047,713, filed Feb. 19, 2016.
Response to Office Action dated Jul. 10, 2017, U.S. Appl. No. 15/047,713, filed Feb. 19, 2016.
Final Office Action dated Aug. 8, 2017, U.S. Appl. No. 15/047,713, filed Feb. 19, 2016.

\* cited by examiner

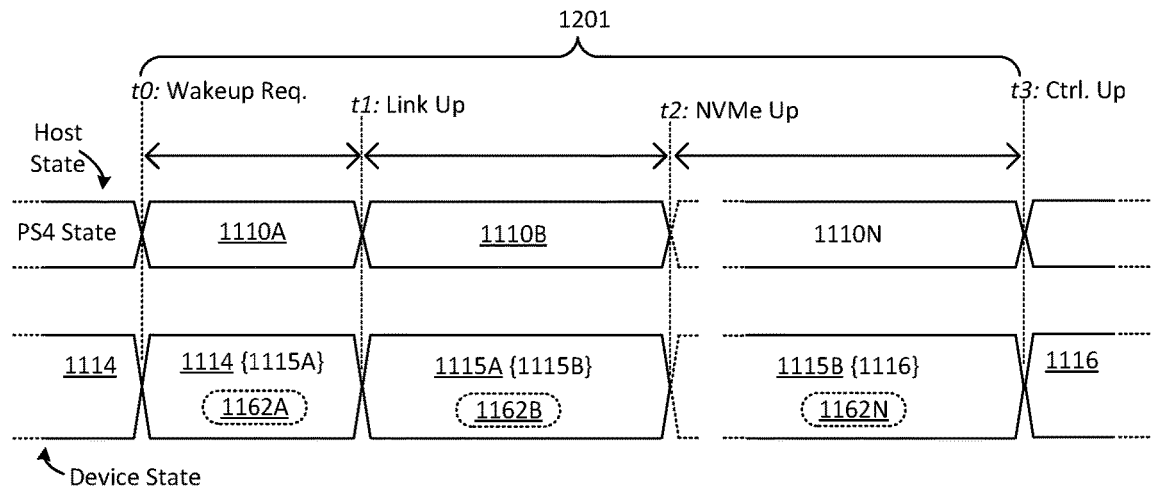
FIG. 12B
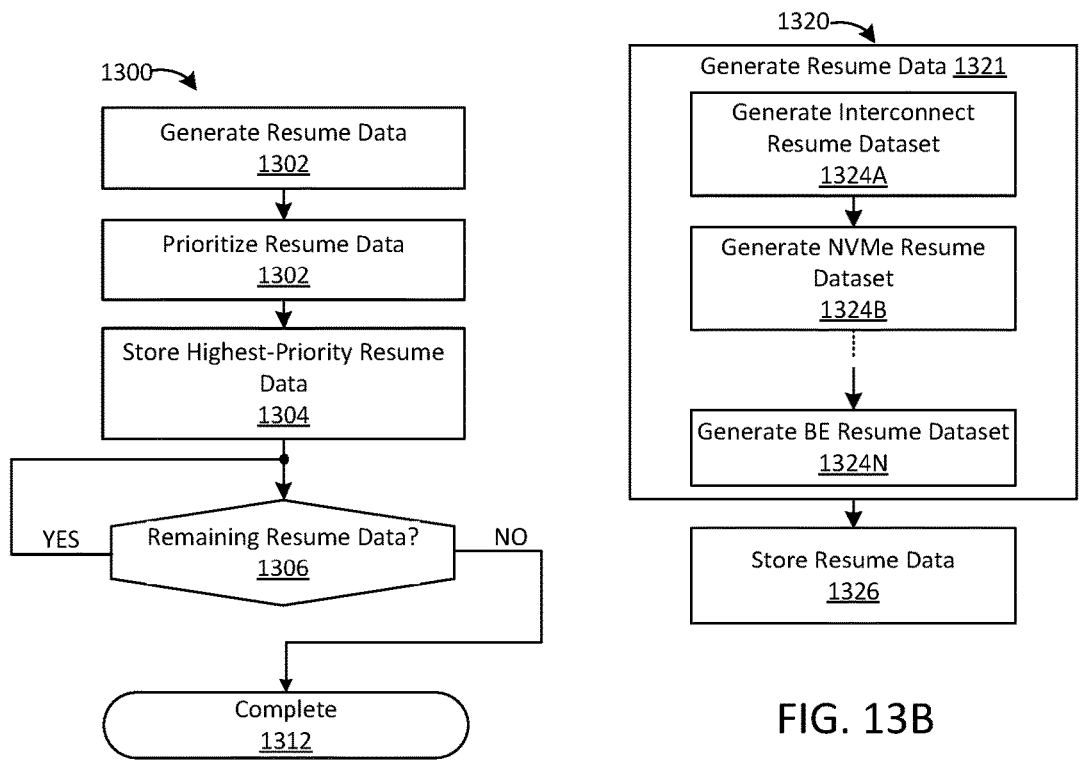
FIG. 13A
FIG. 13B

SYSTEMS AND METHODS FOR EFFICIENT POWER STATE TRANSITIONS

This application claims the benefit of U.S. patent application Ser. No. 15/047,713, which was filed on Feb. 19, 2016, and which is incorporated by reference, in its entirety.

TECHNICAL FIELD

The subject matter described herein relates to transitioning between power states. More particularly, the subject matter disclosed herein relates to systems, circuits, apparatus, and methods for efficiently transitioning a memory device between power states.

BACKGROUND

Memory devices, such as non-volatile (NV) memory devices and/or storage devices, may be required to operate in different power modes. The power modes may be defined by one or more standards. A host computing system may instruct the memory device to transition between different power states in accordance with a power policy and/or the like. The host computing system may request that the memory device transition to a low-power state in response in order to, inter alia, reduce the rate at which power is being consumed by the host computing system. The host computing system may request the memory device to transition to a low-power state as part of an upper-level power management operation, such as a "sleep," "suspend," "hibernate," "shutdown" or other operation. The host computing system may request the memory device to transition to a higher-power state in response to another upper-level power management operation, such as a "wakeup," "resume," "restart," or the like.

Power states may be defined by the host and/or one or more standards. For example, the non-volatile memory express (NVMe EXPRESS) standard defines various device power states, each of which may correspond to a respective use case. The power states may include PS0 through PS4, where PS0 is an active power state (a power state in which the memory device is operational). During operation in the PS0 power state, the memory device may be allowed to consume more power than when in other, lower-power states. Other power states PS1-PS4 may have gradually decreasing power specifications and/or may correspond to non-operational state(s) of the memory device. As used herein, a "non-operational" state refers to a power state in which one or more services of the memory device are non-operational and/or the memory device is not configured to process commands directed thereto. As used herein, an "operational state" refers to a state in which services of the memory device are operational and/or the memory device is configured to receive and/or process commands. PS0 -PS2 may comprise operational states, and PS3-PS4 may comprise non-operational states.

The power states may have respective time and/or power requirements, which may define an acceptable latency for transitioning to/from a respective power state, the amount of power available to the memory device during the transitions, the amount of power available to the memory device while in the respective power state, and so on. For example, the specification(s) for the PS3 power state may require the memory device to make rapid transitions to/from the PS3 power state, but may allow the memory device to impose specified transactional power costs when making such transitions. In other power states, the memory device may be restricted to lower-power consumption levels, but may be allocated more time for power state transitions. For example, in the PS4 power state, the memory device may be expected to have minimal power consumption (on the order of 2 to 5 milliwatts), but may be permitted to take more time for transitions into and/or out of the PS4 power state. The transitional latency and/or power consumption estimates are be defined in a specification implemented by the memory device, the host computing system, an interconnect to which the memory device is coupled, and/or the like. As disclosed above, the power state specification(s) may be used as part an upper-level power strategy in order to optimize power consumption of the host computing system (e.g., maximize the battery life of portable computing systems).

A memory device may comprise integrated onboard DRAM, such as DDR2/3/4 or LPDDR2/3. Using onboard DRAM may enable a memory device to rapidly transition to/from the PS3 power state by, inter alia, transferring the operating state of the memory device to the DRAM and/or retaining the contents of the DRAM while the memory device is transitioned to the PS3 state. The memory device may quickly resume from the PS3 state by, inter alia, reading the operating state information from the on-board DRAM. Similarly, in transitions to and from the PS4 state, DRAM may be maintained in self-refresh mode (full array or partial array as in LPDDR devices) so that device context information can be retrieved from the DRAM during startup. However, on-board DRAM may be expensive and it may not be practical to maintain the DRAM while in certain low-power states. As such, transitioning to lower-power states may require the operating state of the memory device to be written to NV memory, which may increase the latency required for transitioning to such lower-power states. Moreover, resuming from the lower-power state may require the memory device to read the operating state from the NV memory, which may increase the latency of resume operations (on the order of about 300 milliseconds, or more, for transitioning to a low-power state, such as PS4, and about 100 milliseconds, or more, from resuming from the low-power state). Therefore, what are needed are systems, methods, and apparatus for efficiently transitioning between power states.

BRIEF DESCRIPTION OF THE DRAWINGS

The subject matter described herein will now be explained with reference to the accompanying drawings of which:

FIG. 12B illustrates another embodiment of a resume process between a host computing system and a memory device.

FIG. 13A is a flow diagram of another embodiment of a method for transitioning a memory device to a low-power state.

FIG. 13B is a flow diagram of another embodiment of a method for transitioning a memory device to a low-power state.

DETAILED DESCRIPTION

Figure 1:
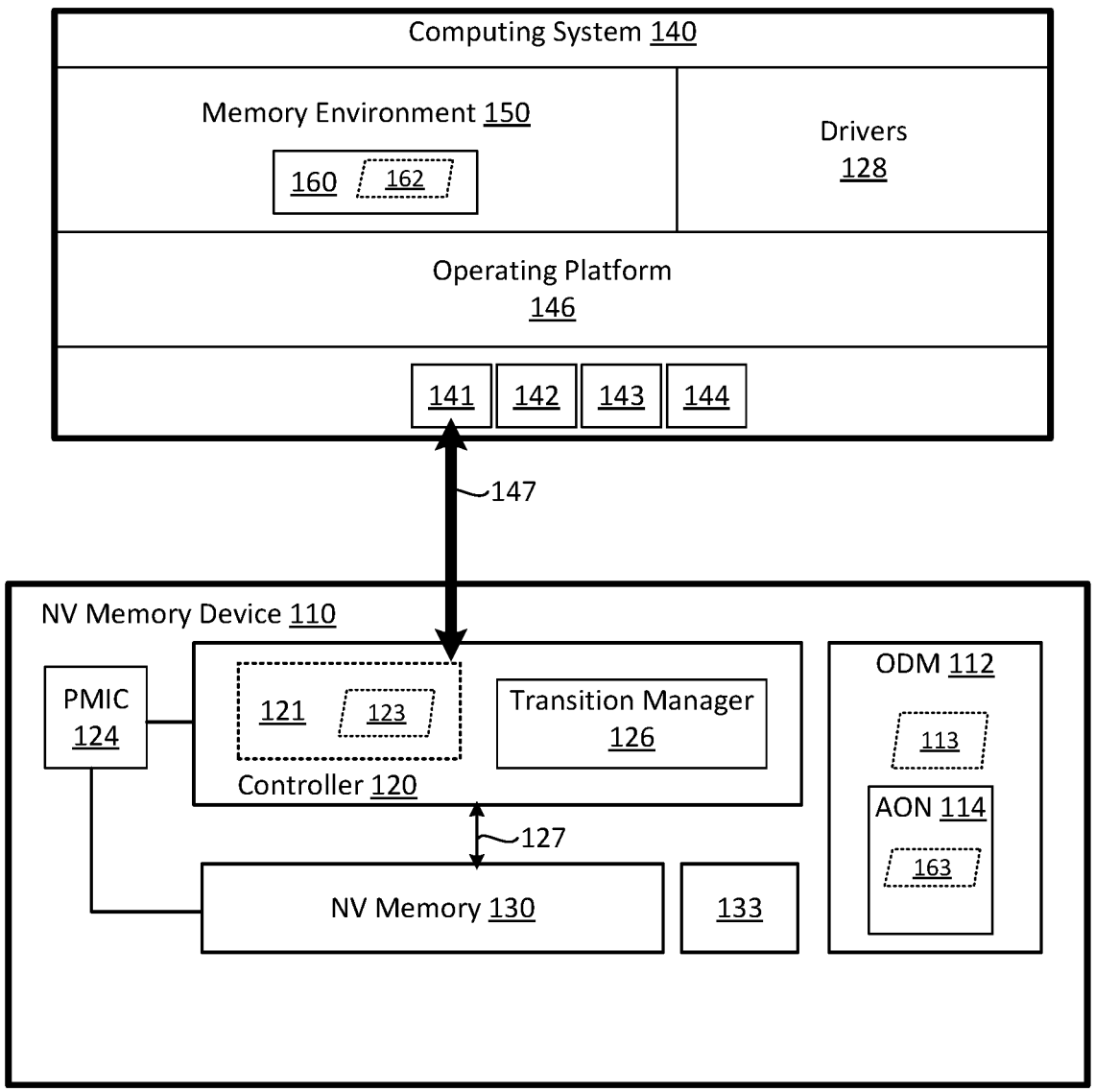
FIG. 1 is a schematic block diagram of a system comprising one embodiment of a memory device configured to leverage host memory to efficiently transition between power states.

The subject matter described herein includes methods, systems, apparatus, and computer readable media for transitioning to and from power states. The disclosed embodiments may leverage host memory resources to efficiently implement such transitions. In some embodiments, the memory device allocates one or more ranges of host memory. The one or more memory ranges may be allocated for the exclusive use of the memory device. The host computing system may avoid modifying the host memory resources provisioned to the memory device until such resources are released by the memory device. The host computing system may be configured to request that the memory device release the host memory resources allocated thereto prior to a shutdown event, a Runtime D3 event, or any other event that may involve the host computing system reclaiming the host memory resources. After the memory device acknowledges that it is no longer using the host memory resources, the host software may reclaim the host memory resources. In the case of the Runtime D3 (RTD3) power state, the host computing system may reinitialize the host memory resources, and reallocate the host memory resources to the memory device. The host computing system may be further configured to inform the memory device whether the ranges that were provisioned to the memory device prior to the RTD3 event have been modified.

As used herein, the term "storage device state information" refers to information usable by the storage device to transition from a lower-power state to a higher-power state. The terms "low-power state," "lower-power state," "non-operational state," "high-power state," "higher-power state," "operational state," and/or the like refer to operational states that correspond to one or more power levels and/or modes. Although the examples described herein relate to transitioning from the PS0 state to the PS3, PS4, and RTD3 states and resuming from the PS3, PS4, and RTD3 states to the PS0 state, the subject matter described herein is not limited to these examples. HMS-assisted power state transitioning as described herein can be used to facilitate transition of a storage device between any power states in which storage device state information is needed for the resume operation. For example, Revision 1.2a of the NVMe Specification indicates that up to 32 power states can be used. The subject matter described herein may be used to facilitate transition between any of these or other storage device power states.

The term "resume data" refers to information for resuming from one or more lower-power states to a higher-power state. Resume data may comprise information for resuming one or more services of the memory device, such as interconnect services (e.g., resuming a communication link between the memory device and the host computing system), NVMe services, back-end services, and/or the like. The resume data for the memory device may correspond to the operating state of the memory device prior to the memory device being transitioned to a low-power state. The resume data for a memory device may comprise "bootstrap data," such as firmware, configuration data, settings, interconnect settings (e.g., a PCIe configuration space), NVMe state information (e.g., the state of one or more NVMe registers, data structures, queues, buffers, and/or the like), and so on.

In some implementations, the memory device may be further configured to record validation data (and/or addressing information) corresponding to the resume data. The validation data may be used to verify the integrity of the resume data (and/or portions thereof) when resuming from a low-power state.

FIG. 1 is a schematic block diagram of one embodiment of a system 100 comprising a non-volatile memory device 110 configured to efficiently transition between different power states. In the FIG. 1 embodiment, the non-volatile memory device 110 comprises a controller 120 and non-volatile (NV) memory 130. The non-volatile memory device 110 may, therefore, comprise an NV memory device and/or storage device.

The NV memory 130 may comprise any circuit, medium, and/or device capable of recording data. The NV memory 130 may include, but is not limited to: electrically erasable NV memory, Flash memory, NAND Flash memory, 2D NAND Flash memory, 3D NAND Flash memory, NOR Flash memory, nano RAM (NRAM), nanocrystal wire-based memory, silicon-oxide based sub-10 nanometer process memory, graphene memory, Silicon-Oxide-Nitride-Oxide-Silicon (SONOS) memory, programmable metallization cell (PMC) memory, conductive-bridging RAM (CBRAM) memory, magneto-resistive RAM (MRAM) memory, Resistive RAM (ReRAM), Memristor memory, programmable metallization cell memory, phase-change memory (PCM, PCME, PRAM, PCRAM, ovonic unified memory, chalcogenide RAM, C-RAM, and/or the like), magnetic storage media (e.g., hard disk, tape), optical storage media, and/or the like. The NV memory 130 may comprise one or more NV memory elements, which may include, but are not limited to: chips, packages, planes, die, and/or the like.

The controller 120 may be configured to control access to the NV memory 130. The controller 120 may comprise one or more circuits, processors, programmable processors (e.g., FPGAs), ASICs, micro-controllers, and/or the like. The NV memory 130 may further comprise and/or be communicatively coupled to one or more back-end resources, which may be configured to manage storage operations on the NV memory 130. The back-end resources may include, but are not limited to: NV memory controller(s), on-chip and/or on-die memory controllers (e.g., controllers implemented on and/or within the NV memory 130), internal interconnect(s), program circuitry, write circuitry, erase circuitry, sense circuity, and so on. The controller 120 may be communicatively coupled to the NV memory 130 by, inter alia, a bus 127. The bus 127 may be configured to communicate data, commands, control information, and/or the like, between the controller 120 and NV memory 130.

In the FIG. 1 embodiment, the non-volatile memory device 110 may be coupled to a host computing system 140. The host computing system 140 may comprise any computing system capable of being coupled to a non-volatile memory device 110, as disclosed herein. The host computing system 140 may comprise one or more of a server computing device, a network-attached storage device, a personal computing device, a desktop computing device, a blade computing device, a mobile computing device (e.g., a table computing device, a laptop computing device, and/or the like), a communications computing device (e.g., a smart phone), an embedded computing device, a camera, and/or the like. In some embodiments, the host computing system 140 may comprise an enterprise grade or retail grade computing system configured to interface with flash-based storage devices and/or operate as a self-contained or network accessible computing environment.

The host computing system 140 may comprise host interconnect resources 141, host processing resources 142, host memory resources 143, non-transitory storage resources 144, communication resources 145, and/or the like. The host interconnect resources 141 may be configured to couple components of the host computing system 140 (e.g., host processing resources 141, host memory resources 143, non-transitory storage resources 144, and/or the like). Alternatively, or in addition, the host interconnect resources 141 may be configured to couple components of the host computing system 140 to one or more external devices and/or components (e.g., couple the host computing system 140 to one or more external storage devices, and/or the like). The host interconnect resources 141 may include, but are not limited to: a front-side bus (FSB), a back-side bus, a host bridge, a Northbridge, a Southbridge, a system bus, an Accelerated Graphics Port (AGP) channel, an I/O controller, an I/O bus, a peripheral component interconnect (PCI) bus and/or controller, a PCI Express bus (PCIe) and/or controller, a Serial Advanced Technology Attachment (serial ATA) bus, a universal serial bus (USB) controller, an Institute of Electrical and Electronics Engineers (IEEE) 1394 bus and/or controller, a network interface, and/or the like.

The host processing resources 142 may include, but are not limited to: a central processing unit (CPU), a general-purpose processor, an application-specific integrated circuit (ASIC), a programmable logic element, an FPGA, a programmable logic array (PLG), virtual processing resources, a virtual CPU, and/or the like. The host memory resources 143 may comprise system memory, cache memory, virtual memory, volatile RAM, dynamic RAM (DRAM), static RAM (SRAM), and/or the like. The host memory resources 143 may comprise memory elements that are tightly coupled to the host processing resources 142, such as on-CPU cache. The host memory resources 143 may further comprise memory management resources, such as a memory controller, a virtual memory manager, a cache manager, and/or the like. The non-transitory storage resources 144 may comprise one or more non-transitory storage devices, which may include, but are not limited to: a Flash storage device, solid-state storage drive (SSD), a NV non-volatile memory device 110, a Redundant Array of Inexpensive Disks (RAID), a network attached storage system (NAS), persistent RAM, and/or the like. The communication resources 145 may be configured to communicatively couple the host computing system 140 to one or more electronic communication networks, which may include, but are not limited to: a Transmission Control Protocol/Internet Protocol (TCP/IP) network, a Local Area Network (LAN), a Wide Area Network (WAN), a Virtual Private Network (VPN), a Storage Area Network (SAN), and/or the like (not shown in FIG. 1 to avoid obscuring the details of the illustrated embodiments). In some embodiments, the host computing system 140 may further comprise human-machine interface components, which may include, but are not limited to: display devices, input devices, and/or the like.

The host interconnect resources 141 may be configured to communicatively couple the non-volatile memory device 110 to the host computing system 140 (by use of an interconnect 147). The non-volatile memory device 110 may be selectively coupled to the host computing system 140, may be embedded within the host computing system 140, may be removably coupled to the host computing system 140, may be locally connected to the host computing system 140, may be remotely connected to the host computing system 140, and/or the like. The non-volatile memory device 110 may comprise the non-transitory storage resource 144 of the host computing system 140. The non-volatile memory device 110 may comprise an NV memory device, an SSD, a hybrid storage device (a storage device that comprises NV memory components in combination with disc storage components), and/or the like. The interconnect 147 may comprise a PCIe bus, a SATA bus, a USB interconnect, an IEEE 1394 interconnect, a network interconnect, an Infiniband interconnect, and/or the like. The interconnect 147 may communicatively couple the host computing system 140 to other device(s), which are not shown in FIG. 1 to avoid obscuring details of the illustrated embodiments.

The host computing system 140 may comprise an operating platform 146, which may comprise, but is not limited to: a hardware operating platform, a virtual operating platform, an operating system (e.g., Windows, Linux, Unix, MAC OS, iOS, Android, and/or the like), file system(s), application(s), process(es), and/or the like. The operating platform 146 may comprise a hardware abstraction layer (HAL) configured to interface with the resources of the computing system (e.g., host interconnect resources 141, host processing resources 142, host memory resources 143, non-transitory storage resources 144, communication resources 145, and/or the like). The operating platform 146 may comprise a memory environment 150, which may correspond to the host memory resources 143 of the host computing system 140, as disclosed herein. The memory environment 150 may correspond to physical memory resources of the host computing system 140 (e.g., DRAM), virtual memory resources, and/or the like. In some embodiments, the memory environment 150 is managed by a virtual memory manager of the operating platform 146 (not shown in FIG. 1 to avoid obscuring details of the illustrated embodiments).

The operating platform 146 may interface with the non-volatile memory device 110 by use of, inter alia, drivers 128 (and/or the HAL, disclosed above). The drivers 128 may be configured to enable the host computing system 140 to communicate data, instructions, commands, and/or configuration information between the operating platform 146 and the non-volatile memory device 110 (e.g., through the interconnect 147). The drivers 128 may comprise interconnect drivers, PCI drivers, SATA drivers, PCIe drivers, NVMe drivers, and/or the like. The drivers 128 may be further configured to manage host operations pertaining to the non-volatile memory device 110 which may include, but are not limited to: allocating host memory for use by the non-volatile memory device 110 (e.g., the HMB 160, disclosed in further detail below), managing host-side queues pertaining to the non-volatile memory device 110, managing data transfers between the host computing system 140 and the non-volatile memory device 110, and so on.

The controller 120 may comprise and/or be communicatively coupled to an on-device memory (ODM) 112. The ODM 112 may comprise volatile memory, such as static RAM (SRAM), and/or the like. The ODM 112 may be located and/or embodied within the non-volatile memory device 110 and/or controller 120 (may comprise an internal memory). The ODM 112 may be separate from the NV memory 130. The ODM 112 may be used for, inter alia, storing firmware of the non-volatile memory device 110 (loaded from NV memory 130), buffering data being transferred to and/or from the non-volatile memory device 110, caching flash management information, and so on. Due to cost, power, and/or other considerations, the ODM 112 may have a relatively small capacity (e.g., significantly less than the NV memory 130). The ODM 112 may comprise volatile memory and, as such, contents of the ODM 112 may be lost when the non-volatile memory device 110 transitions to certain low-power states (e.g., a PS4 state). In some embodiments, the ODM 112 further comprises an always-on (AON) partition 114. Contents of the AON partition 114 may be preserved while the non-volatile memory device 110 is in one or more of the low-power states (e.g., while other portions of the ODM 112 are lost).

In some embodiments, the controller 120 may further comprise on-device persistent storage (ODPS) 133. The ODPS 133 may be separate from the NV memory 130. The ODPS 133 may comprise one or more of a read only memory (ROM), an Electrically Erasable Programmable ROM (EEPROM), and/or the like. The ODPS 133 may be used to store confirmation data pertaining to the controller 120, such as firmware for processing resources of the controller 120, configuration data, settings, and/or the like.

The non-volatile memory device 110 may comprise and/or correspond to an operating state 123. As used herein, the operating state 123 of non-volatile memory device 110 refers to any information pertaining to the startup, initialization, operation, and/or shutdown of the non-volatile memory device 110. The operating state 123 of the non-volatile memory device 110 may comprise, inter alia, processor operating state, interconnect operating state, NVMe operating state, device operating state, and so on. The processor operating state may pertain to the state of processing resources of the controller 120 (e.g., the operating state of one or more processing units, micro controllers, programmable logic elements, FPGAs, and/or the like). The processor operating state may further comprise firmware of the controller 120 (e.g., active firmware being implemented by the processing resources of the controller 120). The interconnect operating state may pertain to interconnection between the non-volatile memory device 110 and the interconnect 147 (e.g., a link state and/or PCIe configuration state of the non-volatile memory device 110). The NVMe operating state may pertain to the state of NVMe interface(s) of the non-volatile memory device 110, which may include, but is not limited to: a state of one or more NVMe registers, NVMe data structures (e.g., information pertaining to one or more NVMe queues), NVMe buffers, and/or the like. The device operating state may comprise "back-end" operating state information pertaining to storage operations performed on the NV memory 130. The device operating state may comprise logical-to-physical mapping information, such as a Flash Translation Layer (FTL), forward map (mappings between logical addresses and physical addresses of the NV memory 130), a reverse map (status information pertaining to respective physical address and/or regions of the NV memory 130), and so on.

Portions of the operating state 123 may be maintained in the ODM 112. Accordingly, the contents 113 of the ODM 112 may define, at least in part, the operating state 123 of the non-volatile memory device 110. In some embodiments, portions of the operating state 123 may be maintained in other storage location(s), such as the NV memory 130, the ODPS 133, the host computing system 140, other devices accessible via the interconnect 147 (e.g., non-transitory storage resource(s) 144 of the host computing system 140), and so on. In some embodiments, firmware for the processing resources of the controller 120 may be stored on the ODPS 133. During operation, the firmware may be loaded into the ODM 112 of the controller 120 for efficient implementation of the firmware by the processing resources. Similarly, portions of the NVMe operating state, such as NVMe registers, NVMe data structures (e.g., NVMe queue information), NVMe buffers, and so on, may be maintained within the ODM 112. Portions of the device operating state may maintained with the ODM 112, such as portions of the FTL. In some embodiments, the ODM 112 may not be capable of holding the full FTL for the non-volatile memory device 110 (e.g., may not be capable of storing the full set of logical-to-physical mappings). The FTL (and/or other device state metadata) may be maintained on the NV memory 130 (and/or other persistent storage location). For performance reasons, portions of the FTL may be cached within the ODM 112. For example, a request to read data pertaining to logical block address (LBA) A may comprise loading the FTL table comprising logical-to-physical mapping information for LBA into the ODM 112. The FTL table may indicate that LBA A is mapped to data stored at a particular physical address (e.g., physical address X within the NV memory 130). A request to write data pertaining to LBA A may comprise modifying the FTL table within the ODM 112. For example, writing data to LBA A may comprise modifying the FTL table to map LBA A to physical address Y (and updating other device state information to invalidate the obsolete data associated with LBA A stored at physical address X). For performance reasons, the FTL table may initially only be modified in the "cached" version stored within ODM 112. The FTL table cached within the ODM 112 may, therefore, comprise "dirty" device state metadata. As used herein "dirty" operating state metadata refers to operating state metadata within the ODM 112 that differs from corresponding operating state metadata within persistent storage (e.g., within the NV memory 130, ODPS 133, and/or the like). Dirty operating state metadata may be flushed and/or destaged to persistent storage (such that the metadata is consistent with the metadata in persistent storage and, as such, is no longer dirty). In the non-limiting example above, the dirty FTL table comprising the mapping between LBA A and physical address Y may be written to the NV memory 130 (overwriting the obsolete mapping between LBA A and physical address X).

As disclosed above, the non-volatile memory device 110 may be configured to leverage resources of the host computing system 140 to efficiently transition between power states. In some embodiments, the host computing system 140 is configured to provision host memory resources to the non-volatile memory device 110, which may be used to store operating state information pertaining to the non-volatile memory device 110 during power state transitions thereof. In some embodiments, the host computing system 140 may be configured to allocate a host memory buffer (HMB) 160 to the non-volatile memory device 110. The HMB 160 may be reserved for the exclusive use by the non-volatile memory device 110 (and/or the driver(s) 128 thereof). The HMB 160 may be allocated within the memory environment 150 of the host computing system 140 (e.g., which may correspond to host memory resources 143 managed by the operating platform 146, as disclosed herein). The host computing system 140 may allocate the HMB 160 to the non-volatile memory device 110 in response to a request from the non-volatile memory device 110 (via the interconnect 147) and/or one or more driver(s) 128 of the non-volatile memory device 110.

The non-volatile memory device 110 may comprise a transition manager 126, which may be configured to facilitate transitions between different power states. As illustrated in the FIG. 1 embodiment, the transition manager 126 may be embodied within the controller 120 of the non-volatile memory device 110. Alternatively, or in addition, portions of the transition manager 126 may be implemented separately from the controller 120 (on a separate chip, die, plane, and/or the like). Alternatively, or in addition, the transition manager 126 (and/or portions thereof) may be implemented separately from the non-volatile memory device 110 (e.g., may be implemented by or more of the drivers 128 of the non-volatile memory device 110 operating on the host computing system 140). In some embodiments, portions of the controller 120, transition manager 126, drivers 128, and/or the like may be embodied as computer-readable instructions stored on a non-transitory storage medium such as, inter alia, the NV memory 130, a non-transitory storage resource 144 of the host computing system 140, the ODPS 133, and/or the like.

In some embodiments, the transition manager 126 is configured to leverage the HMB 160 to efficiently transition between power states. The transition manager 126 may transition to a low-power state by, inter alia, generating resume data 162 for the non-volatile memory device 110, and storing the resume data 162 within the HMB 160. The resume data 162 may comprise at least a portion of the operating state 123 of the non-volatile memory device 110. In some embodiments, the resume data 162 comprises the contents 113 of the ODM 112 (and/or selected portions of the contents 113 of the ODM 112). The resume data 162 may be transferred to the memory environment 150 of the host computing system 140 through, inter alia, the interconnect 147. The transition manager 126 may be further configured to store an address of the resume data 162 within the memory environment 150 in a suitable storage location, which may include, but is not limited to: the HMB 160, a register of the non-volatile memory device 110, a register of the interconnect 147, the ODM 112, the AON partition 114 of the ODM 112, the NV memory 130, another component of the non-volatile memory device 110, another device accessible via the interconnect 147, and/or the like. When resuming operation from the low-power state, the transition manager 126 may read the resume data 162 from the HMB 160 (at the designated address within the memory environment 150), and may use the resume data 162 to resume operation of the non-volatile memory device 110. The transition manager 126 may resume operation of the non-volatile memory device 110 without the need of reading and/or deriving resume data 162 from the contents of the NV memory 130 or other persistent storage device(s).

In some embodiments, the HMB 160 may not be protected from loss, corruption, and/or modification at the host computing system 140; the HMB 160 may be susceptible to being reclaimed by the operating platform 146 at anytime. Therefore, in some embodiments, the transition manager 126 may be configured to store validation data 163 corresponding to the resume data 162. The validation data 163 may comprise information suitable for validating the integrity of the resume data 162 when the resume data 162 is subsequently read in from the HMB 160 (e.g., ensuring that the data was not corrupted or otherwise modified at the host computing system 140). The validation data 163 may include, but is not limited to: a signature of the resume data 162, a cyclic redundancy check of the resume data 162, parity information corresponding to the resume data 162, a hash of the resume data 162, an error correcting code (ECC), and/or the like. The validation data 163 may further comprise addressing information pertaining to the resume data 162. The validation data 163 may be stored within any suitable storage location including, but not limited to: the HMB 160, the ODM 112, the AON partition 114 of the ODM 112, the NV memory 130, another component of the non-volatile memory device 110, another device accessible via the interconnect 147, and/or the like.

The transition manager 126 may be configured to resume operation from the low-power state by, inter alia, reading the resume data 162 from the HMB 160, validating the resume data 162, and using the resume data 162 to resume operation of the non-volatile memory device 110 in response to successful validation. If the validation fails (and/or resume data 162 cannot be read from the HMB 160), the transition manager 126 may resume operation of the non-volatile memory device 110 by use of data read from the NV memory 130. In some embodiments, the transition manager 126 may not generate validation data 163 and/or may resume operation using resume data 162 read from the HMB 160 without verifying the resume data 162 read therefrom. In some embodiments, the host computing system 140 may guarantee consistency of the contents of the HMB 160 (e.g., may not reclaim the HMB 160 and/or otherwise modify the contents thereof until the HMB 160 is released by the non-volatile memory device 110). In such embodiments, the transition manager 126 may be configured to write resume data 162 to the HMB 160 without generating corresponding validation data 163 and/or may use the resume data 162 read back from the HMB 160 without validating the resume data 162. In some embodiments, the host computing system 140 may implement an NV set features command, which may indicate whether contents of the HMB 160 returned to the non-volatile memory device 110 following transition to a low-power state are the same as the contents of the HMB 160 allocated to the non-volatile memory device 110 prior to transitioning to the low-power state.

As disclosed above, the controller 120 may comprise ODM 112, which may be used to store, inter alia, potions of the operating state 123 of the non-volatile memory device 110. The ODM 112 may comprise the AON partition 114, which may remain active during certain low-power states of the non-volatile memory device 110. When transitioning to a low-power state, the transition manager 126 may be configured to store validation data 163 (and/or address information) pertaining to the resume data 162 within the AON partition 114. In some power states, the AON partition 114 may not be powered (and the contents thereof may not be retained). When transitioning to such power states, the transition manager 126 may be configured to store the validation data 163 (and/or addressing information) pertaining to the resume data 162 in one or more other storage locations, which may include, but are not limited to: the HMB 160, a register of the non-volatile memory device 110, a register of the interconnect 147, the NV memory 130, another component of the non-volatile memory device 110 (e.g., the ODPS 133), another device accessible via the interconnect 147, and/or the like.

In some embodiments, the non-volatile memory device 110 further comprises a power management controller (PMIC) 124, which may be configured to regulate power used by the non-volatile memory device 110 (e.g., regulate power consumed by the controller 120, NV memory 130, ODM 112, AON partition 114, and/or the like). PMIC 124 may be embodied separately from the controller 120 (e.g., may be located on and/or embodied within a different chip, plane, die, and/or component from the controller 120). When transitioning to a power state in which the contents of the ODM 112 (and AON partition 114 thereof) will be lost, the transition manager 126 may store the validation data 163 (and/or addressing information) for the resume data 162 within one or more storage locations of the PMIC 124. The PMIC 124 may be configured to retain the contents of the storage locations during the low-power states (and while the ODM 112 and AON partition 114 are powered off). The transition manager 126 may resume from the low-power state by, inter alia, reading the validation data 163 (and/or addressing information) from the PMIC 124, accessing the resume data 162 from the host computing system 140, validating the resume data 162, and loading the resume data 162 into the ODM 112 in response to successful validation.

In some embodiments, the storage locations of the PMIC 124 may be subject to loss due to power-cut conditions (when power is cut to the non-volatile memory device 110, such that the ODM 112, AON partition 114, and/or the like are unpowered). When transitioning to a "power-cut" state, the transition manager 126 may be configured to store the validation data 163 (and/or addressing information) for the resume data 162 in other storage locations, such as the NV memory 130, ODPS 133, a non-transitory storage resource 144 of the host computing system 140, another device coupled to the interconnect 147, and/or the like. Alternatively, or in addition, the transition manager 126 may configure the host computing system 140 (and/or driver(s) 128 of the non-volatile memory device 110) to provide the addressing information thereto. As disclosed above, the host computing system 140 may implement an NV set features command configured to, inter alia, return the HMB 160 to the non-volatile memory device 110 following transition for a low-power state (e.g., an RTD3 power state, as disclosed in further detail herein). Returning the HMB 160 may comprise notifying the non-volatile memory device 110 that the HMB 160 is available and/or providing addressing information for the HMB 160. The notifying may further comprise indicating whether contents of the HMB 160 were modified at the host computing system 140 (while the non-volatile memory device 110 was in the low-power state). Alternatively, or in addition, the notifying may comprise providing addressing information pertaining to the HMB 160 in a register associated with the interconnect 147 (e.g., in a designated PCIe register). In some embodiments, the transition manager 126 is further configured to transition to low-power states and/or resume operation from low-power states independent of command(s) received from the host computing system 140. In some embodiments, the controller 120 (and/or PMIC 124) may transition the NV memory device 110 to a low-power state in response to a particular condition, such the NV memory device 110 being idle for a threshold period of time (e.g., the link between the NV memory device 110 and the host computing system 140 being idle for a determined period of time). The controller 120 (and/or PMIC 124) may be further configured to resume operation from a low-power state in response to a resume condition (e.g., detecting an issue and/or operation that involves interaction between the NV memory device 110 and the host computing system 140).

Figure 2:
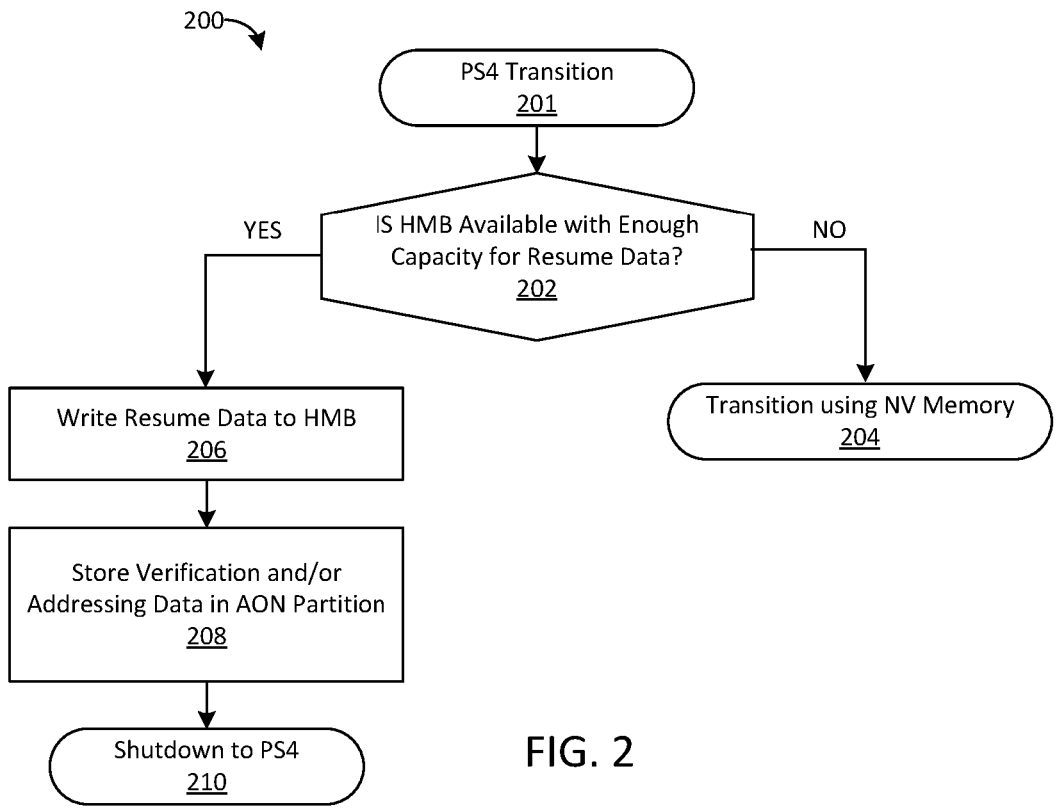
FIG. 2 is a flow diagram illustrating one embodiment of a method for transitioning a memory device to a low-power state.

FIG. 2 is a flow chart illustrating one embodiment of a method 200 for transitioning to a low-power state (e.g., PS4 power state). Step 201 may comprise initiating a transition from a current power state (e.g., an active power state, such as PS0) to the low-power state. Step 201 may comprise receiving a command via the interconnect 147, PMIC 124, and/or the like (e.g., an NVMe set features command specifying the PS4 power state, or the like). Step 201 may further comprise generating resume data 162 for the non-volatile memory device 110. The resume data 162 may comprise, inter alia, the contents of the ODM 112, as disclosed herein. The resume data 162 may further comprise active firmware, interconnect information, and/or the like, as disclosed herein.

Step 202 may comprise determining whether the HMB 160 is available for use by the non-volatile memory device 110, and whether the HMB 160 is sufficient to store the resume data 162 for the non-volatile memory device 110 (e.g., store the contents of the ODM 112 and/or other operating state 123 data). Step 202 may be implemented by the transition manager 126, as disclosed herein. The transition manager 126 may determine whether the HMB 160 is available by checking whether the HMB 160 has been provisioned to the non-volatile memory device 110 by the computing system 140. The transition manager 126 may determine whether the capacity of HMB 160 is sufficient to store the needed SRAM contents by comparing a size of the HMB 160 to the size of the resume data 162 (and/or the amount of space used in the ODM 112 to store the resume data 162). As disclosed above, the resume data 162 may include, but is not limited to: contents 113 of the ODM 112, such as portions of the FTL, the state of one or more registers and/or data structures of the controller 120, and so on. Transient write buffers maintained in the ODM 112 may be excluded from the resume data 162, and not written to the HMB 160.

If the determination of step 202 is that there is insufficient space in the HMB 160 and/or the HMB 160 is not available, the flow may continue at step 204. At step 204, the contents of the ODM 112 may be stored in the NV memory 130 (or other non-transitory storage location).

If the determination of step 202 is that there is sufficient space in the HMB 160 for the resume data 162, the flow may continue at step 206. Step 206 may comprise writing the resume data 162 (e.g., contents of the ODM 112 and/or other operating state 123 data) to the HMB 160. Step 206 may be implemented by the transition manager 126, as disclosed herein. The transition manager 126 may be configured to generate the resume data 162 and/or transfer the resume data 162 to the HMB 160 via the interconnect 147.

Step 208 may comprise storing the validation data 163 and/or addressing information for the resume data 162. Step 208 may comprise storing the validation data 163 (and/or addressing information) within the AON partition 114 of the ODM 112. The validation data 163 may comprise parity information corresponding to the contents of the ODM 112. The addressing information may comprise a host location pointer that points to the stored resume data 162 within the memory environment 150 of the host computing system 140. In some embodiments, step 208 may comprise writing the validation data 163 (and/or addressing information) to a different storage location, such as a register of the non-volatile memory device 110, a register of the interconnect 147, the NV memory 130, the PMIC 124, another component of the non-volatile memory device 110, another device accessible via the interconnect 147, and/or the like. Step 208 may be performed by the transition manager 126, as disclosed above, which may comprise calculating parity or other error detecting codes for the resume data 162.

Step 210 may comprise transitioning the non-volatile memory device 110 to the PS4 state. Transitioning to the PS4 state may comprise shutting down power to the controller 120 or other components of the non-volatile memory device 110. Step 210 may further comprise maintaining a minimal amount of power, such that the contents of the AON partition 114 of the ODM 112 are preserved while the non-volatile memory device 110 is in the PS4 state (e.g., the validation data 163 and/or addressing information of the resume data 162).

As disclosed above, the resume data 162 written to the HMB 160 may comprise active firmware code, NVMe state information, and/or the like. In these embodiments, the initial code used to reinitialize controller 120 and/or the interconnect 147 (e.g., PCIe interface) may be retained in a boot ROM of the controller 120 or other storage location. Alternatively, the initial code may be retained in the NV memory 130.

Figure 3:
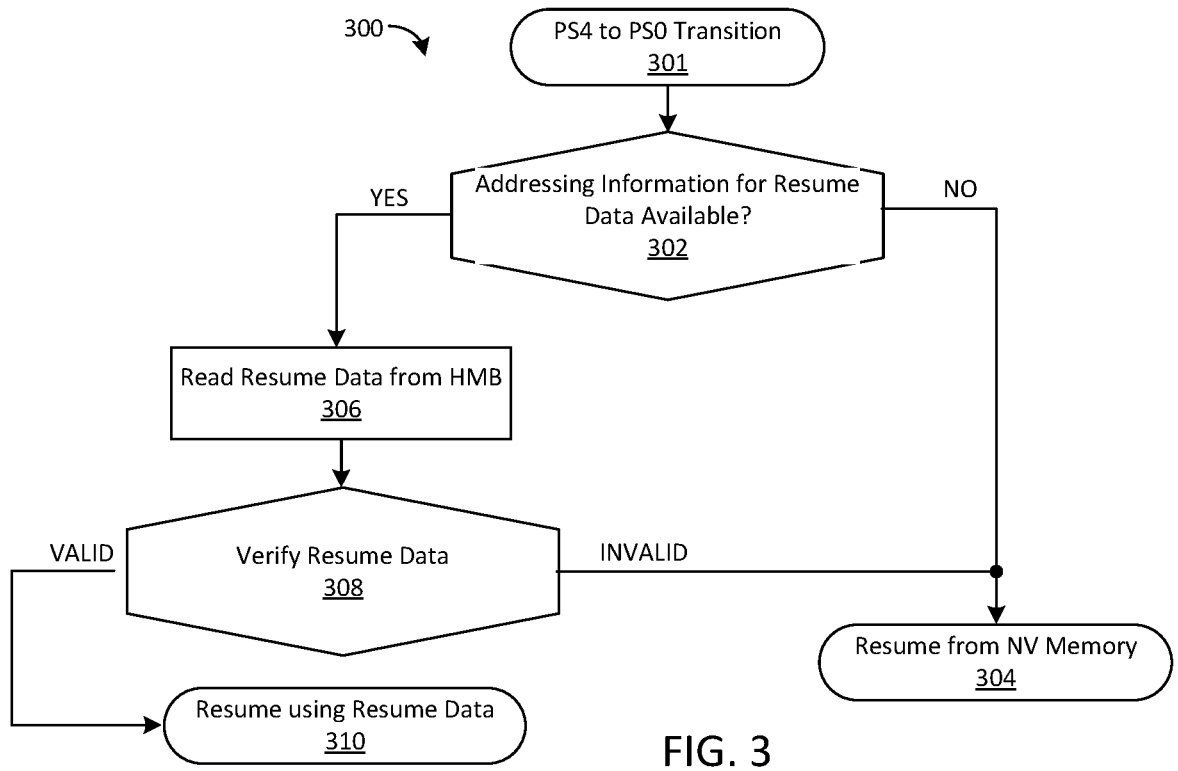
FIG. 3 is a flow diagram illustrating one embodiment of a method for transitioning from a low-power state to an operational state.

FIG. 3 is a flow diagram of one embodiment of a method 300 for resuming from a low-power state. Step 301 may comprise initiating a transition from a low-power state to an operational state (e.g., transitioning from the PS4 power state to the PS0 power state). Step 301 may be initiated in response to receiving a command via the interconnect 147, PMIC 124, and/or the like (e.g., an NVMe set features command from the host computing system 140 specifying the PS0 power state).

Step 302 may comprise determining whether the AON partition 114 comprises address information of the resume data 162 for the non-volatile memory device 110 (e.g., a host location pointer). Step 302 may be implemented by the transition manager 126 reading the AON partition 114 to determine whether addressing information is present therein. In some embodiments, step 302 may further comprise accessing another storage location, such as a register of the non-volatile memory device 110, a register of the interconnect 147, the NV memory 130, the PMIC 124, another component of the non-volatile memory device 110, another device accessible via the interconnect 147, and/or the like. If the determining of step 302 indicates that addressing information for the resume data 162 is not available, the flow may continue to step 304. Step 304 may comprise resuming operation of the non-volatile memory device 110 from the NV memory 130, as disclosed herein. Step 304 may be performed by the transition manager 126 reading the necessary data from the NV memory 130 and initializing the ODM 112 (and/or other operating state 123 information) accordingly.

If the determining of step 302 indicates that addressing information for the resume operation is available (in the AON partition 114, PMIC 124, and/or other storage location), the flow may continue at step 306. Step 306 may comprise reading the resume data 162 (e.g., bootstrap data) from the HMB 160. Step 306 may be performed by the transition manager 126 reading the contents of the HMB 160 at the location specified by the addressing information of step 302.

Step 308 may comprise verifying the resume data 162 read from the HMB 160 at step 306. Step 308 may be performed by the transition manager 126 comparing parity or other validation data derived from the resume data 162 read from the HMB 160 at step 306 to the validation data 163 stored within the AON partition 114 (and/or other storage location, such as a register of the non-volatile memory device 110, a register of the interconnect 147, the NV memory 130, the PMIC 124, another component of the non-volatile memory device 110, another device accessible via the interconnect 147, and/or the like). If the resume data 162 is determined to be invalid, the flow may continue at step 304, where the non-volatile memory device 110 may resume operation by use of data stored within the NV memory 130, as disclosed herein. If the determining of step 308 indicates that the resume data 162 is valid, the flow may continue at step 310. Step 310 may comprise using the resume data 162 read from the HMB 160 to resume operation of the non-volatile memory device 110. The resume data 162 may be loaded into the ODM 112, as disclosed herein. Step 310 may be implemented by the transition manager 126 initializing the controller 120 using the resume data 162 read from the HMB 160 prior to the transition to PS4 state.

According to another aspect of the subject matter disclosed herein, the transition manager 126 may be configured to transition the non-volatile memory device 110 to a run time 03 (RTD3) state. In RTD3 main power may be removed from the controller 120. Auxiliary power may or may not be provided (e.g., the PMIC 124 may or may not be powered). Accordingly, transitioning to the RTD3 state may comprise a full shutdown (power off) of the non-volatile memory device 110 followed by a full startup sequence. Since the non-volatile memory device 110 is required to fully power off, the AON partition 114 may not be available to store the validation data 163 and/or addressing information (the contents of the AON partition 114, including any parity data and/or pointer information stored therein, will be lost when the non-volatile memory device 110 is powered down in the RTD3 state). The PMIC 124 may also be powered down (making the storage locations thereof unsuitable for storage of the validation data 163 and/or addressing information pertaining to the resume data 162). The transition manager 126 may be configured to implement the RTD3 transition by, inter alia, generating the resume data 162 as disclosed herein (from the contents of the ODM 112 and/or other data pertaining to the operating state 123 of the non-volatile memory device 110), storing the resume data 162 in the HMB 160, storing the validation data 163 (and/or addressing information) for the resume data 162 in an alternative storage location, which may comprise one or more of the NV memory 130, an EEPROM, a non-transitory storage resource(s) 144 of the host computing system 140, within another device accessible via the interconnect 147, and/or the like). The transition manager 126 may be configured to resume operation in accordance with the method 300 disclosed above, which may comprise reading addressing information and/or the validation data 163 for the resume data 162 from the alternative storage location.

According to yet another aspect of the subject matter disclosed herein, the transition manager 126 may be configured to store the validation data 163 (and/or addressing information) pertaining to the resume data 162 in the HMB 160. The transition manager 126 may be configured to transition to a low-power state per method 200, disclosed above. Step 208 may, however, comprise writing the validation data 163 (and/or addressing information) for the resume data 162 to the HMB 160. The validation data 163 (and/or addressing information) may be stored at a predetermined location and/or offset within the memory environment 150 of the computing system 140. The transition to the RTD3 state may comprise the host computing system 140 reclaiming the HMB 160. The HMB 160 may be reallocated to the non-volatile memory device 110 when transitioning from the RTD3 state to a higher-power state. The reallocation may comprise provisioning the same range of memory addresses to the non-volatile memory device 110, such that the "reallocated" HMB 160 comprises the same memory address range(s) as the HMB 160 previously allocated to the non-volatile memory device 110. The reallocation may further comprise indicating whether the contents of the HMB 160 were modified during the transition to and/or from the low-power state. In some embodiments, the host computing system 140 may be configured to reclaim the HMB 160 prior to transitioning to the RTD3 state and provide the previously allocated HMB 160 to the non-volatile memory device 110 (with the contents unchanged) after the reset completes. The host computing system 140 may be configured to "return" the HMB 160 to the non-volatile memory device 110 by use of, inter alia, an NVMe set features command. The NVMe set features command notifying the non-volatile memory device 110 of the return of the HMB 160 may indicate whether the HMB 160 being returned is the same as the HMB 160 previously allocated to the non-volatile memory device 110 (i.e., whether the HMB 160 comprises the same set of memory address ranges and/or whether the contents of such memory address ranges were modified). The NVMe set features command may comprise a bit, flag, or other indicator (e.g., a "memory return" flag, "reclaim" bit, or the like). If the HMB 160 comprises the same contents as the HMB 160 previously allocated to the non-volatile memory device 110 the "memory return," "reclaim," or other indicator may be asserted. If the HMB 160 and/or contents thereof were modified, the "memory return," "reclaim," or other indicator may be de-asserted.

The transition manager 126 may be further configured to resume operation from the RTD3 state by, inter alia, implementing a partial initialization of the non-volatile memory device 110. The partial initialization may comprise loading a small firmware bootstrap from the NV memory 130 (and/or an alternative storage location), and then resuming full operation of the non-volatile memory device 110 after the host reinitializes the HMB 160. The host computing system 140 may reinitialize the HMB 160 following the RTD3 state, and notify the non-volatile memory device 110 that the HMB 160 has been returned thereto. The notification may comprise an indication of whether the contents of the HMB 160 were changed, as disclosed above (e.g., by use of a "memory return," "reclaim," or other indicator). If the contents of the HMB 160 were unmodified, the transition manager 126 may read the resume data 162 from the HMB 160, verify the resume data 162, and/or use the resume data 162 to efficiently resume operation of the non-volatile memory device 110, as disclosed herein. If the contents of the HMB 160 were modified (and/or the resume data 162 is determined to be invalid), the transition manager 126 may resume operation by use of data stored on the NV memory 130 (and/or other non-volatile storage locations).

Figure 4:
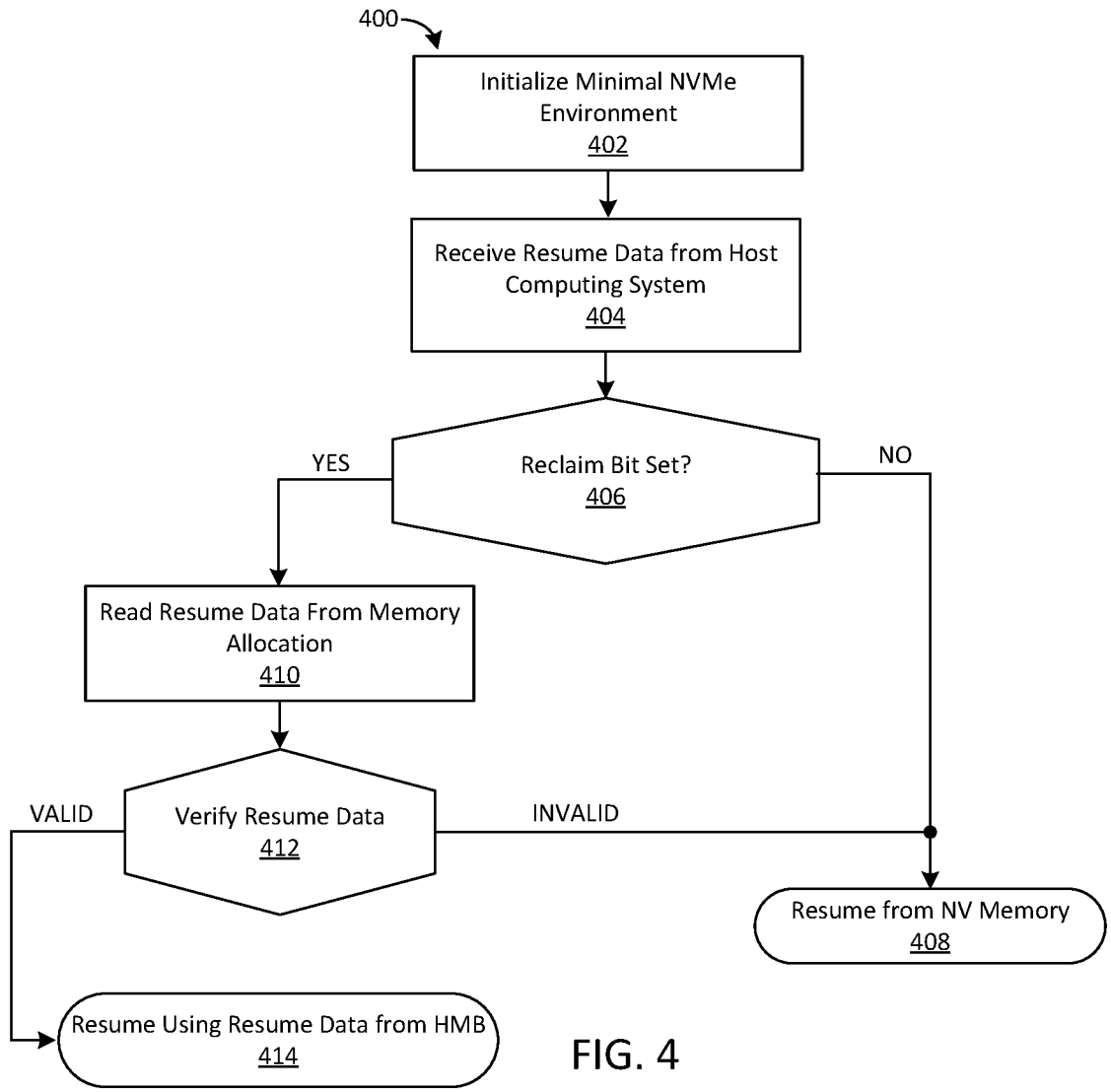
FIG. 4 is a flow diagram illustrating another embodiment of a method for transitioning from a low-power state to an operational state.

FIG. 4 is a flow diagram of another embodiment of a method 400 for resuming operation of the non-volatile memory device 110 from a low-power state. In the FIG. 4 embodiment, the non-volatile memory device 110 may have previously stored resume data 162 and corresponding validation data 163 in the HMB 160, as disclosed herein. The method 400 may comprise resuming from a low-power state, such as RTD3 or the like, as disclosed herein. Step 401 may comprise initiating a startup or transition of the non-volatile memory device 110 to a higher-power state (e.g., an operational state, such as PS0). Step 402 may comprise initializing a minimal NVMe environment (an NVMe administrative environment), which may comprise loading firmware for the non-volatile memory device 110 and/or controller 120 from the NV memory 130, EEPROM, ROM, and/or the like. Step 402 may be implemented by the transition manager 126 reading the appropriate firmware from the NV memory 130 (and/or other storage location), and loading the firmware into the ODM 112 of the non-volatile memory device 110.

In step 404, the transition manager 126 may determine that the host computing system 140 has reallocated the HMB 160 to the non-volatile memory device 110. Step 404 may comprise receiving a notification pertaining to the HMB 160 at the non-volatile memory device 110. The notification may be communicated to the non-volatile memory device 110 from the host computing system 140 (e.g., via the interconnect 147). The notification of step 404 may comprise an NVMe set features command, as disclosed herein.

Step 406 may comprise determining whether the notification of step 404 indicates that the contents of the HMB 160 were unchanged. Step 406 may comprise determining whether a "memory return," "reclaim," and/or other indicator is present and/or asserted in the NVMe set features command pertaining to the HMB 160 (e.g., the NVMe command of step 404). Step 406 may comprise the transition manager 126 reading the NVMe set features command to determine the state of the one or more bits, indicators, flags, and/or the like, as disclosed herein. If the determination of step 406 indicates that a different HMB 160 was returned to the non-volatile memory device 110 (and/or the contents of the HMB 160 were modified), the flow may continue to step 408. Step 408 may comprise resuming operation by use of data read from the NV memory 130 (and/or other persistent storage), as disclosed herein.

If the determination of step 406 indicates that the same HMB 160 was returned to the non-volatile memory device 110 (and/or that the contents thereof were unmodified), the flow may continue at step 410. Step 410 may comprise reading the resume data 162 from the HMB 160, as disclosed herein. Step 410 may further comprise reading the validation data 163 and/or addressing information for the resume data 162 from the HMB 160 (e.g., from a predetermined offset and/or location within the HMB 160). The validation data 163 (and/or addressing information) may be read out from the HMB 160 in response to determining that the unmodified HMB 160 was returned to the non-volatile memory device 110 at step 406. Step 412 may comprise verifying the integrity of the resume data 162 read from the HMB 160 (by use of the validation data 163). Step 412 may be implemented by the transition manager 126 comparing stored validation data 163 corresponding to the resume data 162 to the validation data 163 calculated from the resume data 162 retrieved from the HMB 160. The validation data 163 may be obtained from one or more of the HMB 160, a register of the non-volatile memory device 110, a register of the interconnect 147, the NV memory 130, another device (e.g., another component of the non-volatile memory device 110, another device accessible via the interconnect 147, etc.), and/or the like.

If the comparing indicates that the resume data 162 is invalid, the flow may continue at step 408, where the non-volatile memory device 110 may resume operation by use of data read from the NV memory 130 (and/or other persistent storage), as disclosed herein. If the comparing indicates that the resume data 162 is valid, the flow may continue at step 414.

Step 414 may comprise resuming operation of the non-volatile memory device 110 by use of the resume data 162 retrieved from the HMB 160, as disclosed herein. Step 414 may comprise the transition manager 126 populating the ODM 112 with the resume data 162, and so on, as disclosed herein.

As disclosed above, the transition manager 126 may be configured to read the validation data 163 and/or addressing information pertaining to the resume data 162 from the HMB 160. As described below in connection with FIG. 5, the host computing system 140 may provide the non-volatile memory device 110 with addressing information pertaining to the resume data 162 (and/or corresponding validation data 163) within the HMB 160 by, inter alia, writing such information to a device register, such as a PCIe register or the like (which may obviate the need for a separate read-out operation(s) to obtain such data).

Figure 5:
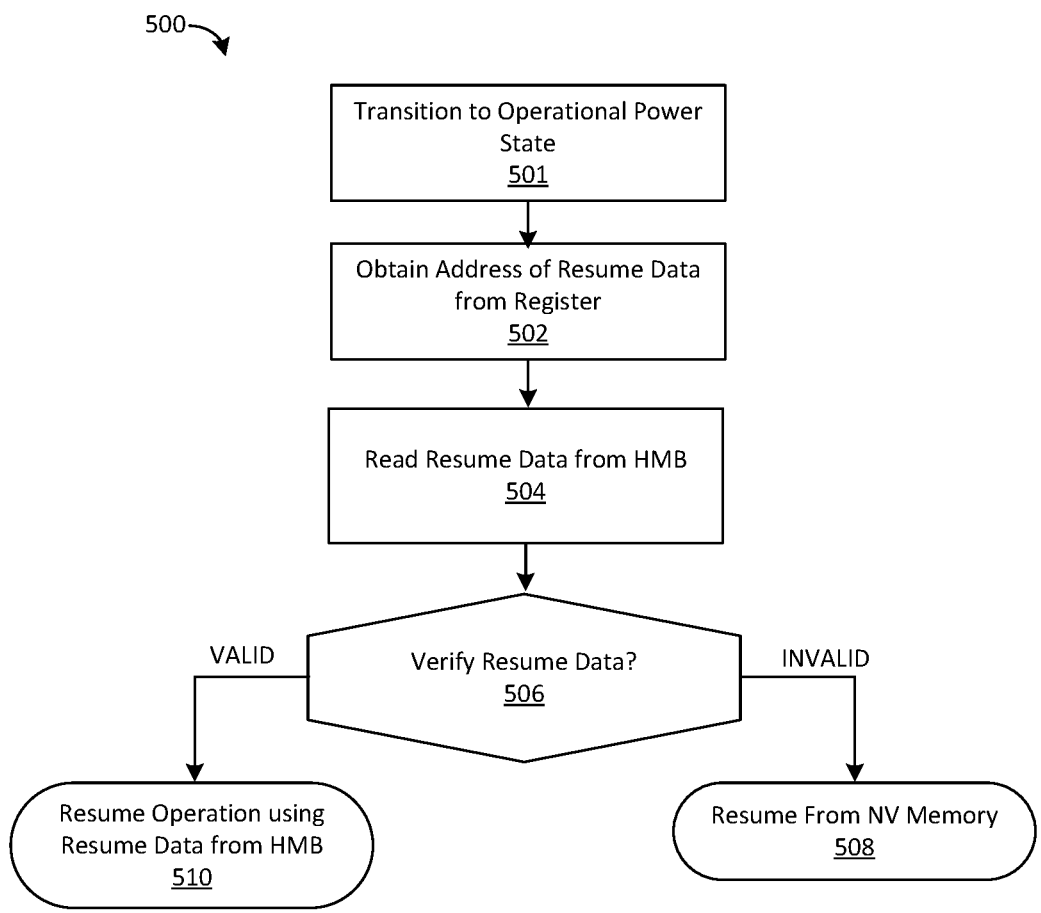
FIG. 5 is a flow diagram illustrating another embodiment of a method for transitioning from a low-power state to an operational state.

FIG. 5 is a flow diagram illustrating another embodiment of a method 500 for resuming from a low-power state, such as a RTD3 state. In the FIG. 5 embodiment, the non-volatile memory device 110 may have previously stored resume data 162 and corresponding validation data 163 in the HMB 160 allocated thereto. Step 501 may comprise transitioning to an operational state from a lower-power state (e.g., from a RTD3 power state). Step 501 may comprise initiating a startup and/or resume routine in response to a command received at the non-volatile memory device 110.

Step 502 may comprise receiving address information pertaining to the resume data 162 and/or corresponding validation data 163. Step 502 may comprise the host computing system 140 writing the address information to a pre-determined PCIe register (e.g., a register pertaining to the interconnect 147). Step 502 may further comprise notifying the non-volatile memory device 110 that the address information is available within the PCIe register.

Step 504 may comprise the transition manager 126 using the address information to retrieve resume data 162 and/or corresponding validation data 163 from the HMB 160. Step 506 may comprise validating the resume data 162 read from the HMB 160, as disclosed herein. Step 506 may be implemented by the transition manager 126 by, inter alia, deriving the validation data 163 from the resume data 162 retrieved from the HMB 160, and comparing the derived validation data 163 to the validation data 163 retrieved from the HMB 160. If the verification of step 506 indicates that the resume data 162 is invalid, the flow may continue at step 508 where the transition manager 126 may resume operation by use of data stored within the NV memory 130 (and/or other persistent storage).

If the verification of step 506 indicates that the resume data 162 is valid, the flow may continue at step 510. Step 510 may comprise resuming operation of the non-volatile memory device 110 by use of the resume data 162, which may comprise the transition manager 126 loading the resume data 162 into the ODM 112, as disclosed herein.

Referring back to FIG. 1, in some embodiments, the ODM 112 may comprise dynamic RAM (DRAM) and, as such, may have a larger storage capacity than the ODM 112 implemented using only SRAM. The DRAM comprising the ODM 112 may be powered off when the non-volatile memory device 110 transitions to certain low-power states and, as such, may be unusable to store the resume data 162 for the non-volatile memory device 110. The transition manager 126 may be configured to store the resume data 162 for the non-volatile memory device 110 in the HMB 160, as disclosed herein. The resume data 162 may comprise, inter alia, selected contents of the ODM 112, which may include contents of the SRAM and/or portions of the contents of the DRAM. As such, the resume data 162 for the non-volatile memory device 110 having the ODM 112 comprising DRAM may be significantly larger than the resume data 162 for the non-volatile memory device 110 comprising a smaller ODM 112 than SRAM. The transition manager 126 may be configured to intelligently distinguish DRAM data that should be included in the resume data 162 (and stored in the HMB 160) to allow fast resume, from DRAM data that can be excluded from the resume data 162 (and be stored only in on the NV memory 130). In some embodiments, the transition manager 126 may be configured to include modified FTL tables and/or uncommitted write coalescing buffers in the resume data 162.

Figure 6:
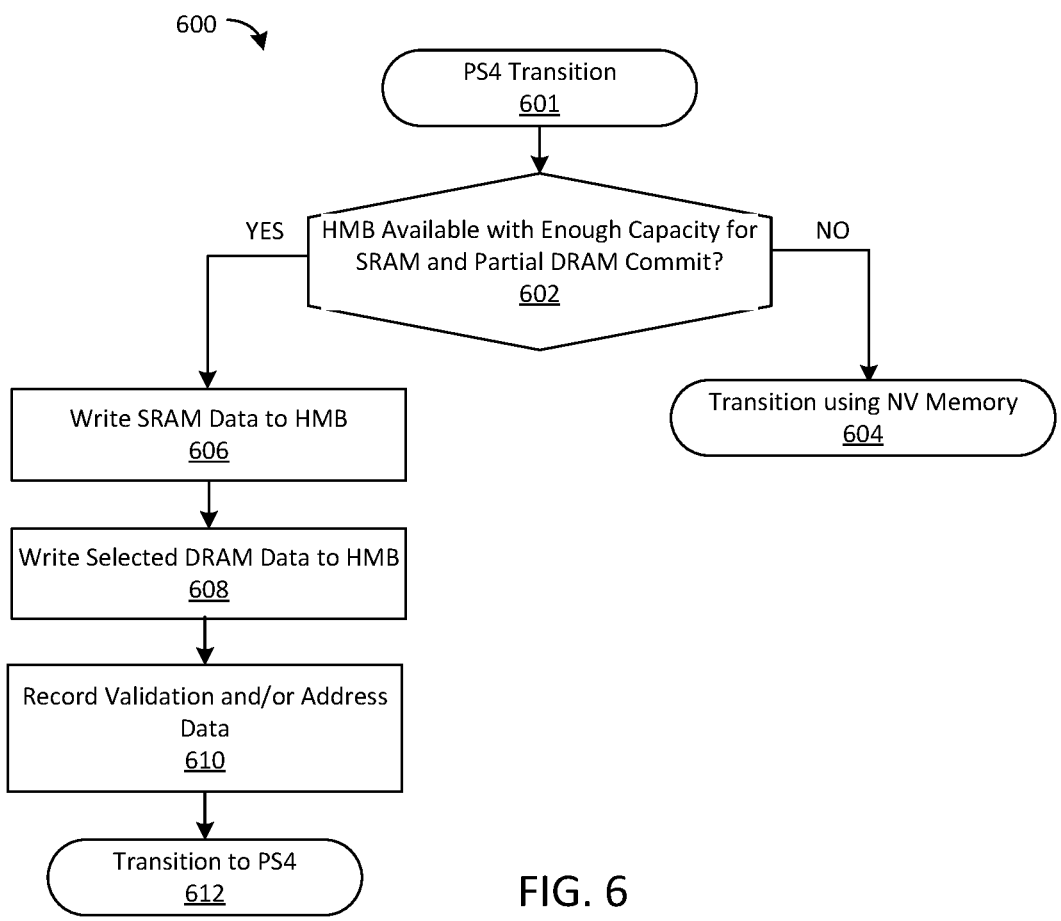
FIG. 6 is a flow chart illustrating another embodiment of a method for transitioning a memory device to a low-power state.

FIG. 6 is a flow diagram illustrating one embodiment of a method 600 for transitioning the non-volatile memory device 110 comprising DRAM ODM 112 to a low-power state. Step 601 may comprise initiating a transition to a low-power state from an operating power state, such as a transition from the PS0 power state to the PS4 power state. Step 601 may comprise receiving a command at the non-volatile memory device 110 via the interconnect 147, as disclosed herein.

Step 602 may comprise determining whether the HMB 160 has been allocated to the non-volatile memory device 110 and/or whether the HMB 160 is capable of storing resume data 162 for the non-volatile memory device 110. The resume data 162 may comprise data required to efficiently resume operation following the low-power state and may include, inter alia, selected contents 113 of the ODM 112, including selected contents of the SRAM and/or DRAM comprising the ODM 112. The resume data 162 may comprise substantially all of the contents of the SRAM and/or selected portions of the DRAM (e.g., dirty FTL tables selected other data). Step 602 may comprise the transition manager 126 selecting contents of the SRAM and/or DRAM required for initiating the transfer from the PS4 power state and determining whether there is sufficient space for committing the selected contents in the HMB 160. If the HMB 160 is not available and/or is incapable of storing the resume data 162, the flow may continue at step 604 where the resume data 162 may be committed to the NV memory 130 (and/or another persistent storage location).

If step 602 indicates that the HMB 160 is available and is capable of committing the resume data 162, the flow may continue to step 606. Step 606 may comprise writing substantially all of the contents of the SRAM to the HMB 160 (e.g., excluding transient write buffers, if any, as disclosed above). Step 608 may comprise writing selected contents of the DRAM to the HMB 160. Step 608 may comprise writing dirty FTL tables and/or other information from the DRAM to the HMB 160. As used herein, a "dirty FTL table" refers to an FTL table comprising modified logical-to-physical translation information that has not been written to the NV memory 130. Other examples of data that may be written from DRAM to the HMB 160 may include, but are not limited to: state information for various processes running in the controller 120, firmware overlays, partially staged metadata, and/or the like.

Step 610 may comprise recording the validation data 163 (and/or addressing information) pertaining to the resume data 162 written to the HMB 160 in steps 606 and/or 608. Step 610 may comprise recording the validation data 163 (and/or addressing information) in the AON partition 114 of the ODM 112. Alternatively, step 610 may comprise recording the validation data 163 (and/or addressing information) in another storage location, such as the PMIC 124, the HMB 160, the NV memory 130, another device accessible via the interconnect 147, and/or the like. Step 612 may comprise transitioning to the PS4 power state, as disclosed herein.

When resuming from the PS4 to the PS0 state, similar resume steps may be performed as the SRAM resume flows described above. Resuming from the PS4 power state may comprise: a) determining whether the AON partition 114 (and/or other storage location) comprises address information pertaining to the resume data 162 stored within the HMB 160, b) reading the resume data 162 from the HMB 160, c) validating the resume data 162 read from the HMB 160 by use of the recorded validation data 163, and/or d) using the validated resume data 162 to resume operation of the non-volatile memory device 110 (e.g., loading the resume data 162 into the SRAM and/or DRAM of the ODM 112). Resuming from a RTD3 state may comprise: a) receiving a notification that the HMB 160 has been returned to the non-volatile memory device 110 (and the contents thereof are unmodified), b) reading address information pertaining to the resume data 162 from the HMB 160, c) reading the resume data 162 from the HMB 160, d) validating the resume data 162, and/or e) using the validated resume data 162 to resume operation of the non-volatile memory device 110 (e.g., loading the resume data 162 into the SRAM and/or DRAM of the ODM 112). Alternatively, resuming from an RTD3 state may comprise: a) receiving an address of the resume data 162 from the host computing system 140 (e.g., in a PCIe register), b) reading the resume data 162 from the HMB 160, c) validating the resume data 162, and d) using the validated resume data 162 to resume operation of the non-volatile memory device 110 (e.g., loading the resume data 162 into the SRAM and/or DRAM of the ODM 112).

As disclosed above, transition to a low-power state may comprise a) generating resume data 162, and b) writing the resume data 162 to the HMB 160. Generating the resume data 162 and transferring the resume data 162 to the HMB 160 may require a substantial amount of time, particularly where the resume data 162 is relatively large. The preparation time required to generate and/or transfer the resume data 162 to the HMB 160 may increase the time required for the non-volatile memory device 110 to transition to a lower-power state.

Figure 7A:
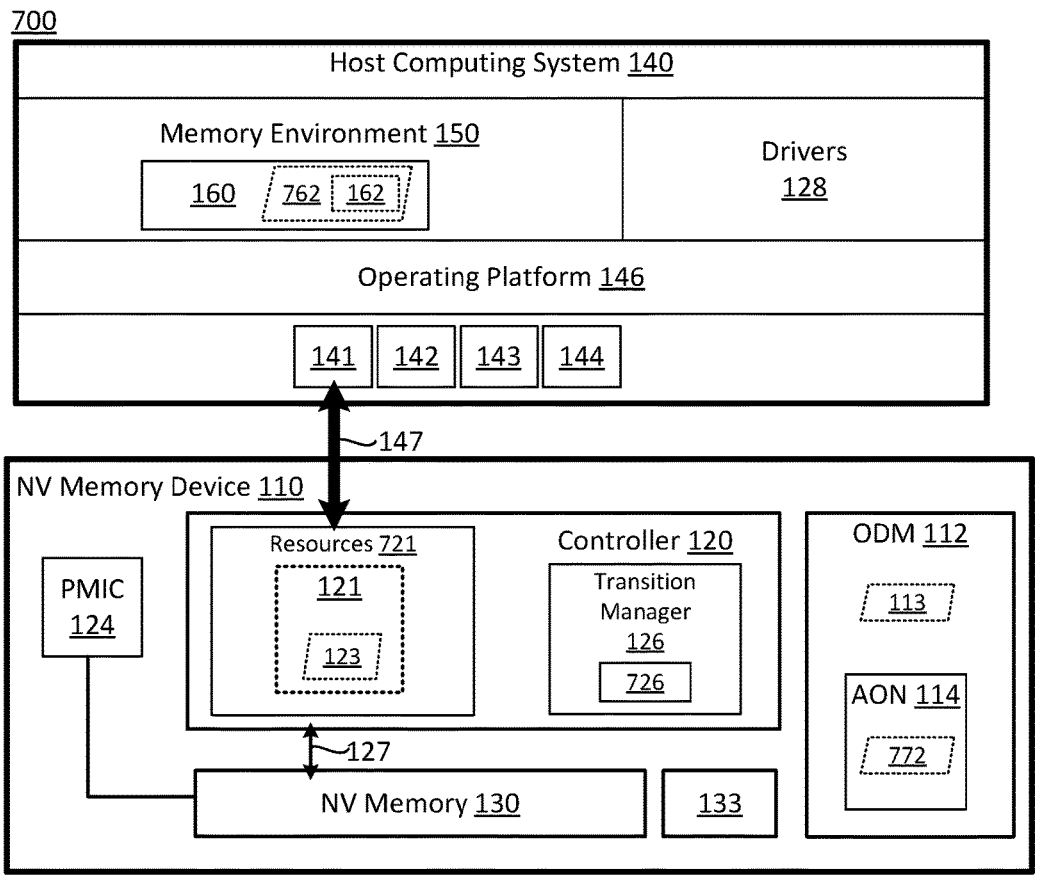
FIG. 7A is a schematic block diagram of a system comprising another embodiment of a memory device configured to leverage host memory to efficiently transition between power states.

FIG. 7A is a schematic block diagram of a system 700 comprising a non-volatile memory device 110 configured to efficiently transition between power states and, in particular, further reduce the latency for transitioning to low-power states. In the FIG. 7A embodiment, the controller 120 may be configured to implement one or more services 121, as disclosed herein. The services 121 may include, but are not limited to: processing services, interconnect services, NVMe services, back-end services, and/or the like. The operating state 123 of the non-volatile memory device 110 may correspond to and/or comprise information pertaining to an operating state of the respective services 121 being implemented by the non-volatile memory device 110.

The services 121 provided by the non-volatile memory device 110 may be implemented by use of resources 721 of the non-volatile memory device 110 and/or controller 120. The resources 721 may include, but are not limited to: device processing resources, device interconnect resources, NVMe resources, back-end (BE) resources, and/or the like. Device processing resources may include, but are not limited to: processing circuitry, a processing circuit, a processing unit, processing logic, a state machine, an ASIC, a micro controller, a programmable logic element, an FPGA, and/or the like, as disclosed herein. The processing resources may be embodied on one or more hardware components, circuits, chips, die, and/or the like. Device interconnect resources may be configured to communicatively couple the non-volatile memory device 110 to the interconnect 147 and/or host computing system 140, as disclosed herein. The device interconnect resources may comprise bus interface logic, a bus controller, bus arbitration logic, direct memory access (DMA) components, and/or the like. NVMe resources may be configured to implement one or more NVMe standards and/or protocols and may comprise and/or define one or more NVMe communication protocols, NVMe registers, NVMe data structures, NVMe queues, NVMe buffers, and/or the like. BE resources of the controller 120 may be configured to communicatively coupled to the NV memory 130 via, inter alia, the bus 127. The BE resources may be configured to implement storage operations on the NV memory 130 as directed by the controller 120, as disclosed herein. The BE resources may include, but are not limited to: NV memory control circuitry, on-chip and/or on-die control circuitry (e.g., control circuitry embodied on and/or within one or more die, chips, and/or planes of the NV memory 130), memory buffers, address decode circuitry, sense circuitry, bias circuitry, read circuitry, write circuitry, erase circuitry, processing logic, state machine circuitry, an ASIC, a micro controller, a programmable logic element, an FPGA, logical-to-physical translation circuitry, media management circuitry (e.g., a groomer, garbage collector, and/or the like), internal interconnect(s), and/or the like. The bus 127 may be configured to communicate data, commands, control information, and/or the like, between the controller 120 and NV memory 130. Portions of the BE resources may be implemented and/or embodied within the NV memory 130 (e.g., may comprise circuitry embodied on one or more NV memory chips, die, planes, and/or the like, such as an on-chip and/or on-die NV memory controller). The BE resources may be configured to maintain metadata pertaining to the NV memory 130, such as a translation layer, an FTL, a forward index, a reverse index, and/or the like. The resources 721 may comprise and/or be embodied as hardware components, which may include, but are not limited to: chips, packages, dies, interconnects, busses, processing logic, programmable logic (e.g., one or more FPGAs), and/or the like. The resources 721 may further comprise and/or be embodied as firmware and/or instructions for execution by one or more of the host processing resources 142, processing resources of the non-volatile memory device 110, and/or the like. In some embodiments, the resources 721 are embodied as design instructions, such as an firmware, configuration data (e.g., an FPGA bit stream), one or more VLSI design(s), interconnect specification(s), and/or the like.

In the FIG. 7A embodiment, the transition manager 126 may be configured to pre-populate the HMB 160 with the resume data 162 in preparation for a transition to a low-power state. As disclosed herein, the resume data 162 may be configured for resuming one or more of the services 121 of the non-volatile memory device 110. The resume data 162 may, therefore, correspond to the operating state 123 of the memory device and/or contents 113 of the ODM 112, as disclosed herein. Alternatively, or in addition, the resume data 162 may comprise metadata extracted from one or more of the resources 721 of the non-volatile memory device 110 (e.g., may comprise a PCIe configuration space, NVMe register values, NVMe buffers, FTL tables, and/or the like).

The transition manager 126 may be configured to pre-populate the HMB 160 independent of a request, command, determination, and/or other indication that the non-volatile memory device 110 is being transitioned to a low-power state (e.g., the transition manager 126 may pre-populate the HMB 160 during normal operation of the non-volatile memory device 110). In some embodiments, the transition manager 126 is configured to pre-populate the HMB 160 in response to determined condition(s) and/or trigger(s). The transition manager 126 may be configured to pre-populate the HMB 160 in response to initialization of the non-volatile memory device 110, e.g., in response to determining that the non-volatile memory device 110 has been initialized and that one or more of the services 121 implemented by the resources 721 of the non-volatile memory device 110 are operational and/or stable. Initialization of the non-volatile memory device 110 may comprise one or more of: operation of device processing services (e.g., loading active firmware into one or more processing resources of the non-volatile memory device 110), operation of interconnect services (e.g., establishing a link between the non-volatile memory device 110 and host computing system 140 via the interconnect 147 having, inter alia, a stable configuration space), initialization of one or more NVMe and/or back-end services (e.g., initializing one or more NVMe registers, data structures, queues, buffers, FTL, groomer process, etc.), and/or the like.

Pre-populating the HMB 160 may comprise generating resume data 162 for the non-volatile memory device 110, as disclosed herein. The resume data 162 generated to pre-populate the HMB 160 in preparation for a future transition to a low-power state may be referred to as a resume snapshot 762. A resume snapshot 762 may be generated at a particular time. The resume data 162 of the resume snapshot 762 may, therefore, correspond to the operating state 123 of the non-volatile memory device 110 at the particular time. A resume snapshot 762 may be generated prior to the non-volatile memory device 110 transitioning to a low-power state (and independent of a command, determination, and/or other indication that the non-volatile memory device 110 is being transitioned to a low-power state). The transition manager 126 may pre-populate the HMB 160 by, inter alia, a) generating a resume snapshot 762 for the memory device (the resume snapshot 762 comprising the resume data 162, as disclosed herein), b) transferring the resume snapshot 762 to the HMB 160, and/or c) recording the validation data 163 (and/or addressing information) pertaining to the resume snapshot 762, as disclosed herein. The validation data 163 (and/or addressing information) may be recorded in one or more of the AON partition 114 of the ODM 112, the HMB 160, the ODPS 133, the NV memory 130, the PMIC 124, and/or the like. In some embodiments, the PMIC 124 is configured to detect conditions in which the NV memory device 110 should transition to various different power states. The PMIC 124 may be configured to detect inactivity on the link between the NV memory device 110 and host computing system 140 (via the interconnect 140). The PMIC 124 may detect such inactivity by use of, inter alia, the resources 721 of the controller 120 (e.g., the interconnect resources 1220A and/or interconnect services 1221A, disclosed in further detail below). In response, PMIC 124 may issue a command and/or request that the NV memory device 110 transition to a low-power state, as disclosed herein. Alternatively, or in addition, other components of the NV memory device 110 may be configured to detect conditions for transitioning the NV memory device 110 to other power states and may issue corresponding requests, commands, messages, notifications, and/or the like. Accordingly, commands, requests, messages, notifications, and/or other indications to transition the NV memory device 110 to different power states may be received from components of the NV memory device 110 in addition to (and/or in place of), the host computing system 140.

Pre-populating the HMB 160 with a resume snapshot 762 may enable the transition manager 126 to reduce the latency for transitioning the non-volatile memory device 110 to a low-power state in response to a transition command (and/or in response to determining that the NV memory device 110 should transition to the low-power state due to, inter alia, inactivity on the interconnect 147 and/or link between the NV memory device 110 and the host computing system 140). In response to a transition command, the transition manager 126 may transition the non-volatile memory device 110 to the low-power state without first a) generating the resume data 162, b) recording corresponding validation data 163 (and/or addressing information), and/or c) transferring the resume data 162 to the HMB 160. Instead, the transition manager 126 may be configured to respond to transition commands virtually instantaneously (since the resume data 162 for the non-volatile memory device 110 is already stored within the resume snapshot 762 pre-populated within the HMB 160). Accordingly, the non-volatile memory device 110 of the FIG. 7A embodiment may be capable of transitioning to a low-power state substantially instantaneously (without the latency required to create the resume data 162 within the HMB 160). Commands to transition to a low power state may be issued by the host computing system 140. Alternatively, or in addition, such commands may be issued by the controller 120, PMIC 124, and/or transition manager 126 itself in response to one or more conditions (e.g., the NV memory device 110 being idle for a threshold period of time and/or the like).

The transition manager 126 may be configured to prevent pre-population of the HMB 160 from adversely impacting the performance of the non-volatile memory device 110 (e.g., without impacting the latency, throughput, available bandwidth, and/or the like). In some embodiments, the transition manager 126 is configured to create the resume snapshot 762 during idle periods (e.g., while the non-volatile memory device 110 is not actively implementing commands). The transition manager 126 may be further configured to pause pre-population of the HMB 160 in response to receiving one or more commands for execution at the non-volatile memory device 110. In some embodiments, the transition manager 126 is further configured to transfer the resume snapshot 762 to the HMB 160 during idle periods on the interconnect 147 and/or may pause transferring the resume snapshot 762 in response to detecting one or more requests pertaining to the interconnect 147.

The operating state 123 of the non-volatile memory device 110 may change over time, which may correspond to changes to the resume data 162 needed to accurately resume operation of the non-volatile memory device 110 from a low-power state. Accordingly, a resume snapshot 762 created at time t0 may not comprise the full set of the resume data 162 needed to successfully resume operation from a low-power state at a later time t1. More specifically, the resume snapshot 762 may not include changes to the resume data 162 corresponding to operations performed after the time the resume snapshot 762 was pre-populated within the HMB 160 (e.g., changes to the operating state 123 from time t0 onward). In some embodiments, the transition manager 126 is configured to pre-populate the HMB 160 with updated resume snapshots 762 in response to selected changes to the operating state 123 of the non-volatile memory device 110. The selected changes to the operating state 123 may comprise changes pertaining to the resume data 162 of the resume snapshot 762 (such that the previous resume snapshot 762 can no longer be used to accurately resume operation of the non-volatile memory device 110 from a low-power state). Pre-populating the HMB 160 with an updated resume snapshot 762 in response to each change may not be efficient, however (e.g., may require the transition manager 126 to update the resume snapshot 762 at a high rate, which may impose significant overhead on the non-volatile memory device 110, interconnect 147, and/or host computing system 140).

In some embodiments, pre-populating the HMB 160 may further comprise recording incremental changes to the resume snapshot 762. The changes may be accumulated in the AON partition 114 of the ODM 112 (and/or in another storage location). Recording the incremental changes to the resume snapshot 762 may enable the transition manager 126 to transition to low-power states immediately in response to transition commands, as disclosed above, despite changes to the operating state 123 of the non-volatile memory device 110 occurring after creation of the resume snapshot 762. In such embodiments, the transition manager 126 may be configured to resume from a low-power state by, inter alia, a) reading the resume snapshot 762 from the HMB 160, and b) resuming operation of the non-volatile memory device 110 using the resume snapshot 762 and the changes to the resume snapshot 762 accumulated within the AON partition 114 (and/or other storage location). The transitioning may further comprise validating the resume snapshot 762, pre-populating the HMB 160 with the modified resume snapshot 762, clearing the accumulated changes to the resume snapshot 762 from the AON partition 114 (and/or other storage location), and/or the like.

In some embodiments, the transition manager 126 may comprise a state monitor 726, which may be configured to detect changes to the operating state 123 of the non-volatile memory device 110 that pertain to the resume data 162 (and/or previously generated resume snapshot 762 pre-populated within the HMB 160). The state monitor 726 may be configured to record changes pertaining to the resume data 162 in delta metadata 772. The delta metadata 772 may be maintained within the ODM 112 (e.g., in the AON partition 114). The delta metadata 772 may specify changes pertaining to any suitable aspect of the non-volatile memory device 110 including, but not limited to: the controller 120, the NV memory 130, the operating state 123, device interconnect resources, device processing resources, NVMe resources, BE resources, and/or the like. In some embodiments, the state monitor 726 may be configured to detect changes to the contents 113 of the ODM 112, and may accumulate such changes within the delta metadata 772, as disclosed herein.

The transition manager 126 may be further configured to update the resume snapshot 762 stored within the HMB 160. The transition manager 126 may be configured to update the resume snapshot 762 in response to one or more trigger events, conditions, criteria, thresholds, and/or the like. In some embodiments, the transition manager 126 may be configured to update the resume snapshot 762 in response to accumulating a threshold amount of the delta metadata 772, accumulating a threshold number of changes, and/or the like. Alternatively, or in addition, the transition manager 126 may be configured to update the resume snapshot 762 periodically (e.g., after a threshold amount of time has elapsed since a previous version of the resume snapshot 762 was created within the HMB 160). Updating the resume snapshot 762 may comprise a) producing an updated resume snapshot 762, b) transferring the updated resume snapshot 762 to the HMB 160, and so on, as disclosed herein. Updating the resume snapshot 762 may further comprise recording the validation data 163 (and/or addressing information) corresponding to the updated resume snapshot 762, as disclosed herein. In some embodiments, updating the resume snapshot 762 may further comprise clearing the accumulated delta metadata 772 (e.g., removing the delta metadata 772 from the AON partition 114 of the ODM 112 and/or other storage location).

Figure 7B:
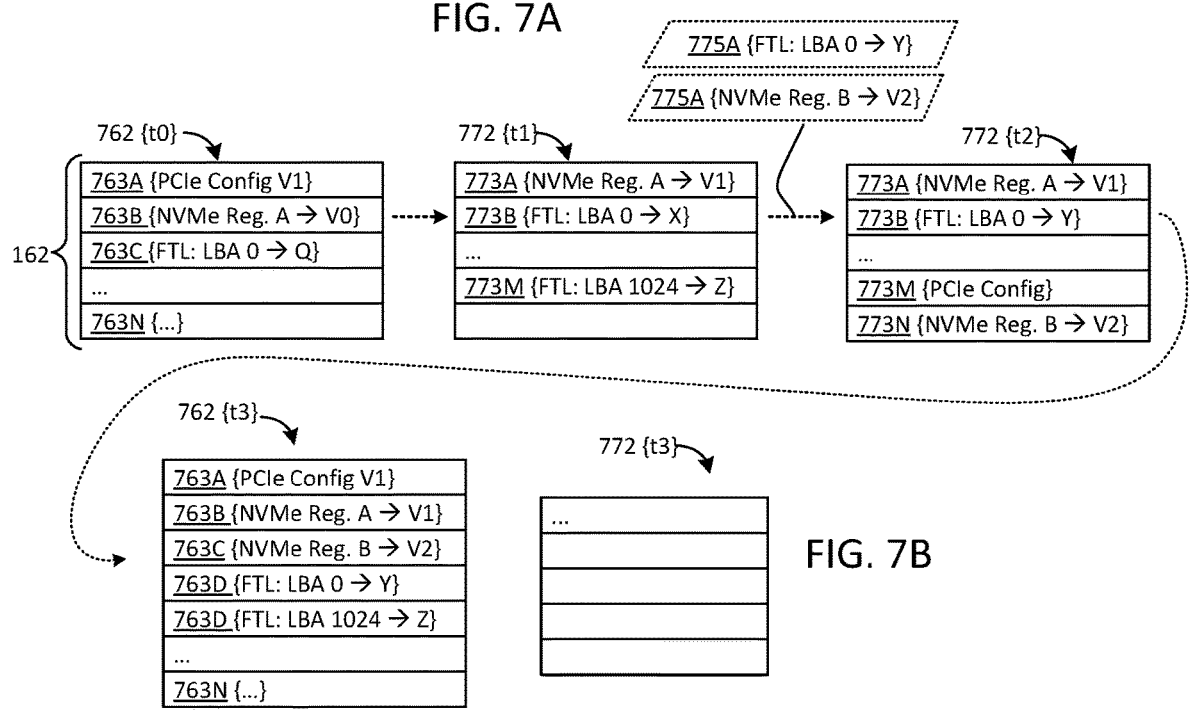
FIG. 7B depicts exemplary embodiments of a resume snapshot and delta metadata.

In some embodiments, the state monitor 726 may be further configured to manage updates to the delta metadata 772. The state monitor 726 may be configured to combine and/or coalesce updates that pertain to the same values and/or elements of the resume data 162. FIG. 7B depicts embodiments for managing the delta metadata 772. At time t0, the transition manager 126 may prepopulate the HMB 160 with the resume snapshot 762 (illustrated as resume snapshot 762 {t0} to indicate that the resume snapshot 762 {t0} was generated at time t0). The resume snapshot 762 {t0} may correspond to the operating state 123 of the non-volatile memory device 110 at time t0 (e.g., may comprise the resume data 162 to resume operation in accordance with the operating state 123 of the non-volatile memory device 110 at time t0). As illustrated in FIG. 7B, the resume snapshot 762 {t0} may comprise the resume data 162 for resuming operation of the non-volatile memory device 110 from a low-power state. The resume data 162 of the resume snapshot 762 {t0} may comprise any suitable resume data including, but not limited to: resume data pertaining to the controller 120, controller resource 721, such as device interconnect resources, device processing resources, NVMe resources, BE resources, and so on. As illustrated in FIG. 7B, the resume data 162 of the resume snapshot 762 {t0} may comprise a plurality of resume data elements (RDE) 763A-N, including: RDE 763A, which may define a PCIe configuration space for the non-volatile memory device 110; RDE 763B, which may define the value one or more NVMe registers (e.g., indicate that NVMe register A has value V1); RDE 763C, which may comprise a dirty FTL table mapping LBA 0 to physical address Q; and so on to RDE 763N. The transition manager 126 may generate the resume snapshot 762 {t0} and/or transfer the resume snapshot 762 {t0} to the HMB 160 in response to a trigger and/or condition, as disclosed herein (e.g., in response to initialization of the non-volatile memory device 110, to replace a previous resume snapshot 762, and/or the like).

The state monitor 726 may be configured to accumulate the delta metadata 772 corresponding to the resume snapshot 762 {t0} following time t0. The delta metadata 772 may be recorded within the AON partition 114 (and/or other storage location), as disclosed herein. FIG. 7B depicts the delta metadata 772 at time t1. At time t1 the delta metadata 772 {t1} may comprise delta entries 773A-M indicating, inter alia, changes to the resume snapshot 762 {t0}, which may include, but are not limited to: delta entry 773A, indicating a change to NVMe register A (to value V1); delta entry 773B, which may comprise a dirty FTL table associating LBA 0 with physical address X (rather than physical address Q); delta entry 773M, which may comprise another dirty FTL table associating LBA 1024 and physical address Z; and so on.

If the non-volatile memory device 110 were to receive a command to transition to a low-power state at time t1 (and/or shortly thereafter), the transition manager 126 could implement the transition immediately, without generating resume data 162 in response to the command, as disclosed herein. The transition manager 126 may be further configured to resume operation following the transition to the low-power state by, inter alia, reading the resume snapshot 762 {t0} from the HMB 160, and using the resume snapshot 762 {t0} and accumulated delta metadata 772 {t1} to resume operation. Resuming operation may comprise overwriting RDE 763A-N of the resume snapshot 762 {t0} with corresponding delta entries 773A-M of the delta metadata 772 {t1}, which may comprise setting the NVMe Reg. A to valid V1 rather than V0, mapping LBA 0 to physical address X rather than physical address Q, mapping LBA 1024 to physical address Z, and so on.

Absent a transition command (and/or other determination to transition to a low power state), the state monitor 726 may continue accumulating changes within the delta metadata 772. As illustrated in FIG. 7B, between time t1 and t2, the state monitor 726 may detect further changes to the operating state 123 and/or resume snapshot 762 {t0}, including change 775A to the dirty FTL table, associating LBA 0 with physical address Y, and a change 775B to set NVMe register B to value V2. The state monitor 726 may incorporate the changes 775A and 775B into the delta metadata 772 {t1} to thereby produce delta metadata 772 {t2}. Incorporating change 775A may comprise combining change 775A with the existing delta entry 773B (rather than adding a new delta entry 772 to the delta metadata 772 {t2}). The state monitor 726 may be further configured to add a new delta entry 773N to record change 775B, which may not correspond to an existing delta entry 773 of the delta metadata 772 {t1}.

As further depicted in FIG. 7B, the state monitor 726 may accumulate a threshold number of changes in the delta metadata 772 (at time t2). In response, the transition manager 126 may pre-populate the HMB 160 with an updated resume snapshot 762 (resume snapshot 762 {t3}). Pre-populating the HMB 160 with the updated resume snapshot 762 {t3} may comprise, inter alia, generating an updated resume snapshot 762 {t3} corresponding to the operating state 123 of the non-volatile memory device 110 at time t3. The updated resume snapshot 762 {t3} may be generated based on, inter alia, the contents 113 of the ODM 112, the operating state 123, and/or the like, as disclosed herein. Alternatively, or in addition, generating the updated resume snapshot 762 {t3} may comprise reading the previous resume snapshot 762 {t0} from the HMB 160 and applying the delta metadata 772 {t2} to the previous resume snapshot 762 {t0} to thereby generate the updated resume snapshot 762 {t3} (e.g., by modifying selected RDE 763A-N in accordance with corresponding delta entries 773A-N of the delta metadata 772 {t2}). Pre-populating the HMB 160 with the updated resume snapshot 762 {t3} may further comprise recording corresponding validation data 163 (and/or addressing information), clearing the AON partition 114 (e.g., clearing the delta entries 773A-N of the delta metadata 772 {t2}), and so on, as disclosed herein.

Figure 8:
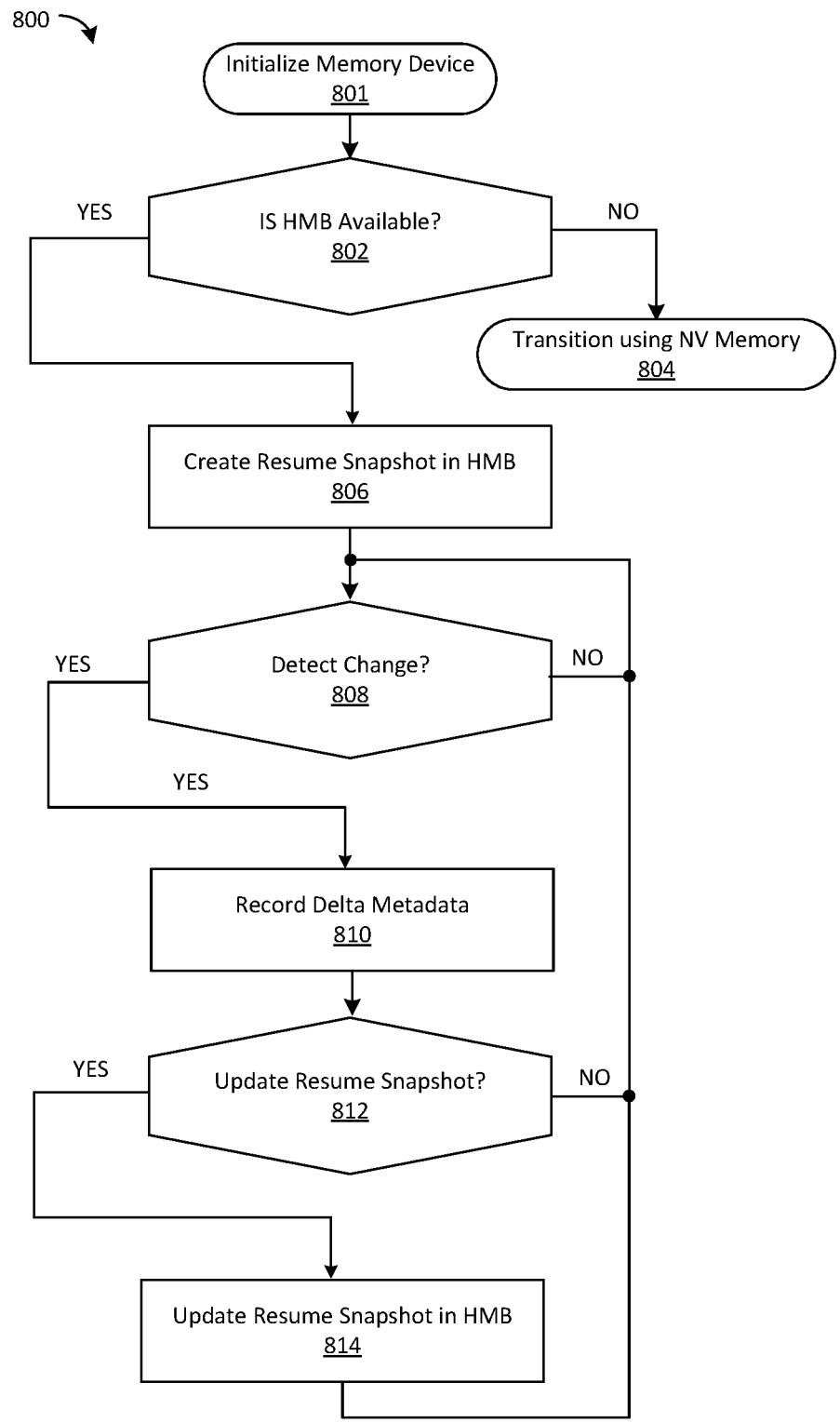
FIG. 8 is a flow diagram illustrating one embodiment of a method for pre-populating host memory with resume data pertaining to a memory device.

FIG. 8 is a flow diagram of another embodiment of a method 800 for leveraging host memory to transition between power states. Step 801 may comprise initializing the non-volatile memory device 110, as disclosed herein. Step 801 may comprise initializing the controller 120, the device interconnect resources (e.g., establishing a link to the host computing system 140 via the interconnect 147), initializing the processing resources of the controller 120, initializing the NVMe resources of the controller 120 (e.g., initializing NVMe registers, data structures, queues, buffers, and/or the like), initializing BE resources of the controller 120, and so on. Step 801 may further comprise allocating the HMB 160 for use by the non-volatile memory device 110, as disclosed herein.

Step 802 may comprise determining whether the HMB 160 has been reserved for the non-volatile memory device 110 at the host computing system 140. Step 802 may further comprise determining a size of the HMB 160, address range(s) of the HMB 160, and so on. If the determining of step 802 indicates that the HMB 160 could not be provisioned for the non-volatile memory device 110, the flow may continue at step 804, where the transition manager 126 may be configured to shut down to the NV memory 130 in response to power state transition commands. If the determining of step 820 indicates that the HMB 160 has been provisioned for the non-volatile memory device 110, the flow may continue at step 806.

Step 806 may comprise creating the resume snapshot 762 for the non-volatile memory device 110 within the HMB 160, as disclosed herein. Step 806 may be implemented in response to initialization of the non-volatile memory device 110, and independent of a command to transition the non-volatile memory device 110 to a low-power state (e.g., during normal operation of the non-volatile memory device 110). As disclosed herein, a command to transition to a low-power state may be received from the host computing system 140. Alternatively, or in addition, a command to transition to a low-power state may be determined and/or issued within the NV memory device 110 (e.g., by the controller 120, PMIC 124, transition manager 126, and/or the like.) Step 806 may further comprise generating the validation data 163 corresponding to the resume snapshot 762, and storing the validation data 163 (and/or addressing information for the resume snapshot 762) within the AON partition 114 of the ODM 112. Alternatively, or in addition, the validation data 163 (and/or addressing information) may be stored within another storage location, such as the HMB 160, the PMIC 124, and/or the like, as disclosed herein.

Step 808 may comprise monitoring the operating state of the non-volatile memory device 110 in order to, inter alia, detect changes pertaining to the resume snapshot 762. If no changes are detected, the monitoring may continue at step 808. If the monitoring detects one or more changes pertaining to the resume snapshot 762, the flow may continue at step 810.

Step 810 may comprise recording the delta metadata 772 pertaining to the detected change. Step 810 may comprise accumulating one or more delta entries 773 of the delta metadata 772 within the AON partition 114 of the ODM 112 (and/or other storage location). Step 810 may further comprise combining and/or coalescing delta entries 773 of the delta metadata 772, as disclosed herein.

Step 812 may comprise determining whether to update the resume snapshot 762 with the delta metadata 772 accumulated within the AON partition 114 (and/or other storage location). Step 812 may comprise evaluating an amount, size, number, and/or other metric pertaining to the delta metadata 772 accumulated within the AON partition 114 (e.g., comparing the amount, size, number, and/or other metric to one or more thresholds). Step 812 may comprise determining to update the resume snapshot 762 in response to the number of changes to the resume snapshot 762 accumulated in the AON partition 114 exceeding a threshold number. Alternatively, or in addition, step 812 may comprise determining to update the resume snapshot 762 in response to a size of the delta metadata 772 accumulated within the AON partition 114 exceeding a size threshold. If the determination of step 812 is to update the resume snapshot 762, the flow may continue at step 814; otherwise, the flow may continue back to step 808.

Step 814 may comprise updating the resume snapshot 762 to incorporate the delta metadata 772 accumulated within the AON partition 114. Step 814 may comprise transferring the delta metadata 772 to the host computing system 140 and modifying the resume snapshot 762 within the HMB 160 (by use of one or more of the drivers 128 of the non-volatile memory device 110). Alternatively, or in addition, step 814 may comprise recreating the resume snapshot 762 from the operating state of the non-volatile memory device 110. In another embodiment, step 814 may comprise transferring the resume snapshot 762 from the HMB 160 to the non-volatile memory device 110, modifying the resume snapshot 762 in accordance with the accumulated delta metadata 772, and transferring the modified resume snapshot 762 back to the HMB 160. Step 814 may further comprise generating the validation data 163 corresponding to the modified resume snapshot 762 and storing the validation data 163 (and/or addressing information for the modified resume snapshot 762) within the AON partition 114 of the ODM 112. Alternatively, or in addition, the validation data 163 (and/or addressing information) may be stored within another storage location, such as the HMB 160, the PMIC 124, and/or the like, as disclosed herein.

Figure 9:
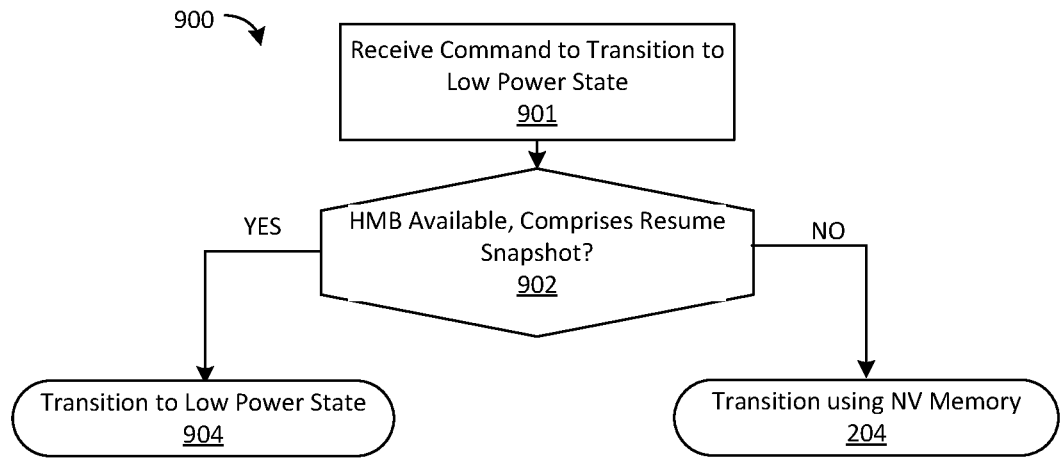
FIG. 9 is a flow diagram illustrating another embodiment of a method for transitioning to a low-power state.

FIG. 9 is a flow diagram of another embodiment of a method 900 for efficiently transitioning a non-volatile memory device 110 to a low-power state (e.g., transitioning to the PS0 power state from the PS4 power state). Step 901 may comprise receiving a command to transition the non-volatile memory device 110 to a low-power state. The command may be received via the interconnect 147, as disclosed herein. Alternatively, or in addition, the command may be determined and/or issued within the NV memory device 110 (e.g., by the controller 120, PMIC 124, transition manager 126, and/or the like.) Step 910 may comprise determining to transition the NV memory device 110 to a low-power state in response to a determined condition, such as the NV memory device 110 being idle for a threshold period of time and/or the like.

Step 902 may comprise determining whether the HMB 160 has been provisioned for the non-volatile memory device 110 and/or whether the HMB 160 comprises a resume snapshot 762, as disclosed herein. Step 902 may comprise reading the AON partition 114 (and/or other storage location) to determine, inter alia, whether the validation data 163 and/or addressing information pertaining to the resume snapshot 762 are available. If the determination of step 902 indicates that the HMB 160 has not been provisioned to the non-volatile memory device 110 (and/or does not comprise a resume snapshot 762), the flow may continue at step 904, where the non-volatile memory device 110 may shut down to the NV memory 130 (and/or other persistent storage location), as disclosed herein. If the determination of step 902 indicates that the HMB 160 has been allocated for the non-volatile memory device 110 and the HMB 160 comprises the resume snapshot 762, the flow may continue to step 904.

Step 904 may comprise transitioning the non-volatile memory device 110 to the low-power state. In some embodiments, step 904 may comprise immediately transitioning the non-volatile memory device 110 to the low-power state without transferring additional data to the HMB 160 (without transferring the delta metadata 772 (if any) from the AON partition 114 of the ODM 112. Accordingly, the transition manager 126 may transition the non-volatile memory device 110 to the low-power state immediately in response to the command of step 901, and without the latency required for generating the resume data 162, creating corresponding validation data 163, and/or transferring the resume data 162 to the HMB 160. The non-volatile memory device 110 may be immediately transitioned to the low-power state, without transferring the contents of the AON partition 114 to another storage location in response to determining that the non-volatile memory device 110 is transitioning to a low-power state in which the contents of the AON partition 114 will be preserved (e.g., the PS4 power state).

In some embodiments, step 904 may comprise transferring the delta metadata 772 accumulated within the AON partition 114 (if any) to another storage location in response to, inter alia, determining that the non-volatile memory device 110 is transitioning to a low-power state in which the contents of the AON partition 114 will not be preserved (e.g., determining that the non-volatile memory device 110 is transitioning to the RTD3 power state). Step 904 may comprise transferring the delta metadata 772 (if any) to one or more of the HMB 160, PMIC 124, NV memory 130, other device accessible via the interconnect 147, and/or the like, as disclosed herein. The delta metadata 772 may be significantly smaller than the resume snapshot 762 (and/or resume data 162). As such, the latency required to transition to the low-power state may be significantly less than embodiments in which the transitioning comprises generating the resume data 162 and/or transferring the generated resume data 162 to the HMB 160.

Figure 10:
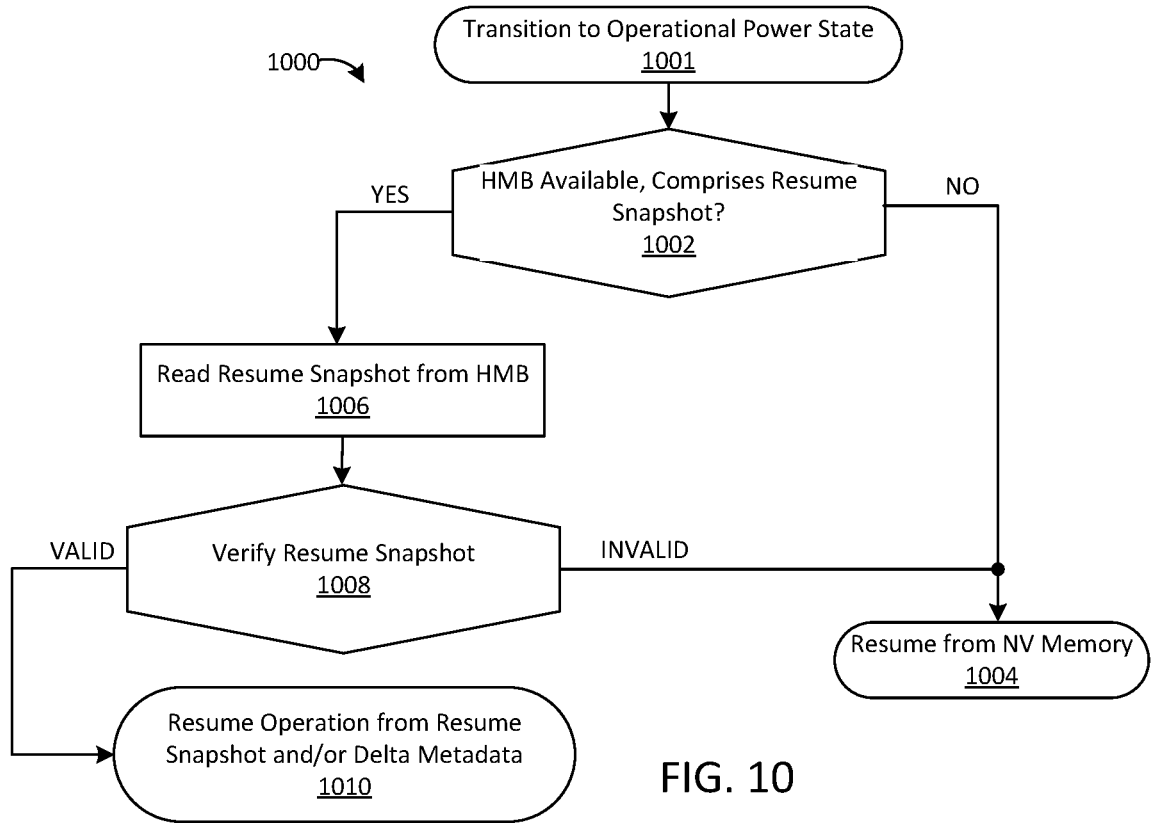
FIG. 10 is a flow diagram illustrating another embodiment of a method for transitioning from a low-power state to an operational state.

FIG. 10 is a flow diagram of another embodiment of a method 1000 for transitioning to an operational state from a low-power state. Step 1001 may comprise initiating a transition to the operational state from a low-power state (e.g., initiating a transition from the PS4 power state to the PS0 power state). Step 1001 may comprise receiving a command at the non-volatile memory device 110, as disclosed herein. Alternatively, or in addition, step 1001 may comprise determining to transition the NV memory device 110 to an operational state by the controller 120, PMIC 124, and/or transition manager 126 (e.g., in response to detecting a condition and/or operation that involves interaction between the NV memory device 110 and the host computing system 140).

Step 1002 may comprise determining whether a resume snapshot 762 is available in the HMB 160 allocated to the non-volatile memory device 110. Step 1002 may comprise reading addressing information pertaining to the resume snapshot 762 from the AON partition 114 of the ODM 112 (and/or another storage location), as disclosed herein. Alternatively, or in addition, step 1002 may comprise receiving a NVMe set features command indicating that the HMB 160 has been returned to the non-volatile memory device 110 and that contents of the HMB 160 are unchanged. In another embodiment, step 1002 may comprise receiving the addressing information for the HMB 160 from the host computing system 140 (e.g., in response to the host computing system 140 writing the address information to a PCIe register, as disclosed herein). If the determining of step 1002 indicates that the HMB 160 is not available and/or does not comprise a resume snapshot 762 for the non-volatile memory device 110, the flow may continue at step 1004, where the transition manager 126 may resume operation of the non-volatile memory device 110 by use of data accessed from the NV memory 130.

If the determining of step 1002 indicates that the HMB 160 is available and comprises a resume snapshot 762 for the non-volatile memory device 110, the flow may continue at step 1006. Step 1006 may comprise reading the resume snapshot 762 from the HMB 160 as disclosed herein. Step 1008 may comprise validating the resume snapshot 762 by use of the validation data 163, as disclosed herein. If the validation of step 1008 indicates that the resume snapshot 762 is invalid, the flow may continue at step 1004; otherwise, the flow may continue at step 1010.

Step 1010 may comprise resuming operation of the non-volatile memory device 110 by use of a) the resume snapshot 762 read from the HMB 160 and/or b) delta metadata 772 accumulated within the AON partition 114 of the ODM 112 (and/or other storage location). Step 1010 may comprise applying the delta metadata 772 to the resume snapshot 762 to produce a modified resume snapshot 762. Step 1010 may further comprise using the modified resume snapshot 762 to resume operation of the non-volatile memory device 110 (e.g., by, inter alia, writing the modified resume snapshot 762 to the ODM 112). Alternatively, or in addition, step 1008 may comprise configuring one or more of the controller 120, device interconnect resources, device processing resources, NVMe resources, BE resources, and/or the like, by use of the modified resume snapshot 762. Step 1010 may further comprise storing the modified resume snapshot 762 within the HMB 160 for use in subsequent resume operation(s) and/or removing the accumulated delta metadata 772 from the AON partition 114 of the ODM 112.

In some embodiments, the transition manager 126 may be configured to gradually resume the non-volatile memory device 110, which may comprise resuming selected services of the non-volatile memory device 110 in a determined order and/or making the resumed services 121 available as soon as they are resumed, regardless of whether other services 121 are in an operational state. Gradually resuming the non-volatile memory device 110 may comprise representing that the non-volatile memory device 110 has resumed and/or woken up in response to resuming selected services of the non-volatile memory device 110 such that, from the perspective of the host computing system 140, the non-volatile memory device 110 appears to have resumed and/or woken up, despite the fact that only a subset of the service 121 of the non-volatile memory device 110 are operational. As disclosed in further detail herein, resuming services 121 of the non-volatile memory device 110 according to a determined order may reduce the overall latency of resume operations.

Figure 11A:
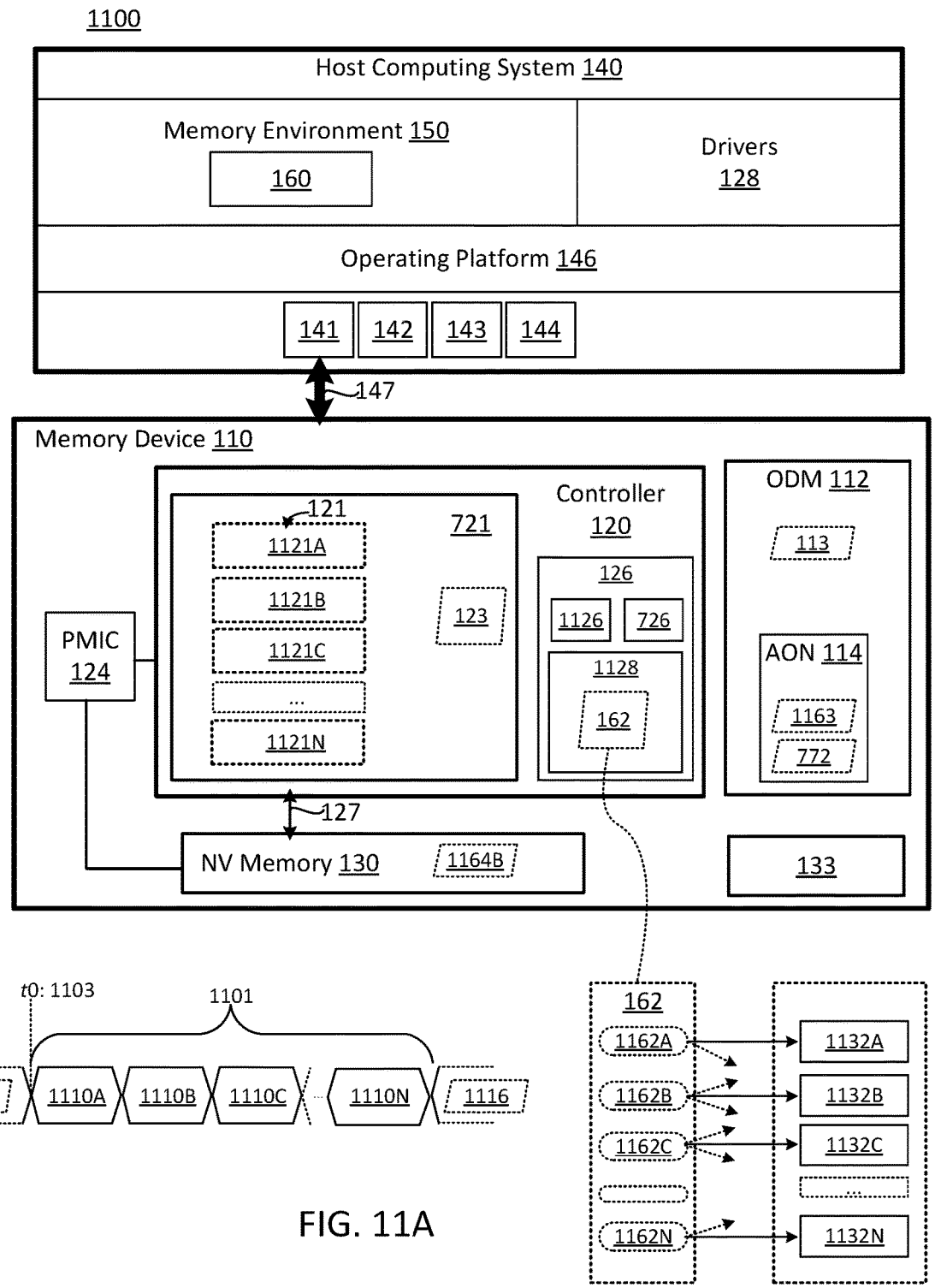
FIG. 11A is a schematic block diagram of a system comprising another embodiment of a memory device configured to efficiently transition between different power states.

FIG. 11A is a schematic block diagram of a system 1100 comprising a non-volatile memory device 110 configured to efficiently transition between power states. As disclosed above, the host computing system 140 may issue commands to the non-volatile memory device 110, which may be configured to cause the non-volatile memory device 110 to transition to one or more power states (e.g., direct the non-volatile memory device 110 to transition to one or more memory states PS4-PS4, RTD3, and/or the like). As illustrated in FIG. 11A, a resume process 1101 for transitioning the non-volatile memory device 110 from a low-power state 1114 to an operational state 1116 may comprise a sequence of operations, processes, and/or interactions between the host computing system 140 and the non-volatile memory device 110 (phases 1110, such as phases 1110A-N illustrated in FIG. 11A). One or more of the phases 1110A-N may involve a subset of the services 121, and may be completed with the host computing system 140 independent of other services 121 of the non-volatile memory device 110 (e.g., regardless of whether the other services 121 are operational). Completing the last phase 1110N of the resume process 1101 may, therefore, comprise transitioning the non-volatile memory device 110 to the operational state 1116.

The resume process 1101 may be driven by the host computing system 140 and may be initiated in response to a wakeup request 1103. The wakeup request 1103 may comprise a request, command, directive, interrupt, determination, and/or the like. The wakeup request 1103 may be sent from the host computing system 140 to the non-volatile memory device 110 via the interconnect 147 and/or another communication mechanism. Alternatively, or in addition, the wakeup request 1103 may be issued by the NV memory device 110 (and/or a component thereof). The wakeup request 1103 may be issued in response to detecting a condition and/or operation that involves interaction between the NV memory device 110 and the host computing system 140 (e.g., by the controller 120, PMIC 124, transition manager 126, and/or the like). As disclosed above, each phase 1110A-N of the resume process 1101 may comprise the host computing system 140 accessing respective services 1121A-N of the non-volatile memory device 110. The initial phase 1110A of the resume process 1101 may comprise resuming first services 1121A of the non-volatile memory device 110 and may be completed independently of other services 1121B-N, and so on (e.g., may be completed without resuming services 1121B-N). The next phase 1110B of the resume process 1101 may comprise resuming a different subset of the services 121 of the non-volatile memory device 110 (e.g., second services 1121B) and may be completed without resuming other services 1121C-N of the memory device; phase 1110C may comprise resuming third services 1121C of the non-volatile memory device 110, and so on. A last phase 1110N of the resume process 1101 may comprise resuming last services 1121N of the non-volatile memory device 110. Completion of phase 1110N may comprise transitioning the memory device to the operational state 1116 in which substantially all of the services 121 of the non-volatile memory device 110 are resumed and/or available to the host computing system 140.

In some embodiments, each phase 1110A-N of the resume process 1101 may comprise and/or define respective conditions. A phase 1110A-N may begin when the pre-conditions thereof are met, and may complete when the completion conditions thereof have been satisfied. By way of non-limiting example, the pre-conditions of phase 1110A may comprise the host computing system 140 issuing a resume command to the non-volatile memory device 110 and/or the non-volatile memory device 110 receiving the resume command via the interconnect 147 and/or other mechanism. The completion conditions of phase 1110A (and/or the pre-conditions of phase 1110B) may comprise resuming the first services 1121A of the non-volatile memory device 110. As disclosed in further detail herein, resuming the first services 1121A may comprise establishing a link between the non-volatile memory device 110 and the host computing system 140 via the interconnect 147. The completion conditions of phase 1110B (and/or the pre-conditions of phase 1110C) may comprise resuming the second services 1121B of the non-volatile memory device 110. As disclosed in further detail herein, the second services 1121B may comprise one or more NVMe services (which may comprise a implementing an NVMe communication protocol layer on the interconnect services 1121A resumed in the first phase 1110A). The completion conditions of phase 1110C may comprise resuming third services 1121C of the non-volatile memory device 110. As disclosed in further detail herein, the third services 1121C may comprise, inter alia, one or more back end services. The completion conditions of the last phase 1110N of the resume process 1101 may comprise resuming one or more last services 1121N, which may comprise transitioning the non-volatile memory device 110 to the operational state 1116.

In the FIG. 11A embodiment, the transition manager 126 may be configured to gradually resume the non-volatile memory device 110 from the low-power state 1114 to the operational state 1116. Gradually resuming the non-volatile memory device 110 may comprise gradually resuming selected services 1121A-N of the non-volatile memory device 110 (according to a determined order) and/or providing the host computing system 140 with access to the selectively resumed services 112A-N. The transition manager 126 may gradually resume services 1121A-N according to the order in which the services 1121A-N are required in the resume process 1101. The transition manager 126 may resume first services 1121A, followed by second services 1121B, and so on, to services 1121N.

Gradually resuming the non-volatile memory device 110 as disclosed herein may enable the transition manager 126 to reduce the latency of the resume process 1101. Gradually resuming the non-volatile memory device 110 may comprise the transition manager 126 bringing up services 1121A-N according to the order in which the services are required in the resume process 1101. Gradually resuming services 1121A required during the initial phase 1110A of the resume process 1101 may comprise accessing resume data 162 pertaining to services 1121A, using the accessed resume data 162 to resume the services 1121A (by use of corresponding resources 721 of the controller 120), and making the resumed services 1121A available to the host computing system 140. Making the resumed services 1121A available to the host computing system 140 may comprise representing to the host computing system 140 that the non-volatile memory device 110 has resumed (e.g., has woken up), despite the fact that only some of the services 121 of the non-volatile memory device 110 have been resumed and/or are operational. Gradually resuming the non-volatile memory device 110 may comprise responding to the wakeup request 1103 and/or completing phase 1110A of the resume process 1101 before other services 1121B-N of the non-volatile memory device 110 have been resumed. Gradually resuming the non-volatile memory device 110 may comprise responding to one or more requests, commands, directives, and/or interrupts issued by the host computing system 140, such as the wakeup request 1103 that initiated the resume process 1101. Gradually resuming the non-volatile memory device 110 may further comprise responding to requests, commands, directives, and/or interrupts that pertain to services 1121A before services 1121B-N have been resumed, which may comprise establishing a PCIe link between the non-volatile memory device 110 and the host computing system 140 before other services 121 have been resumed, such as NVMe services, back-end services, and/or the like.

Figure 11B:
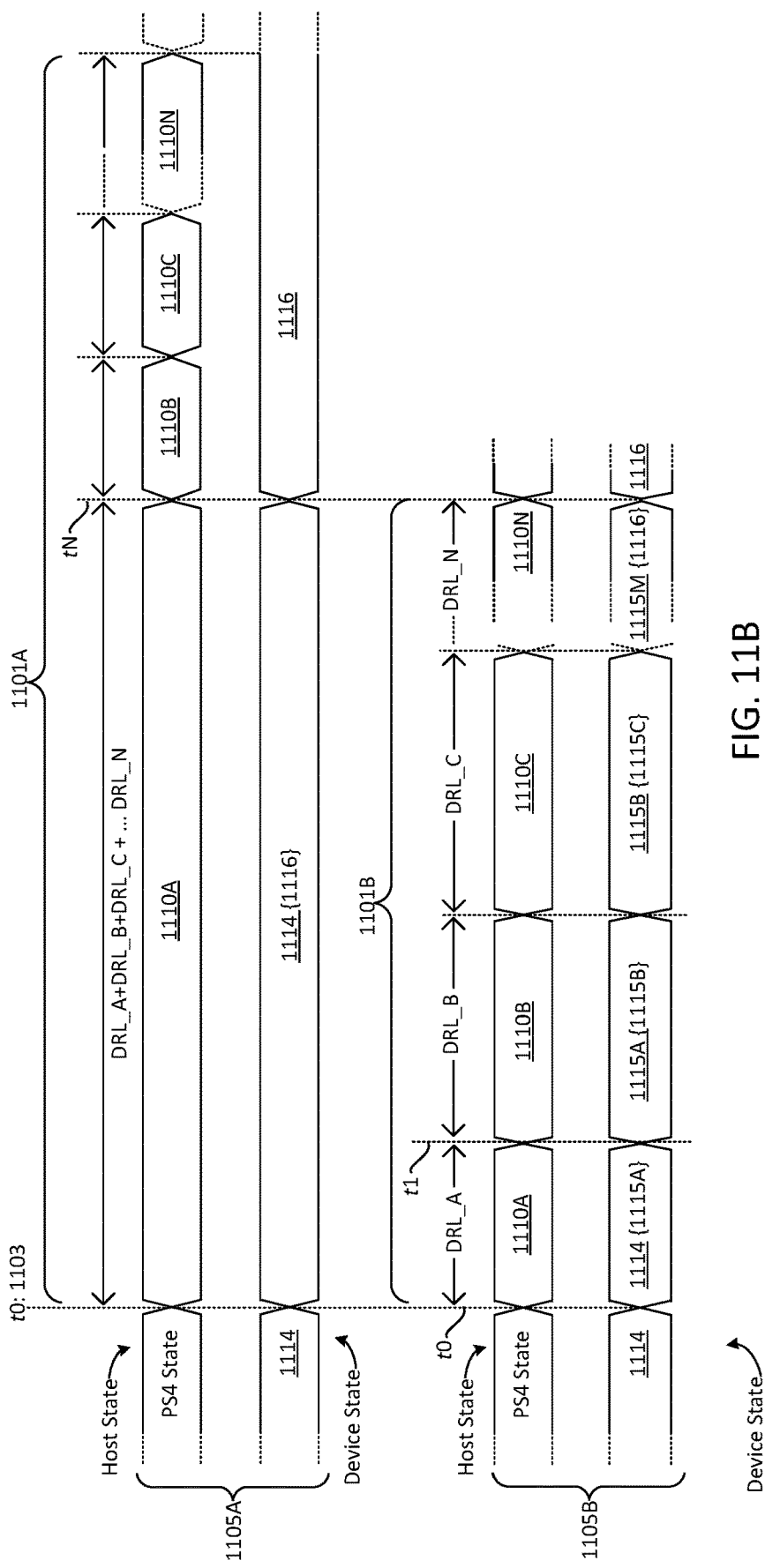
FIG. 11B illustrates exemplary timing diagrams for resume operations pertaining to embodiments of a memory device.

FIG. 11B depicts timing diagrams 1105A and 1105B for a resume process 1101 between the host computing system 140 and a non-volatile memory device 110 to transition the non-volatile memory device 110 from a non-operational, low-power state 1114 to an operational state 1116. The resume processes 1101 may be initiated by the host computing system 140 at time t0 (in response to a wakeup request 1103).

The timing diagram 1105A may correspond to a non-volatile memory device 110 configured to transition directly from the low-power state 1114 to the operational state 1116, such that the services 121 of the non-volatile memory device 110 are resumed substantially simultaneously (and/or respective services 1121A-N of the non-volatile memory device 110 are not made available for completing phases 1110A-N of the resume process 1101 until substantially all of the services 121 of the non-volatile memory device 110 have been resumed). Completing the first phase 1110A may comprise: a) accessing resume data 162 for the memory, and b) resuming the services 1121A-N of the non-volatile memory device 110 substantially concurrently by use of the accessed resume data 162. The latency for resuming service(s) 1121A-N of the memory device may be represented as respective device resume latency (DRL) values: DRL_A may represent the latency for resuming the first services 1121A, DRL_B may represent the latency for resuming the second services 1121B, and so on, with DRL_N representing the latency for resuming services 1121N.

As illustrated in FIG. 11B, completing the initial phase 1110A of resume process 1110 may comprise resuming services 1121A-N, which may correspond to a sum of DRL_A through DRL_ N. Completing the initial phase 1110A of resume process 1110 may, therefore, comprise transitioning the non-volatile memory device 110 from the low-power state 1114 to the operational state 1116. Subsequent phases 1110B-N of the resume process 1101 may be completed with the host computing system 140. Since substantially all of the services 121 of the non-volatile memory device 110 have been resumed upon completion of phase 1110A, the latency of the subsequent phases 1110B-N may be limited to latency for interaction(s) with the host computing system 140 (which may be less than the respective device resume latencies DRL_A-DRL_N).

The timing diagram 1105B may correspond to the transition manager 126 of the FIG. 11A embodiment, which may be configured to gradually resume services 1121A-N of the memory device in the order such services 1121A-N are required by respective phases 1110A-N of the resume process 1101. In response to the resume command at t0, the transition manager may be configured to a) access resume data 162 pertaining to first services 1121A, b) use the accessed resume data 162 to resume operation of the first services 1121A, and/or c) make the first services 1121A available to the host computing system 140 for completion of the first phase 1110A. Completing the first phase 1110A may comprise establishing a connection between the non-volatile memory device 110 and the host computing system 140 via the interconnect 147, as disclosed herein. The transition manager 126 may resume the first services 1121A before resuming other services 1121B-N of the non-volatile memory device 110. The transition manager 126 may be further configured to make the first services 1121A available to the host computing system 140 before resuming other services 1121B-N of the memory device. Accordingly, resuming the first services 1121A may comprise gradually transitioning the non-volatile memory device 110 from the non-operational, low-power state 1114 to a partial operational state 1115 (e.g., partial operational state 1115A). As used herein, a partial operational state 1115 refers to a state of the non-volatile memory device 110 in which one or more of the services 1121A-N of the non-volatile memory device 110 are operational and/or available to the host computing system 140 and/or one or more of the services 1121A-N of the memory device are non-operational and/or not available to the host computing system 140. Transitioning the memory device to a partial operational state 1115 may comprise representing to the host computing system 140 that the non-volatile memory device 110 is available (e.g., has woken up and/or resumed), despite the fact that only a subset of the services 121 of the non-volatile memory device 110 are operational.

Transitioning to the partial operational state 1115A may comprise resuming the first services 1121A of the non-volatile memory device 110 and/or allowing the host computing system 140 to access the first services 1121A while other services 1121B-N are not operational and/or are not accessible to the host computing system 140. Transitioning to the partial operational state 1115A may comprise using the resources 721 to resume the services 1121A and using the services 1121A to establish a link between the non-volatile memory device 110 and the host computing system 140 via the interconnect 147 (e.g., re-establish the PCIe link that existed before transitioning the non-volatile memory device 110 to the low-power state 1114). Therefore, the latency for implementing phase 1110A of the resume processes 1101 may correspond to the time required to transition from the low-power state 1114 to the partial operational state 1115A (e.g., the latency DRL_A for resuming the first services 1121A), as opposed to latency required to resume substantially all of the services 1121A-N of the non-volatile memory device 110 as in the resume process 1101 (DRL_A+DRL_B+DRL_C . . . +DRL_N). Transitioning to the partial operational state 1115A may comprise representing to the host computing system 140 that the non-volatile memory device 110 is operational, despite the fact that only services 1121A may have been resumed (and/or other services 1121B-N remain unavailable). From the perspective of the host computing system 140, the non-volatile memory device 110 may appear to resumed (e.g., woken up) at about time t1. Time t1 may correspond to one or more of: the time at which the transition manager 126 makes the services 1121A available to the host computing system 140, when services 1121A are used to establish the link between the host computing system 140 and non-volatile memory device 110, when the non-volatile memory device 110 responds to the wake up request 1103, and/or the like.

In response to resuming services 1121A (and/or completing phase 1110A of the resume process 1101 with the host computing system 140), the transition manager 126 may continue gradually resuming the non-volatile memory device 110, which may comprise the transition manager 126 resuming next highest priority services 1121B. The services 1121B may be resumed as disclosed herein, which may comprise: a) accessing resume data 162 pertaining to services 1121B, b) using the accessed resume data 162 to resume the services 1121B, and so on. The transition manager 126 may be further configured to make the services 1121B available to the host computing system 140 and/or use the services 1121B to complete phase 1110B of the resume process 1101. Resuming the services 1121B may, therefore, comprise transitioning the non-volatile memory device 110 from the partial operational state 1115A to the partial operational state 1115B.

In response to transitioning the non-volatile memory device 110 to partial operational state 1115B (and/or completing phase 1110B with the host computing system 140), the transition manager 126 may continue gradually resuming the non-volatile memory device 110, which may comprise resuming next highest-priority services 1121C. Resuming services 1121C may comprise: a) accessing resume data 162 pertaining to services 1121C, b) using the accessed resume data 162 to resume the services 1121C (e.g., transition the memory device from the partial operational state 1115B to partial operational state 1115C), and so on. The transition manager 126 may be further configured to use the services 1121C to complete phase 1110C of the resume process 1101 with the host computing system 140 by use of the services 1121C, as disclosed herein. The latency for completing phase 1110C may be about DRL_C. The transition manager 126 may continue to gradually resume the non-volatile memory device 110 until the lowest-priority services 1121N are resumed and/or are used to complete a last phase 1110N if the resume process 1101. Resuming services 1121N may comprise transitioning the non-volatile memory device 110 from partial operational state 1115M to operational state 1116.

As illustrated in FIG. 11B, gradually resuming the non-volatile memory device 110 may result in reductions to the overall latency required to resume from the low-power state 1114. Completing the initial phase 1110A by gradually resuming the non-volatile memory device 110 from the low-power state 1114 to the partial operational state 1115A (as opposed to resuming the non-volatile memory device 110 to the operational state 1116), may reduce the latency for completion of the initial phase 1110A and, inter alia, enable subsequent phases 1110B-N to begin more quickly (e.g., after about time DRL_A rather than DRL_A -DRL_N). Moreover, gradually resuming the non-volatile memory device 110 may enable selected services 1121A-N of the non-volatile memory device 110 to be made available to the host computing system 140 much more quickly. As illustrated in timing diagram 1105B, the non-volatile memory device 110 may appear to be operational, from the perspective of the host computing system 140, at time t1, which may be about t0+DRL_A (e.g., the time at which the first services 1121A are resumed and made available to the host computing system 140 for completion of the initial phase 1110A of the resume process 1101). By contrast, in timing diagram 1105A, the non-volatile memory device 110 may not be available to the host computing system 140 until time tN, which may be about t0+DRL_A+DRL_B+DRL_C . . . +DRL_N (e.g., the time at which substantially all of the services 1121A-N of the non-volatile memory device 110 have been resumed and/or are available for completing phases 1110A-1110N of the resume process 1101).

As disclosed herein, partially resuming the non-volatile memory device 110 may comprise resuming selected services 1121A-N of the non-volatile memory device 110 and/or making the selected services 1121A-N available to the host computing system 140. Referring back to FIG. 11A, in some embodiments, the transition manager 126 comprises a gradual resume engine 1126, which may be configured to, inter alia, manage operation of the non-volatile memory device 110 in one or more partial operational states 1115A-N (e.g., states in which a subset of the services 1121A-N of the non-volatile memory device 110 are operational and/or available to the host computing system 140). The gradual resume manager 1126 may be configured to represent to the host computing system 140 that the non-volatile memory device 110 is available (e.g., has woken up) in response to the transition manager 126 resuming one or more services 121 of the non-volatile memory device 110, regardless of whether other services 121 have been resumed and/or are available. The gradual resume manager 1126 may be configured to represent that the non-volatile memory device 110 is available in response to the transition manager 126 resuming one or more of the first, highest-priority services 1121A, as disclosed herein. Representing that the non-volatile memory device 110 is available may comprise one or more of: responding to the wakeup request 1103 from the host computing system 140, communicating with the host computing system 140 via the interconnect 147 (and/or other mechanism), establishing a link between the non-volatile memory device 110 and the host computing system 140, implementing one or more phases 1110 of the resume process 1101, updating status information (e.g., updating one or more interconnect registers, such as a PCIe status register), broadcasting state information pertaining to the non-volatile memory device 110, and or the like.

The gradual resume manager 1126 may be further configured to handle incoming requests during operation in one or more partial operational state 1115A-N. The gradual resume manager 1126 may be configured to monitor and/or filter incoming requests to the non-volatile memory device 110 (e.g., incoming commands, requests, interrupts, and/or the like). The gradual resume manager 1126 may distinguish requests that pertain to services 1121A-N that are currently operational and/or available to the host computing system 140 from requests that pertain to services 1121A-N of the non-volatile memory device 110 that are currently non-operational and/or unavailable to the host computing system 140. The gradual resume manager 1126 may allow requests determined to pertain to available services 1121A-N to be processed by corresponding resources 721 of the controller 120. The gradual resume manager 1126 may prevent requests determined to pertain to unavailable services 1121A-N from being processed by the controller 120, which may comprise one or more of: rejecting the requests (e.g., returning an error code and/or the like), deferring the requests, buffering the requests, queueing the requests to be processed when the service(s) 1121A-N required thereby are available, and/or the like.

The transition manager 126 may be configured to further increase responsiveness of the non-volatile memory device 110 when transitioning between power states and/or decrease the latency of the resume processes 1101 by, inter alia, distinguishing resume data 162 that will be required in initial phases 1110 of the resume processes 1101 from resume data 162 that will be required in later phases 1110. The transition manager 126 may be configured to store resume data 162 that will be required first (e.g., during the initial phase 1110A) from resume data 162 that will be required later (e.g., during phases 1110B-N). Resume data 162 required immediately (or substantially immediate) in response to a wakeup request 1103 may be stored in a high-performance storage location, such as the AON partition 114 of the ODM 112. Resume data 162 required later may be stored in lower-performance storage locations, such as the HMB 160, NV memory 130, and/or the like. In the FIG. 11A embodiment, the transition manager 126 may be configured to store resume data 162 pertaining to the services 1121A in the highest-performance storage location(s) available to the non-volatile memory device 110 (e.g., the AON partition 114 of the ODM 112). Resume data 162 pertaining to the services 1121B may be stored in the next highest-performance storage location(s), such as the HMB 160, and/or the like, and so on. Lower-priority resume data 162 may be stored in the highest-performance storage location(s) having sufficient remaining capacity (e.g., the HMB 160, if available, and/or NV memory 130).

Alternatively, or in addition, the transition manager 126 may be configured to assign priorities to respective portions of the resume data 162, such that resume data 162 required first during the resume process 1101 is prioritized over resume data 162 required later in the resume process 1101. The transition manager 126 may select storage location(s) for the respective portions of the resume data 162 according to the priorities assigned thereto. The storage location(s) available for storing resume data may include, but are not limited to: the AON partition 114, the HMB 160, the NV memory 130, and/or the like. The storage location(s) may have respective performance characteristics. The AON partition 114 may provide high-performance, but may have limited capacity (due to cost and/or power considerations). The HMB 160 may provide lower performance than the AON partition 114, but may have a larger capacity (and lower power requirements). The NV memory 130 may provider slower access than the HMB 160, but may have a larger capacity (and is not susceptible to loss and/or corruption by the host computing system 140). When transitioning to the low-power state, the transition manager 126 may be configured to store high-priority portions of the resume data 162 (to be accessed first during the resume process 1101) in the AON partition 114, store the next-highest-priority portions of the resume data 162 (to be accessed after the highest priority portions) in the HMB 160, and so on, with the lowest-priority resume data 162 being stored within remaining storage locations (e.g., the HMB 160, if available, the NV memory 130, and so on).

In the FIG. 11A embodiment, the transition manager 126 may comprise a resume data manager 1128, which may be configured to manage the creation, storage and/or retrieval resume data 162, as disclosed herein. The resume data manager 1128 may store and/or retrieve portions of the resume data 162 separately, according to the order in which the portions will be accessed during the resume process 1101. The resume data manager 1128 may be configured to generate resume data 162 corresponding to respective services 1121A-N of the non-volatile memory device 110. The resume data manager 1128 may be configured to generate, and/or identify within generated resume data 162, one or more datasets 1162A-N, each resume dataset 1162A-N comprising information for respective services 1121A-N. The resume data 162 of the FIG. 11A embodiment may comprise a first resume dataset 1162A corresponding to services 1121A, second resume data 1162B corresponding to services 1121B, third resume data 1162C, and so on, including resume data 1162N corresponding to services 1121N. The resume dataset 1162A may comprise information for resuming services 1121A (and/or implementing phase 1110A of the resume process 1101), the resume dataset 1162B may comprise information for resuming services 1121B (and/or implementing phase 1110B of the resume process 1101), the resume dataset 1162C may comprise information for resuming services 1121C (and/or implementing phase 1101C of the resume process 1101), and so on, with resume dataset 1162N comprising information for resuming services 1121N (and/or implementing phase 1101N of the resume processes 1101).

The resume data manager 1128 may be further configured to prioritize the respective resume datasets 1162A-N, which may comprise assigning a highest priority to the resume dataset 1162A to be accessed first in the resume process 1101 to transition the non-volatile memory device 110 to the operational state 1116 (e.g., priority 0), assigning a next highest priority to the resume dataset 11628 to be accessed next (e.g., priority 1), and so on, with a lowest priority (e.g., priority N) being assigned to the resume dataset 1162N to be accessed last in the resume process 1101. The resume data manager 1128 may be further configured to store the resume datasets 1162A-N according to the priorities assigned thereto.

The resume data manager 1128 may be configured to store resume data 162 in one or more different resume storage resources (RSR) 1132A-N. Each RSR 1132A-N may have different respective performance and/or availability characteristics, as disclosed herein. RSR 1132A may provide the highest performance of the RSR 1132A-N, RSR 1132B may provide next highest performance, and so on, with RSR 1132N providing the lowest performance of the RSR 1132A-N. RSR 1132A may comprise high-performance on-board resources, such as the AON partition 114 of the ODM 112 (or one or more other high-performance, on-board resources), RSR 1132B comprise the HMB 160 (and/or other high-performance, external resources), RSR 1132C may comprise the NV memory 130 (and/or other lower-performance, non-transitory storage resources, such as the non-transitory storage resources 144 of the host computing system 140), and so on, with RSR 1132N comprising lowest-performance storage responses.

When transitioning to the low-power state 1114, the resume data manager 1128 may be configured to generate resume data 162 for the non-volatile memory device 110. The resume data 162 may comprise a plurality of resume datasets 1162A-N, as disclosed herein. The resume data manager 1128 may be further configured to store the resume datasets 1162A-N within respective RSR 1132A-N in accordance with the respective priorities of the datasets 1162A-N. The highest priority resume dataset 1162A may be stored within the highest-performance RSR 1132A-N available. After storing the highest-priority resume dataset 1162A, the resume data manager 1128 may store the next highest priority resume dataset 1162B in the remaining capacity of the RSR 1132A-N (from highest-performance to lowest-performance), and so on, with resume dataset 1162C being stored after resume dataset 1162B, and the lowest-priority resume dataset 1162N being stored after all of the higher-priority resume datasets 1162A-M have been stored. In some embodiments, the resume data manager 1128 is configured to store dataset 1162A in RSR 1132A, which may comprise the AON partition 114 of the ODM 112. In another embodiment, the resume data manager 1128 may determine that the RSR 1132A is unavailable (e.g., the AON partition 114 will be powered down during the low-power state 1114). In response, the resume data manager 1128 may be configured to store the resume dataset 1162A in RSR 1132B, which may comprise the HMB 160. The resume dataset 1162B may be stored in a remaining capacity of the RSR 1132B (if any) and/or in next-highest-performance RSR 1132C-N.

The resume data manager 1128 may be further configured to record validation 1163 (and/or addressing information) pertaining to the resume data 162 within the AON partition 114, HMB 160, and/or the like, as disclosed herein. In some embodiments, the validation data 1163 (and/or addressing information) recorded by the resume data manager 1128 may comprise information pertaining to respective resume datasets 1162A-N, such that each resume dataset 1162A-N (and/or the resume datasets 1162A-N stored within respective RSR 1132A-N) can be accessed and/or validated separately from other resume datasets 1162A-N (and/or without reading the resume datasets 1162A-N stored within the other RSR 1132A-N).

As illustrated in FIG. 11B, the transition manager 126 may be configured to implement the resume process 1101 with the host computing system 140 by, inter alia, gradually resuming selected services 1121A-N of the non-volatile memory device 110. Gradually resuming the non-volatile memory device 110 may comprise transitioning the non-volatile memory device 110 to one or more transition partial operational states 1115A-M and/or completing phases 1110A-N of the resume process 1101 with the host computing system 140 by use of the resumed services 1121A-N (before other services 121 have been resumed). Storing the resume dataset 1162A to be accessed first in the resume processes 1101 in high-performance storage location(s) and/or separately from other resume datasets 1162B-N may enable the transition manager 126 to further increase responsiveness of the non-volatile memory device 110 and/or decrease the latency of the resume process 1101. As disclosed above, the resume data manager 1128 may be configured to store the resume dataset 1162A corresponding to services 1121A in high-performance storage (e.g., RSR 1132A, which may comprise the AON partition 114 of the ODM 112). In response to receiving the resume command at t0, the transition manager 126 may be configured to: a) resume operation of the first services 1121A of the non-volatile memory device 110 by use of the resume dataset 1162A stored within the AON partition 114 of the ODM 112, and b) use the first services 1121A to complete the initial phase 1110A of the resume process 1101 with the host computing system 140. The latency for reading the resume dataset 1162A may be low due to, inter alia, the resume data manager 1128 storing the resume dataset 1162A within the high-performance, on-board memory of the AON partition 114, separately from other portions of the resume data 162, such that the resume data manager 1128 can be read from the AON partition 114 without reading other portions of the resume data 162 (e.g., without reading datasets 1162B-N). The decreased latency required for accessing the resume dataset 1162A may further reduce the latency of the initial phase 1110A (and/or the overall latency of the resume process 1101).

In response to resuming the first services 1121A (and/or completing the first phase 1110A), the transition manager 126 may resume the second services 1121B, which may comprise: a) reading the resume dataset 1162B corresponding to the second services 1121B, and b) using the resume dataset 1162B to resume the second services 1121B and/or complete the second phase 1110B of the resume process 1101 with the host computing system 140. The resume data manager 1128 may read the resume dataset 1162B without reading other portions of the resume data 162, as disclosed herein, which may further reduce the latency of the second phase 1110B (and/or subsequent phases 111C-N). In addition, since the resume datasets 1162A-N are capable of being stored and/or accessed independently, the resume data manager 1128 may begin retrieving the second resume dataset 1162B immediately after accessing the first resume dataset 1162A (and while the initial phase 1110A is still in process). The transition manager 126 may continue resuming selected services 1121C-N of the non-volatile memory device 110 (and/or completing phases 1110C-N of the resume process 1101) by use of datasets 1162C-N, as disclosed herein.

Referring back to FIG. 11A, the transition manager 126 may be further configured to pre-populate one or more RSR 1132A-N with resume data 162 pertaining to the non-volatile memory device 110. Pre-populating the RSR 1132A-N may comprise storing one or more of the resume datasets 1162A-N within one or more of the RSR 1132A-N, as disclosed herein (in accordance with the respective priorities assigned to the resume datasets 1162A-N). The resume data manager 1128 may be configured to pre-populate RSR 1132A (the AON partition 114) with the resume dataset 1162A, which may comprise: a) generating the resume dataset 1162A and/or writing the generated resume dataset 1162A to the AON partition 114. As disclosed above, the resume data 162 (and/or resume datasets 1162A-N) may comprise and/or correspond to contents 113 of the ODM 112. Accordingly, portions of the resume dataset 1162A may be maintained within the ODM 112 during normal operation of the non-volatile memory device 110. In such embodiments, the resume dataset 1162A may be pre-populated to the AON partition 114 by one or more of: copying selected contents 113 of the memory into the AON partition 114, designating portion(s) of the ODM 112 comprising the resume data 1162A as the AON partition 114, and/or maintaining contents 113 corresponding to the resume dataset 1162A within the AON partition 114 during operation of the non-volatile memory device 110. Changes occurring after creation of the resume dataset 1162A may be written to the AON partition 114 (and/or may modify the resume dataset 1162A maintained within the ODM 112), which may obviate the need for maintaining separate delta metadata 772 for the resume dataset 1162A.

Pre-populating the resume dataset 1162B may comprise generating the resume dataset 1162B and/or storing the resume dataset 1162B within the RSR 1132B (e.g., the HMB 160). Other resume datasets 1162C-N may be similarly pre-populated to one or more RSR 1132B-N. Pre-populating resume datasets 1162B-N may further comprise using the state monitor 726 to detect changes pertaining to respective resume datasets 1162B-N and/or recording corresponding delta metadata 772 within the AON partition 114 (and/or other storage location), as disclosed herein. Pre-populating the resume datasets 1162B-N may further comprise updating the resume dataset 1162B-N within the HMB 160, as disclosed herein (e.g., after accumulating a threshold amount of delta metadata 772 or the like).

Figure 12A:
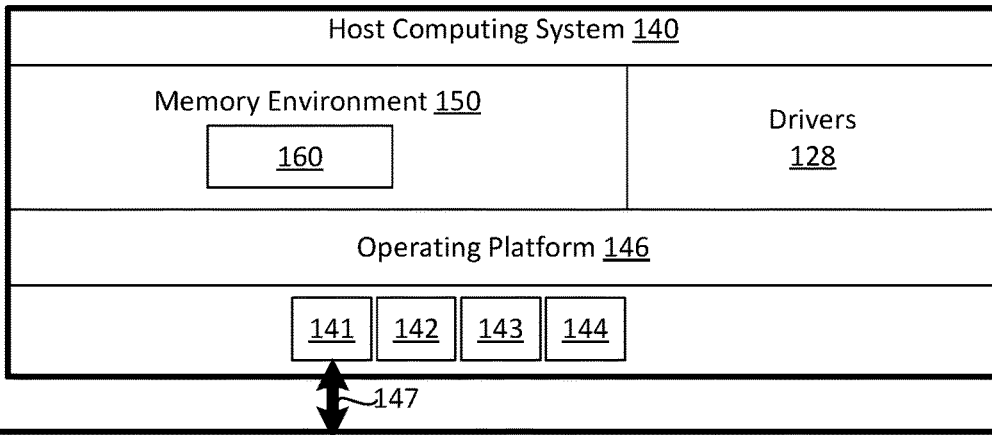
FIG. 12A is a schematic block diagram of a system comprising another embodiment of a memory device configured to efficiently transition between different power states.
Figure 12A:
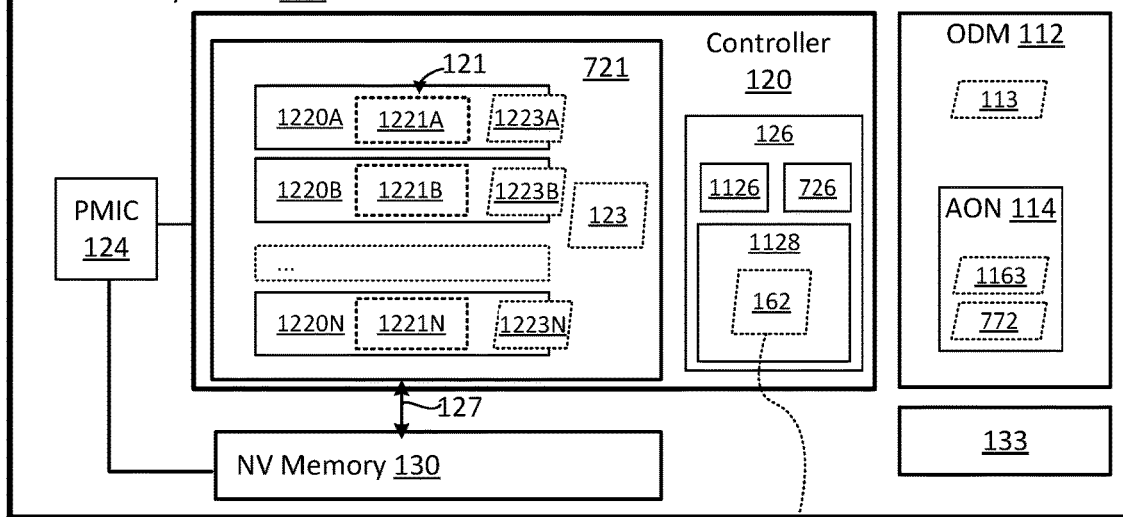
Figure 12A:
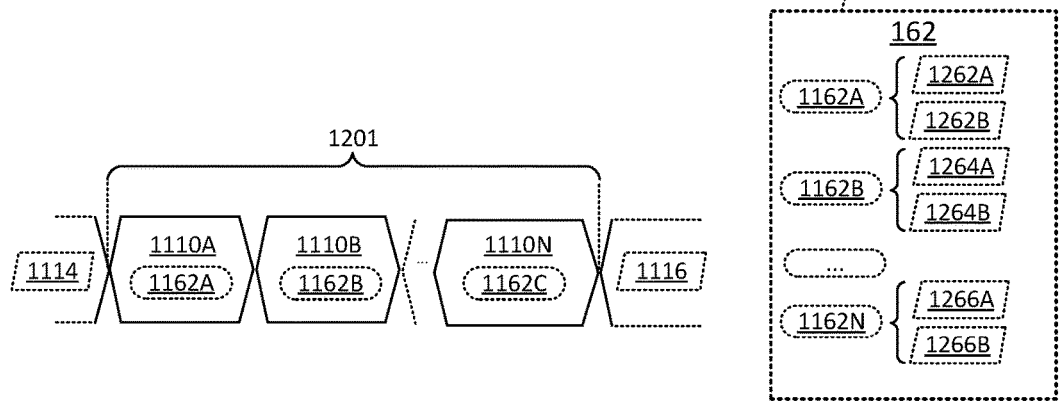

FIG. 12A is a schematic block diagram of a system 1200 comprising another embodiment of a non-volatile memory device 110 configured to efficiently transition between power states. The non-volatile memory device 110 of the FIG. 12A embodiment may be further configured to reduce the latency involved in transitioning from a non-operational, low-power state 1114 to an operational state 1116 by, inter alia, gradually resuming services 121 of the non-volatile memory device 110 in a determined order and/or providing access to the gradually resumed services 121 regardless of whether other services 121 of the non-volatile memory device 110 have been resumed. The services 121 may be implemented by use of respective resources 721 of the non-volatile memory device 110, which may include, but are not limited to: device interconnect resources 1220A, NVMe resources 1220B, back-end resources 1220N, and so on.

The device interconnect resources 1220A may be configured to implement interconnect services 1221A for the non-volatile memory device 110, which may include, but are not limited to: managing a configuration space of the non-volatile memory device 110 (e.g., a PCIe configuration space), establishing a link to the host computing system 140 via the interconnect 147, receiving data, commands, interrupts, and/or other information via the interconnect 147, responding to one or more interrupts received via the interconnect 147, transmitting data, commands, interrupts, and/or other information via the interconnect 147, registering interrupts pertaining to the non-volatile memory device 110, and so on. The device interconnect resources 1220A may comprise interface logic, interconnect interface logic, an interface controller, bus interface logic, a bus controller, arbitration logic, direct memory access (DMA) components, data buffer elements, physical layer components, media layer components, data link layer components, transaction layer components, and/or the like. An operating state 1223A of the interconnect resources 1220A may comprise information pertaining to the operating state of one or more of the interconnect services 1221A disclosed herein (e.g., PCIe configuration space, PCIe link, PCIe link status, PCIe interrupts, and/or the like). The operating state 1223A of the interconnect resources 1220A may be included in the operating state 123 of the NV memory device 110.

The NVMe resources 1220B may be configured to implement NVMe services 1221B, which may comprise and/or correspond to one or more NVMe standards and/or protocols (e.g., the NVMe EXPRESS standard). The NVMe services 1221B may comprise a communication layer (e.g., transaction layer) operating on the interconnect services 1221A implemented by the interconnect resources 1220A. The NVMe services 1221B implemented by the NVMe resources 1220B may include, but are not limited to: implementing one or more communication protocols (establishing an NVMe by use of the interconnect services 1221A), managing one or more NVMe registers, maintaining one or more NVMe data structures, servicing one or more NVMe queues, implementing NVMe data transfers, queuing NVMe commands, fetching NVMe commands, executing NVMe commands, issuing NVMe command completions, responding to NVMe interrupts, generating NVMe interrupts, and/or the like. The NVMe resources 1220B may include, but are not limited to: one or more registers, queues, buffers, processing logic, protocol logic, command processing logic, command execution logic, command fetch and/or arbitration logic, and/or the like. An operating state 1223A of the NVMe resources 1220B may comprise information pertaining to the operating state of one or more of the NVMe services 1221A disclosed herein (e.g., NVMe register status, NVMe data structure(s), NVMe queues, NVMe buffers, and/or the like). The operating state 1223B of the NVMe resources 1220B may be included in the operating state 123 of the NV memory device 110.

The BE resources 1220N may be configured to implement BE services 1221N for the non-volatile memory device 110, which may comprise managing storage operations within the NV memory 130, as disclosed herein. The BE resources 1220N may include, but are not limited to: NV memory control circuitry, on-chip and/or on-die control circuitry (e.g., control circuitry embodied on and/or within one or more die, chips, and/or planes of the NV memory 130), memory buffers, address decode circuitry, sense circuitry, bias circuitry, read circuitry, write circuitry, erase circuitry, processing logic, state machine circuitry, an ASIC, a micro controller, a programmable logic element, an FPGA, logical-to-physical translation circuitry, media management circuitry (e.g., a groomer, garbage collector, and/or the like), internal interconnect(s), and/or the like. The controller 120 may be communicatively coupled to the NV memory 130 by, inter alia, bus 127 (and/or BE resources). The bus 127 may be configured to communicate data, commands, control information, and/or the like, between the controller 120 and NV memory 130. The BE resources 1220N may be configured to maintain metadata pertaining to the NV memory 130, such as a translation layer, an FTL, a forward index, a reverse index, and/or the like. The BE services 1221N implemented by the BE resources 1220N may include, but are not limited to: memory operations, storage operations, read operations, write operations, erase operations, initialize operations, grooming operations, garbage collection operations, data refresh operations, and/or the like. An operating state 1223N of the BE resources 1220N may comprise information pertaining to the operating state of one or more of the BE services 1221N disclosed herein (e.g., logical-to-physical translation metadata, FTL, and/or the like). The operating state 1223N of the BE resources 1220N may be included in the operating state 123 of the NV memory device 110.

The resources 721 of the memory controller 120 may further comprise device processing resources (not shown in FIG. 12A to avoid obscuring details of the disclosed embodiments). The processing resources may include, but are not limited to: processing circuitry, a processing circuit, a processing unit, processing logic, a state machine, an ASIC, a micro controller, a programmable logic element, an FPGA, and/or the like, as disclosed herein. The processing resources may correspond to the operating state 123 of the non-volatile memory device 110. The operating state 123 pertaining to the processing resources may include, but is not limited to: firmware of the processing resources, configuration data, settings, register values, and/or the like.

The transition manager 126 may be configured to efficiently transition the non-volatile memory device 110 to/from different power states in response to host commands. Transitioning to a low-power state may comprise the transition manager 126 generating resume data 162 for the non-volatile memory device 110 and/or storing the resume data 162 within one or more of the AON partition 114 of the ODM 112, the HMB 160, NV memory 130, and/or the like. The resume data 162 may correspond to the operating state 123 of the non-volatile memory device 110, and may comprise information for configuring the resources 721 of the controller 120 to efficiently resume the services 121 implemented thereby. In some embodiments, the transition manager 126 may be configured to pre-populate resume data 162 for the non-volatile memory device 110 prior to receiving a command and/or other notification that the non-volatile memory device 110 is to transition to a low-power state 1114. Pre-populating the resume data 162 may further comprise detecting changes pertaining to the resume data 162 (by use of state monitor 726), accumulating delta metadata 772 in the AON partition 114, and/or updating the pre-populated resume data 162 in response to one or more condition(s), as disclosed herein.

The transition manager 126 may further comprise a gradual resume manager 1126, which may be configured to gradually resume selected services 121 of the non-volatile memory device 110 in accordance with an order in which the services 121 are required in the resume process 1101 between the host computing system 140 and the non-volatile memory device 110. The resume processes 1101 of the FIG. 12A embodiment may comprise phases 1110A-N. The initial phase 1110A may comprise resuming one or more of the interconnect services 1221A and/or using the interconnect resources 1220A to establish a link between the non-volatile memory device 110 and the host computing system 140 via the interconnect 147, as disclosed herein. The next phase 1110B of the resume processes 1101 may comprise resuming one or more of the NVMe services 1221B implemented by the NVMe resources 1220B of the non-volatile memory device 110. The last phase 1110N of the resume process 1101 may comprise resuming one or more of the BE services 1221N implemented by the BE resources 1220N of the non-volatile memory device 110.

The transition manager 126 may be configured to generate resume data 162 for the NV memory device 110. The resume data 162 may comprise information pertaining to the operating state 123 of the NV memory device 110, which may comprise information pertaining to the operating state 1223A-N of respective services 1221A-N. Generating the resume data 162 may comprise generating a resume dataset 1162A corresponding to the operating state 1223A of the interconnect resources 1220A, generating a resume dataset 1162B corresponding to the operating state 1223B of the NVMe services 1220B, and so on, including generating a resume dataset 1162N corresponding to the operating state 1223N of the BE resources 1221N.

The transition manager 126 may further comprise a resume data manager 1128, which may be configured to distinguish resume data 162 required during initial phase(s) 1110 of the resume processes 1101 from resume data 162 that is required later during the resume process 1101. As illustrated in FIG. 12A, the resume data manager 1128 may distinguish and/or arrange the resume data 162 into a resume dataset 1162A corresponding to the first phase 1110A of the resume process 1101, resume dataset 1162B corresponding to the second phase 1110B of the resume processes 1101, and so on, including resume data 1162N corresponding to the last phase 1110N of the resume process 1101.

The resume dataset 1162A may comprise information for resuming one or more of the interconnect resources 1220A required for completing the first phase 1110A of the resume process 1101 with the host computing system 140. The resume dataset 1162A may further comprise information for configuring the interconnect resources 1220A to establish a link between the non-volatile memory device 110 and the host computing system 140. The resume dataset 1162A may define a host-specific configuration for coupling the non-volatile memory device 110 to the interconnect 147. The resume dataset 1162A may comprise a link-up database for the non-volatile memory device 110, which may comprise data required for instantiating a link between the non-volatile memory device 110 and the computing system 140 within a configuration space of the interconnect 147 (e.g., a PCIe link). The resume dataset 1162A may define a PCIe configuration space for the non-volatile memory device 110 (e.g., define the state of PCIe registers, address mappings, interrupt handlers, and/or the like) The link metadata 725 may further define one or more Message Signaled Interrupts (MSI) implemented by the non-volatile memory device 110, comprise and/or reference an MSI and/or MSI-X table, and/or the like. In some embodiments, the resume dataset 1162A may further comprise information pertaining to the processing resources of the controller 120, such as active firmware, configuration data, settings, and/or the like.

The resume dataset 1162B may comprise information required for configuring the NVMe resources 1220B to resume the one or more NVMe services 1221B required to complete phase 1110B with the host computing system 140. The resume dataset 1162B may include, but are not limited to: information pertaining to one or more register(s), data structure(s), queue(s), buffer(s), and/or the like. The register(s) may comprise NVMe registers corresponding to the NVMe EXPRESS standard, which may include, but are not limited to: a controller capabilities register, a version register, a interrupt mask set register, an interrupt mask clear register, a controller configuration register, a controller status register, a NVM subsystem reset register, an admin queue attributes register, an admin submission queue base address register, an admin completion queue base address register, a controller memory buffer location register, a controller memory buffer size register, a boot partition information register, a boot partition read select register, a boot partition memory buffer location register, command set specific register(s), submission queue tail doorbell register(s), completion queue head doorbell register(s), vendor specific register(s), and so on. The data structure(s) may comprise information pertaining to one or more NVMe queue(s), which may include, but are not limited to: an admin queue, an admin submission queue, an admin completion queue, one or more I/O submission queues, one or more I/O completion queues, one or more virtual functions, and/or the like. The information pertaining to respective queues may include, but is not limited to: queue attributes, queue arbitration, queue base address, queue head address, queue tail address, queue status (e.g., whether the queue is full), queue size, queue capacity, queue priority, and/or the like. The buffer(s) may comprise transient write buffers, write coalescing buffers, and/or the like, as disclosed herein.

The resume dataset 1162N may comprise information required for configuring the BE resources 1220N to resume the one or more BE services 1221N required to complete phase 1110N with the host computing system 140 (and/or complete the gradual transition of the memory device to the operational state 1116). The resume dataset 1162N may comprise logical-to-physical translation metadata, such as an FTL, a forward map, and/or the like. The logical-to-physical translation metadata (e.g., FTL) may comprise translations between logical addresses of a logical address space and physical addresses of corresponding data stored within the NV memory 130. The resume dataset 1162N may further comprise information pertaining to respective physical addresses and/or regions of the NV memory 130, such as physical-to-logical translation metadata, a reverse map, a validity map, and so on. The status information pertaining to respective physical addresses and/or regions of the NV memory 130 may include, but is not limited to: information pertaining to data stored within the respective physical addresses and/or regions (if any), status information (e.g., whether the physical addresses and/or regions are programmed, erased, and/or the like), groomer information, garbage collection information, data refresh information (e.g., time since respective physical addresses and/or regions were refreshed), wear levels of respective physical addresses and/or regions, error metrics of respective physical addresses and/or regions, reliability metrics of the respective physical addresses and/or regions, and so on. The resume dataset 1162N may further comprise information pertaining to a storage log maintained on the NV memory 130, such as the physical address of an append point of the log (head of the log), the physical address of the tail of the log, information pertaining to free regions of the NV memory 130, and/or the like.

The resume data manager 1128 may be configured to store the resume dataset 1162A-N within selected storage locations in accordance with the order in which the resume dataset 1162A-N will be required in the resume processes 1101. The resume data manager 126 may assign a highest priority to the resume dataset 1162A required in the initial phase 1110A of the resume process 1101, assign a next highest priority to the resume dataset 1162B required in the next phase 1110B, and so on, with a lowest priority being assigned to the resume dataset 1162N not required until the last phase 1110N of the resume process 1101. The highest-priority resume dataset 1162A may be stored within a highest-performance storage location, such as the AON partition 114 of the ODM 112. Lower priority resume dataset 1162B-N may be stored in lower-performance storage locations. The next highest-priority resume dataset 1162B may be stored within one or more of the HMB 160, and/or NV memory 130 (if the HMB 160 is unavailable and/or lacks sufficient capacity to store all of the resume dataset 1162B), and so on, with the lowest priority resume dataset 1162N being stored in the HMB 160 (if sufficient capacity remains after storing other, higher-priority resume data 162 therein) and/or the NV memory 130.

In some embodiments, the resume data manager 1128 may be configured to store portions of the resume dataset 1162A-N in different storage location(s), based on the availability of such storage location(s). In the FIG. 12A embodiment, the resume data manager 1128 may partition the resume dataset 1162A into one or more portions, including a first portion 1262A and a second portion 1267B. The first portion 1262A may comprise resume dataset 1162A required at the beginning of the initial phase 1110A and, as such, may be stored within a highest-performance storage location available, such as the AON partition 114. The second portion 1262B may comprise resume dataset 1162A that is not required until later within the initial phase 1110A and, as such, may be stored in a lower-performance storage location if necessary (if the AON partition 114 lacks sufficient capacity). The resume data manager 1128 may be further configured to partition other resume dataset 1162B-N. The resume dataset 1162B may be partitioned into a first portion 1264A required at the beginning of the second phase 1110B and a second portion 1264B that may not be required until later during the second phase 1110B. The first portion 1264A may be stored within the HMB 160 and, if the HMB 160 lacks sufficient capacity, the second portion 1264B may be stored within a lower-performance storage location, such as the NV memory 130. The resume dataset 1162N may be partitioned into a first portion 1266A, which may be required at the beginning of the last phase 1110N and a second portion 1266B that may not be required until later during the last phase 1110N. The first portion 1266A may be stored within a higher-performance storage location (if available after storing other, higher-priority resume data, such as resume dataset 1162A and/or 1162B). The first portion 1266A may, for example, be stored within the HMB 160 and, if the HMB 160 lacks sufficient capacity, the second portion 1266B may be stored within the NV memory 130 and/or other storage location. The resume data manager 1128 may be further configured to record validation data 1163 (and/or addressing information) pertaining to respective resume dataset 1162A-N, such that individual resume datasets 1162A-N may be accessed and/or validated without accessing and/or validating other resume datasets 1162A-N, as disclosed herein.

FIG. 12B depicts further embodiments of a resume process 1202. The transition manager 126 may implement the resume process 1101 with the host computing system 140 by, inter alia, gradually transitioning the non-volatile memory device 110 from the low-power state 1114 to the operational state 1116. The gradual transition may comprise configuring the non-volatile memory device 110 to operate in one or more partial operational states 1115A and/or 1115B, as disclosed herein.

The resume processes 1101 may be initiated in response to the host computing system 140 issuing a wakeup request 1103 to the non-volatile memory device 110 and/or the non-volatile memory device 110 receiving the wakeup request 1103 (at time t0), as disclosed herein. In response to the wakeup request 1103, the transition manager 126 may be configured to: a) resume the one or more interconnect services 1221A required in phase 1110A, and/or b) use configure the interconnect resources 1220A to establish a link between the non-volatile memory device 110 and the host computing system 140. The resume data manager 1128 may read the resume dataset 1162A required during phase 1110A from one or more storage locations without reading other resume dataset 1162B-N not required during phase 1110A. In some embodiments, the resume data manager 1128 is further configured to read a first portion of the resume data 1262A required during a first part of the initial phase 1110A before reading a second portion of the resume data 1262B required during a later part of the initial phase 1110A. The transition manager 126 may be configured to transition the non-volatile memory device 110 from the low-power state 1114 to the partial operational state 1115A, which may comprise the gradual resume engine 1126 providing the host computing system 140 with accesses to the one or more interconnect services 1221A while other services 121 remain unavailable. The initial phase 1110A may complete when the link is established at time t1 (e.g., when a PCIe link between the non-volatile memory device 110 and the host computing system 140 has been brought up).

The second phase 1110B of the resume process 1101 may comprise reading the resume dataset 1162B and/or using the resume dataset 1162B to configure the NVMe resources 1220B to resume the NVMe services 1221B required to complete phase 1110B with the host computing system 140. The second phase 1110B may comprise gradually resuming the non-volatile memory device 110 from partial operational state 1115A (in which only certain interconnect services 1221A are available) to partial operational state 1115B (in which additional NVMe services 1221B of the non-volatile memory device 110 are available to the host computing system 140). The second phase 1110B may complete when the host verifies that the required NVMe services 1221B are up (at time tN). The second phase 1110B may comprise implementing an NVMe protocol and/or communication layer by use of the interconnect services 1221A resumed during the first phase 1110A. The partial operational phase 1115B may comprise a "passive" state in which the NV memory device 110 accepts NVMe commands (and/or other messages) via the NVMe protocol, but does not issue any corresponding read/write transactions and/or fetch pending NVMe commands from the host computing system 140. The last phase 1110N may comprise: a) reading resume dataset 1162N (and/or portions 1262A, 1262B thereof), and b) using the resume dataset 1162N to resume one or more of the BE services 1221N. The last phase 1110N may complete in response to the host computing system 140 verifying that the required BE services 1221N are up (at time t3). required to transition the non-volatile memory device 110 from the partial operational state 1115B to the operational state 1116, as disclosed herein.

Although particular examples of resume processes 1101 are described herein, the disclosure is not limited in this regard and could be adapted for use in any suitable type of resume process 1101 having any corresponding timing, phases, processing sequence, interaction(s), and/or the like. In some embodiments, one or more of the phases 1110 of the resume process 1101 may be implemented concurrently and/or independently of one another. In other embodiments, the phases 1110 of the resume process 1101 may be defined at a lower-level of granularity (e.g., may correspond respective portions of the interconnect services 1221A, NVMe services 1221B, BE services 1221N, and/or the like).

Referring back to FIG. 12A, the controller 120 may be further configured to pre-populate the resume data 162 to one or more storage locations (e.g., one or more RSR 1132A-N, as disclosed herein). Pre-populating the resume data 162 may comprise generating and/or storing the resume data 162 during normal operation of the non-volatile memory device 110, prior to receiving a command, request, or other notification that the non-volatile memory device 110 is to transition to the low-power state 1114. Pre-populating the resume data 162 may further comprise identifying resume dataset 1162A-N required during respective phases 1110A-N of the resume process 1101 and/or selecting storage locations for the resume dataset 1162A-N accordingly. Pre-populating the resume dataset 1162A required during the initial phase 1110A of the resume process 1101 may comprise writing the resume dataset 1162A to the AON partition 114, designating regions of the ODM 112 as the AON partition, and/or the like. Pre-populating the resume dataset 1162B-N required during subsequent phases 1110B-N of the resume process 1101 may comprise storing the resume dataset 1162B-N (and/or portions thereof) within the HMB 160, as disclosed herein, recoding changes pertaining to the pre-populated resume dataset 1162B-N in delta metadata 772, updating the pre-populated resume dataset 1162B-N, and so on, as disclosed herein.

FIG. 13A is a flow diagram of another embodiment of a method 1300 for efficiently transitioning to a low-power state, a disclosed herein. The method 1300 may be implemented in response to a request to transition the non-volatile memory device 110 to the low-power state 1114, a pre-population operation, and/or the like. Step 1302 may comprise generating resume data 162 for the non-volatile memory device 110. As disclosed herein, the resume data 162 may comprise information for resuming operation of one or more services 121 of the non-volatile memory device 110 from the low-power state 1114. Step 1302 may comprise prioritizing the resume data 162, which may comprise distinguishing portions of the resume data 162 that will be required before other resume data 162 in the resume process 1101. Step 1302 may comprise identifying portion(s) of the resume data 162 comprising information pertaining to services 121 involved in an initial phase 1110A of the resume process 1101, portions(s) involved in a next phase 1110B, and so on, including portion(s) of the resume data 162 pertaining to services involved in a last phase 1110N of the resume process 1101. Step 1302 may comprise arranging the resume data 162 into respective datasets 1162A-N, each resume dataset 1162A-N comprising information for resuming a designated set of services 1121A-N and/or 1221A-N. Alternatively, or in addition, step 1302 may comprise generating resume datasets 1162A-N corresponding to respective phases 1110A-N of the resume process 1101.

Steps 1304 and 1306 may comprise storing the resume data 162 such that high-priority resume data 162 are stored in high-performance storage locations and lower-priority resume data 162 are stored in lower-performance storage locations. Step 1304 may comprise identifying the highest-priority resume data 162 remaining to the stored, and storing the identified resume data 162 in the highest-performance storage location(s) available to store the identified resume data 162. Step 1306 may comprise determining whether portion(s) of the resume data 162 remain to be stored. If so, the flow may continue back at step 1306; otherwise, the flow may complete at step 1312.

As illustrated above, steps 1304 and 1306 may comprise iteratively storing portion(s) of the resume data 162 for the non-volatile memory device 110 according to the order in which the portion(s) will be accessed during the subsequent resume process 1101. A first iteration of step 1304 may comprise distinguishing highest-priority portion(s) of the resume data 162 to be accessed first in the resume process 1101. The first iteration of step 1304 may comprise producing a resume dataset 1162A comprising information for resuming the interconnect resources 1221A needed to bring-up a link between the non-volatile memory device 110 and the host computing system 140 (e.g., establish a PCIe link). The first iteration of step 1304 may further comprise storing the highest-priority resume data 162 in highest-performance storage location(s) available for storing the resume data. The first iteration of step 1304 may comprise storing the resume dataset 1162A within the AON partition 114 of the ODM 112. In some embodiments, the first iteration of step 1304 may comprise storing a first portion 1272A of the resume dataset 1162A in the AON partition 114 and storing a second portion 1272B of the resume dataset 1162A in the HMB 160. Alternatively, in embodiments in which contents of the AON partition 114 will not be retained, the first iteration of step 1304 may comprise storing the resume dataset 1162A within the HMB 160 and/or other storage location(s), as disclosed herein.

The second iteration of step 1304 may comprise storing resume data 162 for resuming services 121 of the non-volatile memory device 110 involved in a second phase 1110B of the resume process 1101. The second iteration of step 1304 may comprise generating a resume dataset 1162B comprising information pertaining to the NVMe services 1221B of the non-volatile memory device 110. The resume dataset 1162B may comprise information pertaining to one or more NVMe registers, NVMe data structures, NVMe queues, NVMe buffers, NVMe interrupts, and/or the like. The second iteration of step 1304 may further comprise storing the resume dataset 1162B in highest-performance storage location(s) remaining after the first iteration of step 1304. Step 1304 may comprise storing the resume dataset 1162B in the HMB 160.

A last iteration of step 1304 may comprise generating and/or storing the resume dataset 1162N in remaining storage location(s) remaining after storing higher-priority resume data 162 in the preceding iterations of step 1304. The last iteration of step 1304 may comprise storing the resume dataset 1162N in the HMB 160 (if available). In some embodiments, the last iteration of step 1304 may comprise storing a first portion 1266A of the resume dataset 1162N in the HMB 160 and a second portion 1266B in the NV memory 130.

Although FIG. 13A illustrates embodiments of an iterative process for the creation and/or storage of resume data 162, the disclosure is not limited in this regard. In some embodiments, step 1301, and the iterative steps 1304 and 1306, for generating and/or storing resume data 162 for the non-volatile memory device 110 may be implemented in a single iteration. Step 1301 may comprise generating a plurality of resume datasets 1162A-N, each dataset 1162A-N comprising a portion of the resume data 162 required during a respective phase 1110A-N of the resume process. Step 1303 may comprise storing respective resume datasets 1162A-N in respective RSR 1132A-N according the order in which the respective datasets 1162A-N will be required, such that the dataset 1162A required first is stored in a highest-performance RSR 1132A, the dataset 1162B required next is stored in a next-highest-performance RSR 1132B, and so on.

FIG. 13B is a flow diagram illustrating another embodiment of a method 1320 for transitioning a non-volatile memory device 110 to a low-power state. Step 1321 may comprise generating resume data 162 for the non-volatile memory device 110, as disclosed herein. Step 1321 may comprise generating a plurality of resume datasets 1162A-N, each comprising information to be accessed at a different time during a resume process 1101. Each resume dataset 1162A-N may comprise information required during a respective phase 1110A-N of the resume process 1101. In the FIG. 13B embodiment, step 1321 comprises generating an interconnect resume dataset at step 1324A, generating an NVMe resume dataset at set 1324B, and so on, including generating a BE resume dataset at set 1324N. The steps 1324A-N may be implemented substantially concurrently, as disclosed herein. Step 1326 may comprise storing the generated resume datasets within one or more storage location(s), such as the RSR 1132A-N, disclosed herein. Step 1326 may comprise storing the interconnect resume dataset of step 1324A in high-performance storage, such as the AON partition 114, storing the NVMe resume dataset of step 1324B in next-highest-performance storage, and so on, with the BE resume dataset of step 1324N being stored in highest-performance storage remaining. In some embodiments, step 1326 comprises storing the interconnect resume dataset in the AON partition 114 and storing the NVMe resume dataset and/or BE resume dataset in the HMB 160. Alternatively, or in addition, step 1326 may comprise storing the interconnect dataset in the AON partition 114, storing the NVMe resume dataset in the HMB 160, storing a first portion 1266A of the BE resume dataset in the HMB 160, and storing a second portion 1266B of the BE resume dataset in NV memory 130. In another embodiment, step 1326 may comprise storing the interconnect dataset in the AON partition 114, storing a first portion 1264A of the NVMe resume dataset in the HMB 160, and storing a second portion 1264B of the NVMe resume dataset and/or BE resume dataset in the NV memory 130. In yet another embodiment, step 1326 may comprise storing the interconnect dataset, portion(s) of the NVMe dataset, and/or portion(s) BE dataset in the HMB 160. Step 1326 may further comprise recording respective validation data 1163 (and/or addressing information) for each of the interconnect dataset, NVMe dataset, and/or BE dataset, such that each dataset is capable of being read and/or validated independently of other datasets.

Figure 14:
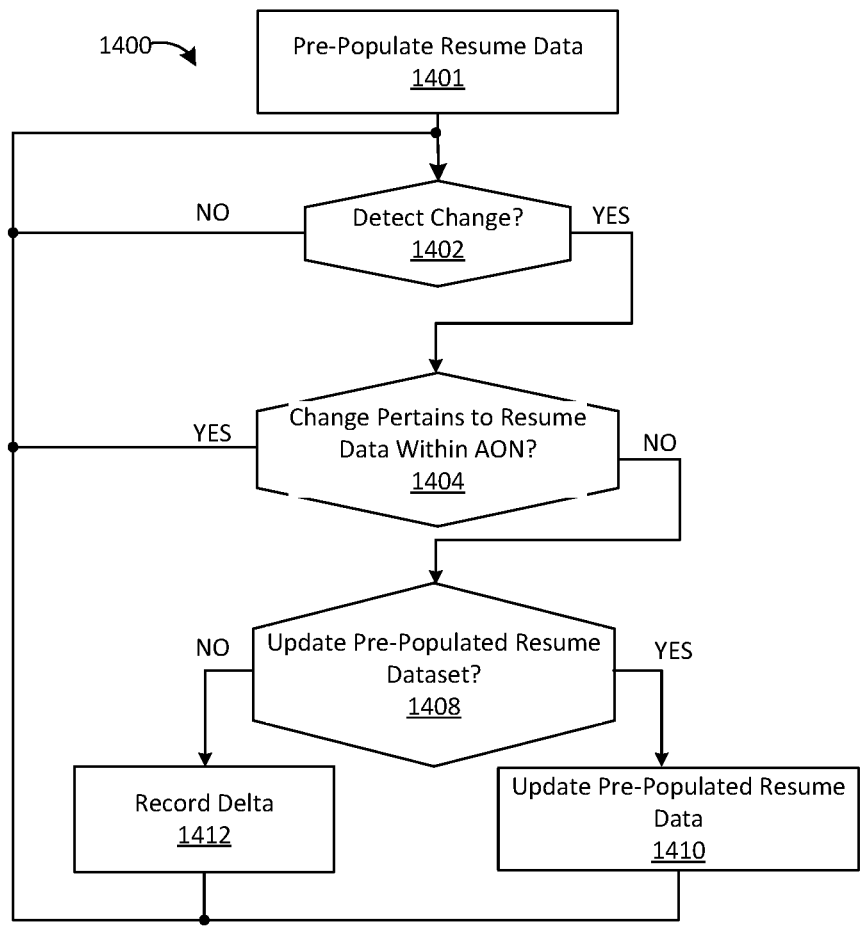
FIG. 14 is a flow diagram of another embodiment of a method for pre-populating resume data for a memory device prior to the memory device transitioning to a low-power state.

FIG. 14 is a flow diagram of another embodiment of a method 1400 for pre-populating resume data 162 to one or more storage location(s), as disclosed herein. Step 1401 may comprise initiating the pre-population of resume data 162 in response to one or more of: completing initialization of the non-volatile memory device 110, updating a resume snapshot 762, updating pre-populated resume data 162, and/or the like. Step 1401 may comprise generating resume data 162 and/or storing the resume data 162 in one or more storage locations. Step 1401 may comprise identifying portion(s) of the resume data 162 to be required before other portion(s) during a subsequent resume process 1101. Step 1401 may further comprise prioritizing the resume data 162 and/or arranging the resume data 162 into respective resume datasets 1162A-N, as disclosed herein. Step 1401 may further comprise selecting storage location(s) for the respective resume datasets 1162A-N in accordance with the priorities of the resume datasets 1162A-N. Step 1401 may be implemented by one or more of the transition manager 126 and/or resume data manager 1128, as disclosed herein.

Step 1402 may comprise monitoring the operating state 123 of the non-volatile memory device 110, contents 113 of the ODM 112, and/or the like in order to, inter alia, detect changes pertaining to the resume data 162 pre-populated at step 1401. Step 1402 may be implemented by the state monitor 726, as disclosed herein. In response to detecting a change at step 1402, the flow may continue at step 1404; otherwise, the monitoring may continue at step 1402.

Step 1404 may comprise determining whether the detected change pertains to resume data 162 pre-populated within the AON partition 114 (and/or RSR 1132A or other on-device memory location). If so, the flow may continue back at step 1402 (since, inter alia, the pre-populated resume data 162 within the AON partition 114, or other on-device memory location, may be updated in-place, without recording separate delta metadata 772). If the change pertains to resume data 162 pre-populated within a storage location other than the AON partition 114 (and/or other on-device memory location), the flow may continue at step 1408. Step 1408 may comprise determining whether to update the pre-populated resume data 162 affected by the change. Step 1408 may comprise comparing a number and/or amount of changes pertaining to the resume data 162 accumulated within the AON partition 114 (and/or other on-device memory location) to one or more thresholds. Alternatively, or in addition, step 1408 may comprise determining whether a threshold period of time has elapsed since the resume data 162 was pre-populated, as disclosed herein. If the determination of step 1408 is to update the pre-populated resume data 162, the flow may continue at step 1410; otherwise, the flow may continue at step 1412. Step 1410 may comprise replacing the pre-populated resume data 162 with updated resume data 162, as disclosed herein. Step 1412 may comprise recording the change pertaining to the pre-populated resume data 162 in delta metadata 772 maintained within the AON partition 114 and/or other on-device memory location. Following steps 1410 and/or 1412, the flow may continue at step 1402.

Figure 15:
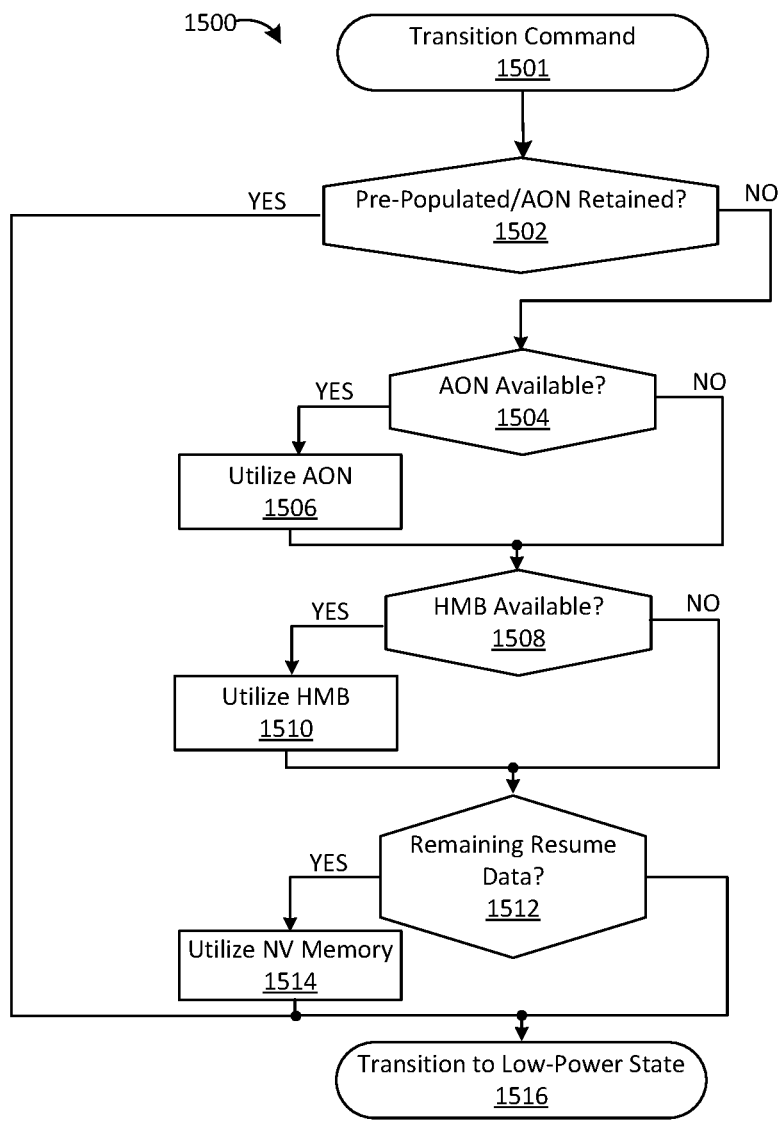
FIG. 15 is a flow diagram illustrating another embodiment of a method for transitioning a memory device to a low-power state.

FIG. 15 is a flow diagram of another embodiment of a method 1500 for efficiently transitioning a non-volatile memory device 110 to a low-power state. Step 1501 may comprise receiving a command and/or request to transition the non-volatile memory device 110 to a low-power state (e.g., low-power state 1114). Step 1501 may comprise receiving the command from the host computing system 140, as disclosed herein. Alternatively, or in addition, step 1501 may comprise determining to transition the NV memory device 110 to the low-power state independent of the host computing system 140 (e.g., in response to detecting a determined condition and/or event, such as the link between the NV memory device 110 and the host computing system 140 being idle for a threshold period of time). Step 1502 may comprise determining whether resume data 162 has been pre-populated to one or more storage location(s), as disclosed herein. Step 1502 may further comprise determining whether the AON partition 114 will be retained during the transition to the low-power state. Step 1502 may comprise accessing the AON partition 114 to identify resume data 162 pre-populated therein and/or to identify addressing information corresponding to resume data 162 (and/or a resume snapshot 762) pre-populated within the HMB 160. If step 1502 indicates that resume data 162 has been pre-populated and the AON partition 114 will be retained in the low-power state, the flow may continue at step 1516 (e.g., the transition manager 126 may transition to the low-power state 1114 immediately in response to the command of step 1501). If the determination of step 1502 is that resume data 162 has not been pre-populated and/or the AON partition 114 will not be retained during the low-power state, the flow may continue to step 1504.

Step 1504 may comprise determining whether the AON partition 114 is available for storing resume data 162. The determination of step 1504 may be based on whether the non-volatile memory device 110 comprises an AON partition 114, and/or whether the non-volatile memory device 110 is transitioning to power state in which power can continue to be provided to the AON partition 114. If the determination of step 1504 is that the AON partition 114 is available, the flow may continue at step 1506; otherwise, the flow may continue at step 1508.

Step 1506 may comprise utilizing the AON partition 114 to store resume data 162, which may comprise identifying high-priority resume data 162 suitable for storage within the AON partition 114 (e.g., distinguishing resume data 162 required immediately when transitioning from the low-power state 1114 from resume data 162 that is not required immediately). Step 1506 may comprise generating and/or identifying a resume dataset 1162A required during a first phase 1110A of the resume process 11101 and/or resume dataset 1162A required for establishing a PCIe connection between the non-volatile memory device 110 and host computing system 140 (e.g., in phase 1110A of the resume process 1101). Step 1506 may further comprise storing other, lower-priority data within a remaining capacity of the AON partition 114 (if any). Step 1508 may comprise determining whether the HMB 160 is available for storing resume data 162. Step 1508 may comprise requesting an allocation of host memory, as disclosed herein. If the determination of step 1508 is that HMB 160 is available, the flow may continue to step 1510; otherwise, the flow may continue to step 1512. Step 1510 may comprise utilizing the HMB 160 to store resume data 162 for the memory device 1110. Step 1510 may comprise identifying highest-priority resume data 162 remaining to be stored (e.g., highest-priority resume data 162 not already stored in the AON partition 114). Step 1510 may comprise storing the identified resume data 162 within the HMB 160 (e.g., resume dataset 1162B, resume dataset 1162B, and/or the like). Step 1510 may further comprise storing lower-priority resume data 162 within a remaining capacity of the HMB 160 (if any).

Step 1512 may comprise determining whether resume data 162 remains to be stored (e.g., whether the capacity of the AON partition 114 and/or HMB 160 was insufficient to store the resume data 162 for the non-volatile memory device 110). If the determination of step 1512 is that resume data 162 remains to be stored, the flow may continue at step 1514; otherwise, the flow may continue at step 1516. Step 1514 may comprise storing the remaining resume data 162 identified at step 1512 within the NV memory 130 (and/or other storage location). Step 1516 may comprise transitioning the non-volatile memory device 110 to the low-power state 1114, as disclosed herein.

Figure 16:
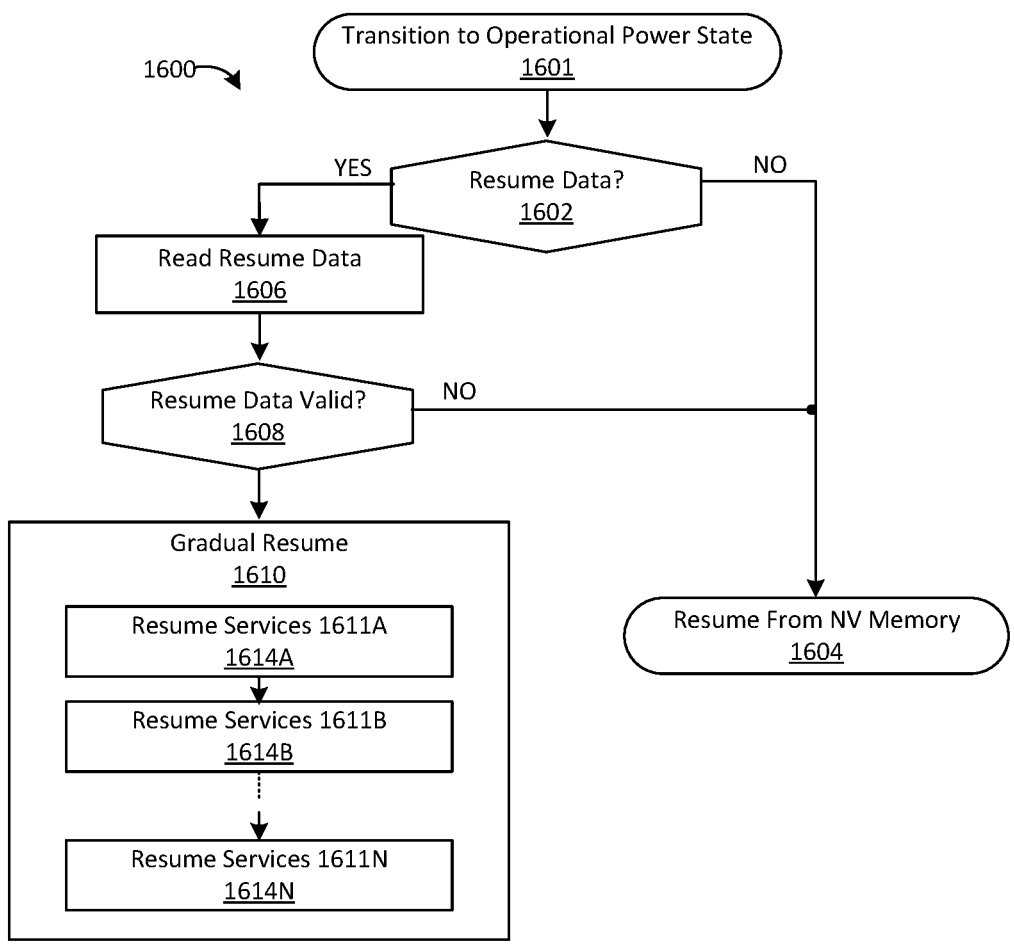
FIG. 16 is a flow diagram illustrating another embodiment of a method for gradually resuming a memory device.

FIG. 16 is a flow diagram of one embodiment of a method 1600 for gradually resuming a non-volatile memory device 110, as disclosed herein. Step 1601 may comprise initiating a transition from a low-power state 1114 of the non-volatile memory device 110 to an operational state 1116. Step 1601 may comprise the host computing system 140 issuing a resume command, wakeup request 1103, and/or the like. Step 1601 may comprise the non-volatile memory device 110 receiving the resume command, wakeup request 1103, and/or the like via the interconnect 147 and/or other communication mechanism. Alternatively, or in addition, step 1601 may comprise determining to transition the NV memory device to the operational power state independent of a command and/or request from the host computing system 140. Step 1601 may comprise determining to transition the NV memory device 110 by one or more components of the NV memory device 110, such as the controller 120, PMIC 124, transition manager 126, and/or the like. Step 1601 may comprise detecting a condition and/or operation that involves one or more interactions between the NV memory device 110 and the host computing system 140.

Step 1602 may comprise determining whether resume data 162 for the non-volatile memory device 110 is stored within one or more storage location(s) accessible to the transition manager 126. Step 1602 may comprise searching the AON partition 114 and/or other memory location (e.g., a storage location of the PMIC 124) for the validation data 163, 1163 (and/or addressing information) pertaining to the resume data 162. Step 1602 may comprise identifying the validation data 163,1163 (and/or addressing information) pertaining to respective resume datasets 1162A-N and/or resume dataset 1162A-N, stored within different respective storage location(s) and/or at different respective addresses, as disclosed herein. Alternatively, or in addition, step 1602 may comprise receiving information pertaining to the resume data 162 from the host computing system 140. Step 1602 may comprise accessing addressing information for the resume data written to a PCIe register. In some embodiments, step 1602 may comprise receiving an NV set features command indicating that the HMB 160 comprising resume data 162 has been returned to the non-volatile memory device 110 and that the contents of the HMB 160 were unchanged while the non-volatile memory device 110 was in the low-power state 1114. If the determination of step 1602 is that resume data 162 is available, the flow may continue at step 1606; otherwise, the flow may continue at step 1604, where the transition manager 126 may resume operation from the NV memory 130, as disclosed herein.

Step 1606 may comprise reading resume data 162 from one or more storage locations, such as the AON partition 114 of the ODM 112, the HMB 160, the NV memory 130, and/or the like. In some embodiments, step 1606 may comprise reading in substantially all of the resume data 162. Alternatively, step 1606 may comprise reading in selected portions of the resume data 162. The selected portions may be read in accordance with the order in which the portions are required during the gradual resume operation(s) 1610. Step 1608 may comprise validating the resume data 162 and/or respective portions thereof (e.g., respective resume datasets 1162A-N and/or resume dataset 1162A-N). If step 1608 indicates that the resume data 162 (and/or portions thereof) are invalid, the flow may continue at step 1604; otherwise, the flow may continue at step 1610.

Step 1610 may comprise gradually resuming the memory device from the low-power state 1114, which may comprise transitioning to one or more partial operational states 1115A-N. As disclosed herein, transitioning to a partial operational state 1115A-N may comprise resuming selected services 121 of the non-volatile memory device 110 without resuming one or more other services 121 of the non-volatile memory device 110. Transitioning to a partial operational state 1115A-N may further comprise making the selected services 121 available to the host computing system 140 while the one or more other services of the non-volatile memory device 110 remain non-operational and/or unavailable. Step 1610 may comprise gradually resuming services 121 of the non-volatile memory device 110 according to the order in which respective services 121 are required in a resume processes 1101 with the host computing system 140. Step 1610 may comprise resuming respective services 121 according to a priority assigned thereto. The priority of the respective services 121 may be recorded in, inter alia, resume data 162 for the memory device (the resume data accessed at step 1660), in firmware and/or configuration data of the controller 120, transition manager 126, and/or the like.

Step 1614A may comprise resuming services 1611A of the non-volatile memory device 110. Step 1614A may comprise identifying highest-priority services 121 of the non-volatile memory device 110 and/or services 121 required first during the resume process 1101 between the host computing system 140 and the non-volatile memory device 110, as disclosed herein. The services 1611A may comprise interconnect services 1212A. Alternatively, or in addition, the services 1611A may comprise one or more processing services of the controller 120. Step 1614A may comprise reading resume data 162 pertaining to services 1611A. Step 1614A may comprise accessing the resume data 162 accessed at step 1606 and/or validated at step 1608. The resume data 162 may comprise information for resuming substantially all of the services 121 of the non-volatile memory device 110. Alternatively, or in addition, step 1614A may comprise accessing resume data 162 pertaining to the services 1611A being resumed in step 1614A without accessing resume data 162 pertaining to other services 121 not being resumed in step 1614A (e.g., without reading in and/or validating resume data 162 pertaining to services 1611B-N). Step 1614A may comprise accessing a subset of the resume data 162 stored within a high-performance storage location (e.g., accessing resume dataset 1162A stored within RSR 1132A, resume dataset 1162A within the AON partition 114 of the ODM 112, and/or the like). Step 1614A may further comprise resuming the services 1614A without resuming one or more other services 121 of the non-volatile memory device 110 and/or making the resumed services 1611A available to the host computing system 140, as disclosed herein. Step 1614A may comprise notifying the host computing system 140 that the services 1611A are available, establishing a link between the host computing system 140 and the non-volatile memory device 110 via the interconnect 147 (e.g., bringing up a PCIe link), responding to a wakeup request 1103 (and/or other command) from the host computing system 140, notifying the host computing system 140 of the status of the non-volatile memory device 110, and/or the like, as disclosed herein. Step 1614A may comprise representing to the host computing system 140 that the non-volatile memory device 110 has resumed operation, despite the fact that only a subset of the services 1221A of the non-volatile memory device 110 have been resumed. Step 1614A may comprise issuing a resume and/or availability message to the host computing system 140 via the interconnect 147. Step 1614A may comprise, inter alia, establishing a PCIe link to the host computing system 140, as disclosed herein. Step 1614A may further comprise transitioning the non-volatile memory device 110 from the non-operational, low-power state 1114 to a partial operational state 1115A, as disclosed herein.

In some embodiments, step 1614A further comprises processing incoming commands from the host computing system 140 by use of the gradual resume manager 1126, as disclosed herein. Step 1614A may comprise handling incoming commands pertaining to services 121 that have not yet been resumed. Step 1614A may comprise one or more of: buffering, queuing, rejecting, delaying, and/or interrupting such commands, as disclosed herein. Step 1614A may further comprise allowing commands pertaining to services 121 that have been resumed to be executed by resources 721 of the controller 120. Step 1614A may comprise allowing commands pertaining to the interconnect services 1221A to be executed by the interconnect resources 1220A of the controller 120. Step 1614A may comprise resuming interconnect services 1221A, which may comprise establishing a link between the NV memory device 110 and the host computing system 140 (e.g., a PCIe link).

Step 1614B may comprise gradually resuming next highest-priority services 1611B of the memory device, as disclosed herein. The services 1611B may comprise NVMe services 1221B. The services 1611B may further comprise resuming processing and/or interconnect services 1221A not resumed during step 1614A. Step 1614B may comprise identifying the services 1611B to be resumed, accessing resume data 162 pertaining to the services 1611B (resume dataset 1162B and/or resume dataset 1162B), resuming the services 1611B, and/or making the resumed services 1611B available to the host computing system 140, as disclosed herein. Step 1614B may further comprise implementing phase 1110B of the resume process 1101 with the host computing system 140, which may comprise the host computing system 140 accessing one or more of the NVMe services 1221B resumed in step 1614B. Step 1614B may comprise implementing an NVMe communication protocol and/or transaction layer by use of the link established during step 1614A. Step 1614B may comprise implementing the NVMe protocol passively in which the NV memory device 110 accepts NVMe commands (and/or other messages) via the NVMe protocol, but does not issue any corresponding read/write transactions and/or fetch pending NVMe commands from the host computing system 140.

The gradual resume step 1610 may continue resuming services 121 of the non-volatile memory device 110 according to the determined order thereof to step 1614N. Step 1614N may comprise resuming lowest-priority services 1611N of the non-volatile memory device 110. Services 1611N may comprise one or more BE services 1221N of the non-volatile memory device 110, as disclosed herein. Services 1611N may further comprise one or more processing services, interconnect services 1221A, NVMe services 1221B, and/or the like, that have not yet been resumed. Step 1614N may comprise transitioning the non-volatile memory device 110 to the operational state 1116, as disclosed herein.

Figure 17:
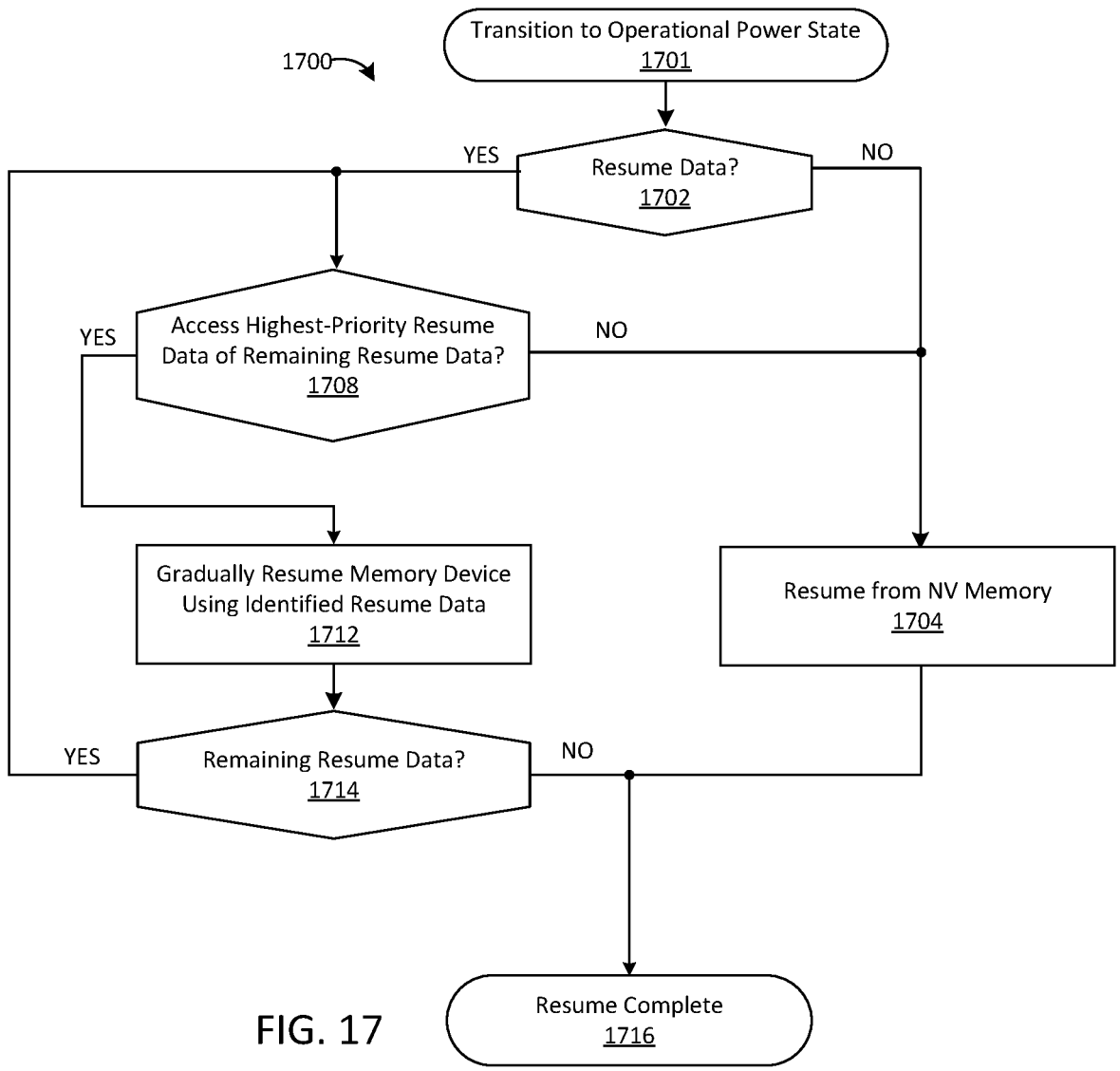
FIG. 17 is a flow diagram illustrating another embodiment of a method for gradually resuming a memory device.

FIG. 17 is a flow diagram of another embodiment of a method 1700 for gradually resuming a non-volatile memory device 110. Step 1701 may comprise transitioning the non-volatile memory device 110 from a low-power state. Step 1701 may comprise receiving a request, command, directive, interrupt, and/or the like at the non-volatile memory device 110. Step 1701 may comprise receiving a wakeup request 1103, as disclosed herein. Alternatively, or in addition, step 1701 may comprise determining to transition the NV memory device 110 to the operational state (and/or issuing a wakeup command by one or more components of the NV memory device 110), as disclosed herein.

Step 1702 may comprise determining whether resume data 162 for the memory device is available in one or more storage location(s), as disclosed herein (e.g., within one or more RSR 1132A-N. If the determining of step 1702 is that no resume data 162 is available, the flow may continue to step 1704, where the transition manager 126 may resume from the NV memory 130, as disclosed herein; otherwise, the flow may continue at step 1706.

Step 1706 may comprise identifying highest-priority resume data 162. Step 1706 may comprise accessing validation data 1163 (and/or addressing information) pertaining to one or more resume datasets 1162A-N and/or resume dataset 1162A-N within one or more storage location(s), which may include, but are not limited to: the AON partition 114, the PMIC 124, the ODPS 133, the HMB 160, a register (e.g., a PCIe register), and/or the like. Alternatively, or in addition, step 1706 may comprise receiving addressing information pertaining to the resume data 162 may comprise receiving addressing information pertaining to the resume data 162 from the host computing system 140 (e.g., in a NV set features command returning the HMB 160 to the non-volatile memory device 110), as disclosed herein.

Step 1706 may comprise prioritizing portions of the resume data 162 according to the order in which the portions will be accessed while gradually resuming the non-volatile memory device 110. Step 1706 may comprise prioritizing resume data 162 pertaining to services 121 to be accessed first during a resume process 1101 with the host computing system 140 from resume data pertaining to services 121 that will be accessed later in the resume process 1101. Step 1706 may comprise determining that the resume data 162 comprises one or more portions, such as a plurality of resume datasets 1162A-N, as disclosed herein. Step 1706 may further comprise determining a priority of the respective resume datasets 1162A-N, validation data 1163, and/or addressing information of the respective resume datasets 1162A-N. Step 1706 may comprise distinguishing a highest priority dataset 1162A from lower-priority datasets 1162B-N.

Step 1706 may further comprise validating the resume data 162 (and/or portion(s) thereof), as disclosed herein. Step 1706 may comprise validating portions of the resume data 162 separately from other portions of the resume data 162 by use of, inter alia, respective validation data 1163. If the resume data 162 of step 1708 cannot be accessed and/or is determined to be invalid, the flow may continue to step 1704; otherwise, the flow may continue to step 1712.

Step 1712 may comprise gradually resuming the non-volatile memory device 110 by use of the resume data 162 accessed at step 1706. Step 1712 may comprise resuming services 121 corresponding to the accessed resume data 162, which may comprise resuming selected services 121 of the non-volatile memory device 110 in accordance with the order in which the services 121 will be utilized in the resume processes 1101 with the host computing system 140, as disclosed herein.

Step 1714 may comprise determining whether there are remaining resume data 162 to access and/or process. Step 1714 may comprise determining whether one or more portions of the resume data 162 remain to be accessed. Step 1714 may comprise determining whether resume data 162 remains to be read from one or more storage location(s). Step 1714 may comprise determining whether one or more resume datasets 1162B-N remain to be accessed from one or more RSR 1132A-N, as disclosed herein. If the determination of step 1714 is that there are remaining resume data 162 to access, the flow may continue back to step 1708; otherwise, the resume may complete at step 1706.

The method 1700 may comprise iteratively implementing steps 1708, 1712, and 1714. A first iteration may comprise reading resume dataset 1162A at step 1708 (without reading other resume datasets 1162B-N) and resuming services 1121A and/or 1221A corresponding to resume dataset 1162A. The first iteration may further comprise making the services 1121A and/or 1221A available to the host computing system 140, as disclosed herein (e.g., transitioning from the low-power state to a partial operational state 1115A).

The first iteration may further comprise completing the first phase 1110A of the resume process 1101, as disclosed herein. The first iteration of step 1708 may comprise reading resume data 162 pertaining to the interconnect services 1221A, such as a PCIe configuration space and/or the like, as disclosed herein. The first iteration of step 1712 may comprise resuming the interconnect services 1221A by, inter alia, bringing up a PCIe link between the non-volatile memory device 110 and the host computing system 140.

A second iteration of step 1708, 1712, and 1714 may comprise reading resume dataset 1162B (without reading other resume datasets 1162C-N) and resuming services 1121B and/or 1221B. The second iteration may further comprise completing a second phase 1110B of the resume process 1101 with the host computing system 140 and/or transitioning from partial operational state 1115A to partial operational state 1115B. Subsequent iterations of steps 1708, 1712, and 1714 may comprise gradually resuming other services 1121C-N and/or 1221C-N of the non-volatile memory device 110 by use of corresponding resume data 162 until a last phase 1110N of the resume process 1101 is complete.

The subject matter described herein can be implemented in any suitable NANO flash memory, including 20 or 30 NANO flash memory. Semiconductor memory devices include volatile memory devices, such as dynamic random access memory ("DRAM") or static random access memory ("SRAM") devices, nonvolatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NANO or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NANO configuration (NANO memory) typically contain memory elements connected in series. A NANO memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NANO and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NANO memory array, the memory elements may be coupled together to form a NANO string within a single horizontal (e.g., x-z) memory device levels. Alternatively, the memory elements may be coupled together to form a vertical NANO string that traverses across multiple horizontal memory device levels. Other three dimensional configurations can be envisioned wherein some NANO strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that the subject matter described herein is not limited to the two dimensional and three dimensional exemplary structures described but cover all relevant memory structures within the spirit and scope of the subject matter as described herein and as understood by one of skill in the art.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

One embodiment includes a non-volatile memory device, comprising: a controller communicatively coupled to a non-volatile memory; a transition manager configured to transition the non-volatile memory device to a low-power state a request, wherein the transition manager is further configured to: store resume data corresponding to an operating state of the controller in a host memory buffer prior to receiving the request, the host memory buffer corresponding to memory resources of a host computing system; and resume operation of the controller from the low-power state by use of the resume data stored within the host memory buffer.

Some example implementations include a state monitor configured to accumulate changes pertaining to the resume data in volatile memory associated with the non-volatile memory device; the non-volatile memory device is configured to power an always-on (AON) partition of the volatile memory while in one or more power states and the state monitor is configured to accumulate the detected changes within the AON partition of the volatile memory; wherein the transition manager is further configured to transfer the accumulated changes pertaining to the resume data from the AON partition to the host memory buffer in response to determining that the AON partition will be unpowered in the low-power state; wherein, to resume from the low-power state, the transition manager is further configured to: access contents of the host memory buffer of the host computing system, and use the contents of the host memory buffer and the changes accumulated within the AON partition to resume operation of the non-volatile memory device; wherein the transition manager is further configured to override resume data accessed from the host memory buffer with the changes accumulated within the AON partition; wherein the transition manager is further configured to replace the resume data stored in the memory of the host computing system with updated resume data in response to a determined condition, the updated resume data comprising the accumulated changes; the determined condition corresponds to one or more of: accumulating a threshold number of changes in the volatile memory, the accumulated changes exceeding a size threshold, and a time elapsed since storing the resume data within the host memory buffer satisfying a time threshold and in response to replacing the resume data with the updated resume data in the host memory buffer, the state monitor is further configured to: clear the accumulated changes from the volatile memory and accumulate changes pertaining to the updated resume data in the volatile memory; the request comprises a command received from the host computing system and the transition manager is further configured to gradually resume selected services of the non-volatile memory device in accordance with an order in which the selected services are utilized in a resume process between the host computing system and the non-volatile memory device; wherein the transition manager is further configured to: resume one or more interconnect services of the non-volatile memory device in response to a resume request from the host computing system and use the one or more interconnect services to establish a link between the non-volatile memory device and the host computing system prior to resuming one or more other services of the non-volatile memory device.

One embodiment includes a method, comprising pre-populating a memory buffer of a host computing system with resume data, the resume data corresponding to an operating state of a non-volatile memory device at a first time and comprising data for resuming operation of the non-volatile memory device from a low-power state, wherein the resume data is pre-populated in the memory buffer independent of a request to transition the non-volatile memory device to the low-power state; receiving a request to transition the non-volatile memory device to a low-power state, the request received at a second time after the first time; and resuming operation of the non-volatile memory device from the low-power state by use of the resume data pre-populated within memory buffer of the host computing system.

Some example implementations includes detecting changes to the operating state of the non-volatile memory device occurring after the first time and recording delta entries in a volatile memory of the non-volatile memory device, each delta entry corresponding to one or more of the detected changes, wherein resuming operation of the non-volatile memory device from the low-power state comprises modifying the resume data pre-populated within the memory buffer of the host computing system with the delta entries recorded in the volatile memory; modifying the resume data pre-populated within the memory buffer of the host computing system to incorporate one or more of the detected changes in response to one or more of: recording a threshold number of delta entries, the recorded delta entries exceeding a size threshold, and a time threshold, removing the recorded delta entries from the volatile memory in response to modifying the resume data pre-populated within the memory buffer and recording delta entries corresponding to changes to the operating state of the non-volatile memory device occurring after the modifying in the volatile memory; wherein recording delta entries in the volatile memory further comprises one or more of: combining two or more delta entries into a single delta entry and replacing a first delta entry with a second delta entry; one or more of maintaining power to a partition of the volatile memory comprising the delta entries while the non-volatile memory device is in the low-power state and transferring the delta entries to the memory buffer of the host computing system in response to determining that power will be cut from the volatile memory while the non-volatile memory device is in the low-power state; wherein pre-populating the memory buffer with the resume data further comprises storing an address of the memory buffer within one or more of: the non-volatile memory device and the host computing system; wherein resuming operation of the non-volatile memory device from the low-power state further comprises determining an address of the memory buffer of the host computing system by one or more of: reading the address of the memory buffer from a storage location within the non-volatile memory device, reading the address of the memory buffer from a register, reading the address from an interconnect register, reading the address from a bus register and receiving a command comprising the address from the host computing system.

One embodiment includes a system, comprising: means for transitioning a non-volatile memory device to a low-power state in response to receiving a first command; means for pre-populating memory of the host computing system with resume data for the non-volatile memory device at a first time prior to receiving the first command, wherein the pre-populating comprises generating the resume data for the non-volatile memory device based on an operating state of the non-volatile memory device at the first time; means for detecting changes to the operating state of the non-volatile memory device; means for accumulating delta metadata corresponding to the detected changes in an internal memory of the non-volatile memory device; and means for transitioning the non-volatile memory device to the operational power state in response to receiving a second command by use of the resume data pre-populated within the memory of the host computing system and the accumulated delta metadata.

In some example implementations, the first command is received from one or more of: the host computing system and means for detecting a condition to trigger a transition of the non-volatile memory device to the low-power state; wherein the means for transitioning the non-volatile memory device to the low-power state are configured to transition the non-volatile memory device to the low-power state substantially instantaneously in response to receiving the first command, and without transferring the resume data for the non-volatile memory device to the memory of the host computing system after receiving the first command; further comprise means for updating the resume data pre-populated within the memory of the host computing system at a second time prior to receiving the first command, the updating comprising: generating updated resume data for the non-volatile memory device corresponding to the operating state of the non-volatile memory device at the second time, replacing the resume data with the updated resume data in the memory of the host computing system and clearing the accumulated delta metadata from internal memory; wherein the means for transitioning the non-volatile memory device to the operational power state further comprise means for transferring the resume data pre-populated within the memory of the host computing system to the non-volatile memory device and applying the accumulated changes to the transferred resume data.

(A1) One embodiment includes a non-volatile memory device, comprising: a non-volatile memory; a controller communicatively coupled to the non-volatile memory and configured to implement a plurality of services pertaining to the non-volatile memory device; and a transition manager configured to perform a resume process with a host computing system, the resume process to transition the non-volatile memory device from a non-operational state to an operational state, the transition manager further configured to: distinguish a first service of the controller to be utilized before other services implemented by the controller during the resume process; configure the controller to resume the first service in response to a command from the host computing system; and utilize the first service resumed by the controller to perform at least a portion of a first phase of the resume process with the host computing system before configuring the controller to resume the other services of the controller.

(A2) In some embodiments, the non-volatile memory device of A1, wherein the transition manager is further configured to: read first resume data pertaining to the first service; and configure the controller to resume operation of the first service by use of the first resume data.

(A3) In some embodiments, the non-volatile memory device of A2, wherein: the first service comprises a device interconnect service for communicatively coupling the non-volatile memory device to an interconnect of the host computing system; and utilizing the first service to perform the portion of the first phase of the resume process comprises establishing a link between the non-volatile memory device and the host computing system through the interconnect.

(A4) In some embodiments, the non-volatile memory device of A3, wherein the first resume data comprises one or more of an interconnect configuration, a bus, a peripheral component interconnect (PCI) configuration space, and a PCI express (PCIe) configuration space.

(A5) In some embodiments, the non-volatile memory device of A1, wherein the transition manager is further configured to notify the host computing system that the non-volatile memory device has transitioned to the operational state in response to the controller resuming the first service and prior to the controller resuming the other services.

(A6) In some embodiments, the non-volatile memory device of A5, further comprising a gradual resume manager configured to identify commands from the host computing system that require services of the controller that have not been resumed.

(A7) In some embodiments, the non-volatile memory device of A6, wherein the gradual resume manager is configured to handle the identified commands by one or more of: rejecting the identified commands, returning one or more error codes in response to the identified commands, buffering the identified commands, and queuing the identified commands.

(A8) In some embodiments, the non-volatile memory device of A1, wherein: an interconnect service of the controller is utilized to perform an initial phase of the resume process with the host computing system; a non-volatile memory (NVMe) service of the controller is utilized to perform a next phase of the resume process with the host computing system; a back-end service of the controller is utilized to perform a last phase of the resume process with the host comprising system;

the transition manager is further configured to: resume the interconnect service of the controller in response to the command from the host computing system and prior to configuring the controller to resume one or more of the NVMe service and the back-end service; resume the NVMe service of the controller in response to the controller resuming the interconnect service and prior to configuring the controller to resume the back-end service; and resume the back-end service of the controller in response to the controller resuming the NVMe service.

(A9) In some embodiments, the non-volatile memory device of A8, further comprising: a resume data manager configured to store resume data for the non-volatile memory device prior to the non-volatile memory device transitioning to the non-operational state, wherein storing the resume data comprises: storing a first dataset comprising resume data pertaining to the interconnect service in a first storage location; storing a second resume dataset pertaining to the NVMe service in a second storage location; and storing a third resume dataset pertaining to the back-end service in a third storage location.

(A10) In some embodiments, the non-volatile memory device of A9, wherein: resuming the interconnect service comprises reading the first resume dataset from the first storage location without reading one or more of the second resume dataset and the third resume dataset, and resuming the NVMe service comprises reading the second resume dataset from the second storage location without reading the third resume dataset.

(A11) The non-volatile memory device of A9, wherein: the first storage location comprises a partition of a volatile random access memory (RAM), wherein the non-volatile memory device is configured to power the partition while in the non-operational state; and the second storage location comprises a buffer within a memory of the host computing system.

(A12) One embodiment includes a method, comprising: transitioning the non-volatile memory device to an operational state in response to a command from a host computing system, the transitioning comprising: gradually resuming services of the non-volatile memory device in accordance with a determined order of the services, the determined order corresponding to an order in which the services will be required by the host computing system following the command, wherein gradually resuming a selected service of the non-volatile memory device comprises: configuring the non-volatile memory device to resume the selected service to an operational state without resuming one or more services that follow the selected service in the determined order; and providing the host computing system with access to the selected service prior to resuming the one or more services that follow the selected service in the determined order.

(A13) In some embodiments, the method of A12, wherein gradually resuming the selected service further comprises: reading resume data pertaining to the selected service; and using the resume data to configure a controller of the non-volatile memory device to resume the selected service.

(A14) In some embodiments, the method of A13, further comprising: pre-populating a first storage location with the resume data pertaining to the selected service prior to receiving a command to transition the non-volatile memory device to a low-power state; and recording changes pertaining to the selected service occurring after the pre-populating in a second storage location; accessing the pre-populated resume data pertaining to the selected service from the first storage location; and using the pre-populated resume data and the recorded changes pertaining to the selected service to configure the controller of the non-volatile memory device to resume the selected service.

(A15) In some embodiments, the method of A12, wherein reading the resume data pertaining to the selected service comprises accessing a resume dataset that includes resume data pertaining to the selected service and excludes resume data pertaining to services of the non-volatile memory device other than the selected service.

(A16) In some embodiments, the method of A12, therein providing the host computing system with access to the selected service further comprises notifying the host computing system that the non-volatile memory device is in the operational state prior to resuming the one or more services that follow the selected service in the determined order.

(A17) In some embodiments, the method of A12, wherein: a first service of the non-volatile memory device in the determined order comprises an interconnect service; and resuming the interconnect service comprises bringing up a link between the non-volatile memory device and the host computing system.

(A18) In some embodiments, the method of A17, wherein: a second service of the non-volatile memory device in the determined order comprises a non-volatile memory (NVMe) service; and resuming the NVMe service comprises initializing one or more: NVMe registers, NVMe data structures, and NVMe queues, and NVMe buffers.

(A19) In some embodiments, the method of A18, wherein: a third service of the non-volatile memory device in the determined order comprises a back-end service; and resuming the back-end service comprises importing logical-to-physical translation data from resume data pertaining to the third service.

(A20) One embodiment includes a system, comprising: means for gradually transitioning a non-volatile memory device from a low-power state to an operational state, comprising: means for gradually resuming respective resources of the non-volatile memory device according to an order in which the respective resources are required to be operational in a resume process with the host computing system, wherein gradually resuming a selected resource of the non-volatile memory device comprises: acquiring resume data pertaining to the selected resource; using the acquired resume data to configure the non-volatile memory device to transition the selected resource from a non-operational state to an operational state; providing the host computing system with access to the selected resource while one or more other resources of the non-volatile memory device remain in the non-operational state;

(A21) In some embodiments, the system of A20, wherein gradually resuming the selected resource further comprises utilizing the selected resource to complete one or more phases of a resume process with the host computing system.

(A22) In some embodiments, the system of A20, wherein the means for gradually resuming the respective resources of the non-volatile memory device comprises: means for resuming interconnect resources of the non-volatile memory device in response to a wakeup command from the host computing system, and before resuming one or more of non-volatile memory (NVMe) resources and back-end resources of the non-volatile memory device; means for utilizing the interconnect resources of the non-volatile memory device to complete a first phase of a resume process while the non-volatile memory (NVMe) resources and the back-end resources of the non-volatile memory device remain in the non-operational state, the first phase comprising establishing a connection between the non-volatile memory device and the host computing system; means for resuming the NVMe resources of the non-volatile memory device in response to completing the first phase of the resume process, and before resuming the back-end resources of the non-volatile memory device; means for utilizing the NVMe resources of the non-volatile memory device to complete a second phase of the resume process while the back-end resources of the non-volatile memory device remain in the non-operational state; means for resuming the back-end resources of the non-volatile memory device in response to completing the second phase of the resume process; and means for utilizing the back-end resources to complete a third phase of the resume process with the host computing system.

(A23) In some embodiments, the system of A22, wherein: the means for resuming the interconnect resources comprise means for accessing resume data pertaining to the interconnect resources from an always-on (AON) partition of a static random access memory (SRAM) of the non-volatile memory device; and the means for resuming the NVMe resources comprise means for accessing a resume data pertaining to the NVMe resources from a memory buffer of the host computing system.

It will be understood that various details of the subject matter described herein may be changed without departing from the scope of the subject matter described herein. Furthermore, the foregoing description is for the purpose of illustration only, and not for the purpose of limitation.

The invention claimed is:

1. A non-volatile memory device, comprising:
  a controller communicatively coupled to a non-volatile memory;
  a transition manager configured to transition the non-volatile memory device to a low-power state based on a request, wherein the transition manager is further configured to:
    store resume data corresponding to an operating state of the controller in a host memory buffer prior to receiving the request, the host memory buffer corresponding to memory resources of a host computing system; and
  a state monitor configured to accumulate changes pertaining to the resume data in a volatile memory associated with the non-volatile memory device,
  wherein the transition manager is further configured to:
    replace the resume data stored in the host memory buffer with updated resume data in response to a determined condition, the updated resume data comprising the accumulated changes,
    wherein the determined condition corresponds to one or more of: the accumulated changes satisfying a threshold number, the accumulated changes satisfying a size threshold, and a time elapsed since storing the resume data within the host memory buffer satisfying a time threshold; and
    resume operation of the controller from the low-power state by use of the resume data stored within the host memory buffer.

2. The non-volatile memory device of claim 1, wherein:
  the non-volatile memory device is configured to power a partition of the volatile memory while in one or more power states; and
  the state monitor is further configured to accumulate the changes pertaining to the resume data within the partition of the volatile memory.

3. The non-volatile memory device of claim 2, wherein the transition manager is further configured to transfer the accumulated changes pertaining to the resume data from the partition to the host memory buffer in response to determining that the partition will be unpowered in the low-power state.

4. The non-volatile memory device of claim 2, wherein, to resume from the low-power state, the transition manager is further configured to:
  access contents of the host memory buffer of the host computing system; and
  use the contents of the host memory buffer and the changes accumulated within the partition to resume operation of the non-volatile memory device.

5. The non-volatile memory device of claim 4, wherein the transition manager is further configured to override the resume data accessed from the host memory buffer with the changes accumulated within the partition.

6. The non-volatile memory device of claim 1, wherein:
  in response to replacing the resume data with the updated resume data in the host memory buffer, the state monitor is further configured to:
  clear the accumulated changes from the volatile memory; and
  accumulate changes pertaining to the updated resume data in the volatile memory.

7. The non-volatile memory device of claim 1, wherein:
  the request comprises a command received from the host computing system; and
  the transition manager is further configured to gradually resume selected services of the non-volatile memory device in accordance with an order in which the selected services are utilized in a resume process between the host computing system and the non-volatile memory device.

8. The non-volatile memory device of claim 7, wherein the transition manager is further configured to:
  resume one or more interconnect services of the non-volatile memory device in response to a resume request from the host computing system; and
  use the one or more interconnect services to establish a link between the non-volatile memory device and the host computing system prior to resuming one or more other services of the non-volatile memory device.

9. A method, comprising
  pre-populating a memory buffer of a host computing system with resume data, the resume data corresponding to an operating state of a non-volatile memory device at a first time and comprising data for resuming operation of the non-volatile memory device from a low-power state, wherein the resume data is pre-populated in the memory buffer independent of a request to transition the non-volatile memory device to the low-power state;
  detecting changes to the operating state of the non-volatile memory device occurring after the first time;
  recording delta entries in a volatile memory of the non-volatile memory device, each delta entry corresponding to one or more of the detected changes;
  modifying the resume data pre-populated within the memory buffer of the host computing system to incorporate one or more of the detected changes in response to one or more of: the recorded delta entries satisfying a threshold number, the recorded delta entries satisfying a size threshold, and a time elapsed since storing the resume data within the memory buffer satisfying a time threshold;

receiving a request to transition the non-volatile memory device to a low-power state, the request received at a second time after the first time; and resuming operation of the non-volatile memory device from the low-power state by use of the resume data pre-populated within memory buffer of the host computing system.

10. The method of claim 9, further comprising:

removing the recorded delta entries from the volatile memory in response to modifying the resume data pre-populated within the memory buffer; and recording delta entries corresponding to changes to the operating state of the non-volatile memory device occurring after the modifying in the volatile memory.

11. The method of claim 9, wherein recording the delta entries in the volatile memory further comprises one or more of:

combining two or more of the delta entries into a single delta entry; and replacing a first delta entry with a second delta entry among the delta entries.

12. The method of claim 9, further comprising one or more of:

maintaining power to a partition of the volatile memory comprising the delta entries while the non-volatile memory device is in the low-power state; and transferring the delta entries to the memory buffer of the host computing system in response to determining that power will be cut from the volatile memory while the non-volatile memory device is in the low-power state.

13. The method of claim 9, wherein pre-populating the memory buffer with the resume data further comprises storing an address of the memory buffer within one or more of: the non-volatile memory device and the host computing system.

14. The method of claim 9, wherein resuming the operation of the non-volatile memory device from the low-power state further comprises determining an address of the memory buffer of the host computing system by one or more of:

reading the address of the memory buffer from a storage location within the non-volatile memory device;

reading the address of the memory buffer from a register;

reading the address from an interconnect register;

reading the address from a bus register; and receiving a command comprising the address from the host computing system.

15. A system, comprising:

means for transitioning a non-volatile memory device to a low-power state in response to receiving a first command;

means for pre-populating a memory of a host computing system with resume data for the non-volatile memory device at a first time prior to receiving the first command, wherein the pre-populating comprises generating the resume data for the non-volatile memory device based on an operating state of the non-volatile memory device at the first time;

means for detecting changes to the operating state of the non-volatile memory device;

means for accumulating delta metadata corresponding to the detected changes in an internal memory of the non-volatile memory device;

means for updating the resume data pre-populated within the memory of the host computing system at a second time prior to receiving the first command, the updating comprising:

generating updated resume data for the non-volatile memory device corresponding to the operating state of the non-volatile memory device at the second time; and replacing the resume data with the updated resume data in the memory of the host computing system; and means for transitioning the non-volatile memory device to an operational power state in response to receiving a second command by use of the resume data pre-populated within the memory of the host computing system and the accumulated delta metadata.

16. The system of claim 15, wherein the first command is received from one or more of:

the host computing system; and means for detecting a condition to trigger a transition of the non-volatile memory device to the low-power state.

17. The system of claim 15, wherein the means for transitioning the non-volatile memory device to the low-power state is configured to transition the non-volatile memory device to the low-power state in response to receiving the first command, and without transferring the resume data for the non-volatile memory device to the memory of the host computing system after receiving the first command.

18. The system of claim 15, wherein the means for transitioning the non-volatile memory device to the operational power state further comprise means for:

transferring the resume data pre-populated within the memory of the host computing system to the non-volatile memory device; and applying the accumulated delta metadata to the transferred resume data.

* * * * *